United States Patent
Keller et al.

(10) Patent No.: US 7,659,894 B2
(45) Date of Patent: Feb. 9, 2010

(54) TERMINATING SPATIAL PARTITION HIERARCHIES BY A PRIORI BOUNDING MEMORY

(75) Inventors: Alexander Keller, Berlin (DE); Carsten Waechter, Berlin (DE)

(73) Assignee: Mental Images GmbH, Berlin (DE)

( * ) Notice: Subject to any disclaimer, the term of this patent is extended or adjusted under 35 U.S.C. 154(b) by 161 days.

(21) Appl. No.: 12/018,733

(22) Filed: Jan. 23, 2008

(65) Prior Publication Data

US 2008/0231633 A1 Sep. 25, 2008

Related U.S. Application Data

(63) Continuation-in-part of application No. 11/737,424, filed on Apr. 19, 2007, now Pat. No. 7,495,664, and a continuation-in-part of application No. 11/474,517, filed on Jun. 23, 2006, now Pat. No. 7,499,053, and a continuation-in-part of application No. 10/299,574, filed on Nov. 19, 2002, now Pat. No. 7,184,042, which is a continuation-in-part of application No. 09/884,861, filed on Jun. 19, 2001, now Pat. No. 7,227,547.

(60) Provisional application No. 60/886,197, filed on Jan. 23, 2007, provisional application No. 60/910,940, filed on Apr. 10, 2007, provisional application No. 60/793,063, filed on Apr. 19, 2006, provisional application No. 60/693,231, filed on Jun. 23, 2005, provisional application No. 60/265,934, filed on Feb. 1, 2001, provisional application No. 60/212,286, filed on Jun. 19, 2000.

(51) Int. Cl.
G06T 15/50 (2006.01)
G06F 17/00 (2006.01)

(52) U.S. Cl. ...................... 345/426; 707/101

(58) Field of Classification Search ............. None
See application file for complete search history.

(56) References Cited

U.S. PATENT DOCUMENTS

| | | | |
|---|---|---|---|
| 5,305,430 A | 4/1994 | Glassner | |
| 5,847,711 A | 12/1998 | Kaufman | |
| 6,028,606 A | 2/2000 | Kolb | |
| 6,172,679 B1 | 1/2001 | Lim | |
| 6,363,468 B1 | 3/2002 | Allison | |
| 6,529,193 B1 | 3/2003 | Herken | |
| 6,762,756 B2 | 7/2004 | Lewis | |
| 6,825,839 B2 | 11/2004 | Huang | |
| 6,862,026 B2 | 3/2005 | Zachmann | |
| 7,058,636 B2 | 6/2006 | Coldewey | |
| 7,164,420 B2 * | 1/2007 | Ard | 345/423 |
| 2003/0034968 A1 | 3/2003 | Abramov | |
| 2003/0052874 A1 | 3/2003 | Abramov | |

(Continued)

OTHER PUBLICATIONS

Goldsmith, Automatic Creation of Object Hierarchies for Ray Tracing, IEEE Computer Graphics and Applications 7 (1987), No. 5, pp. 14-20.*

(Continued)

Primary Examiner—Jason M Repko
(74) Attorney, Agent, or Firm—Jacobs & Kim LLP; David Jacobs

(57) ABSTRACT

The present invention provides methods, systems and computer program code (software) products for terminating spatial partition hierarchies and other hierarchies by a priori bounding.

50 Claims, 85 Drawing Sheets

---

TERMINATION CRITERION AND MEMORY SCHEDULING HEURISTIC MODULE, 2500:

SUBMODULE FOR EXTENDING ARGUMENT LIST OF CONSTRUCTION PROCEDURE, PASSING ALONG CONTIGUOUS PIECE OF MEMORY ALONG WITH SIZE, AND CONSTRUCTING LEAF NODE IF TWO RESULTING REFERENCE LISTS PLUS SIZE OF TREE NODE DO NOT FIT INTO GIVEN MEMORY BLOCK, 2501

SUBMODULE FOR PREDICTING MEMORY CONSUMPTION OF NEW SUBTREES AND ACCORDINGLY DISTRIBUTING AVAILABLE MEMORY TO LEFT AND RIGHT CHILDREN WHILE PROCEEDING RECURSIVELY, 2502

SUBMODULE FOR PROVIDING ADDITIONAL MEMORY ALLOCATION AND OTHER DESCRIBED FEATURES, 2503

U.S. PATENT DOCUMENTS

| | | | |
|---|---|---|---|
| 2003/0160776 | A1 | 8/2003 | Sowizral |
| 2004/0125103 | A1 | 7/2004 | Kaufman |
| 2005/0264565 | A1 | 12/2005 | Keller |
| 2006/0098009 | A1 | 5/2006 | Zuniga |
| 2007/0182732 | A1* | 8/2007 | Woop et al. ............... 345/420 |

OTHER PUBLICATIONS

Vlastimil Havran, "Huristic Ray Shooting Algorithm," Nov. 2000, Ph. D. thesis, Czech Technical University, Praha, Czech Republic, pp. 49-92.*

Ingo Wald, Solomon Boulos, Peter Shirley, "Ray Tracing Deformable Scenes Using Dynamic Bounding Volume Hierarchies," Jan. 2007 ACM Transactions on Graphics (TOG), vol. 26, No. 1.*

Waechter, "Instant Ray Tracing: The Bounding Interval Hierarchy", Eurographics Symposium, 2006, https://graphics.uni-ulm.de/BIH.pdf.

Cook, "Stochastic sampling in computer graphics," Jan. 1986, ACM Transactions on Graphics, vol. 5, Issue 1, p. 51-72.

Cazals, Filtering, clustering and hierarchy construction: a new solution for ray tracing complex scenes, Computer Graphics Forum 14 (1995), No. 3, 371-382.

Geimer, A cross-platform framework for interactive ray tracing, Graphiktag im Rahmen der GI Jahrestagung, Frankfurt am Main (2003).

Goldsmith, Automatic Creation of Object Hierarchies for Ray Tracing, IEEE Computer Graphics and Applications 7 (1987), No. 5, 14-20.

Jevans, Adaptive voxel subdivision for ray tracing, Proceedings of Graphics Interface, 1989, pp. 164-172.

Klimaszewski, Faster ray tracing using adaptive grids, IEEE Comput. Graph. Appl. 17 (1997), No. 1, 42-51.

Reinhard, Dynamic Acceleration Structures for Interactive Ray Tracing, Proceedings of the Eurographics Workshop on Rendering Techniques, 2000, pp. 299-306.

Reshetov, Multi-level ray tracing algorithm, SIGGRAPH 05 Conference Proceedings, Annual Conference Series, 2005.

Smits, Efficiency Issues for Ray Tracing, Journal of Graphics Tools 3 (1998), No. 2, 1-14.

Wald, Ray Tracing Deformable Scenes using Dynamic Bounding Volume Hierarchies, ACM Transactions on Graphics (2006).

Wald, Building fast KD-trees for ray tracing, Proceedings of the 2006 IEEE Symposium on Interactive Ray Tracing, 2006.

Wald, Ray Tracing Animated Scenes using Coherent Grid Traversal, ACM Transactions on Graphics (Proceedings of ACM SIGGRAPH 2006).

Waechter, Instant Ray Tracing: The Bounding Interval Hierarchy, Rendering Techniques 2006 (Proc. of 17th Eurographics Symposium on Rendering), 2006, pp. 139-149.

Woop, B-KD Trees for Hardware Accelerated Ray Tracing of Dynamic Scenes, Proceedings of Graphics Hardware, 2006.

Wald, Interactive distributed ray tracing of highly complex models, Proceedings of the 12th Eurographics Workshop on Rendering Techniques (London, UK), Springer-Verlag, 2001, pp. 277-288.

* cited by examiner

```
void Triangle::Transform()
{
    Point *p = (Point *)this;

Vector n3d;
    Vector n_abs = n3d = (p[1]-p[0])|(p[2]-p[0]);

// search largest component for projection (0=x,1=y,2=z)
    uintCast(n_abs.dx) &= 0x7FFFFFFF;
    uintCast(n_abs.dy) &= 0x7FFFFFFF;
    uintCast(n_abs.dz) &= 0x7FFFFFFF;
```

FIG. 5A

```
// Degenerated Triangles must be handled (set edge-signs)
if(!((n_abs.dx+n_abs.dy+n_abs.dz) > DEGEN_TRI_EPSILON))
//(!(...) > EPS) to handle NaN's
{
    d    =  p[0].x;
    p0.u = -p[0].y;
    p0.v = -p[0].z;
    n.u=n.v = 0.0f;
    e[0].u = e[1].u = e[0].v = e[1].v = 1.0f;

return;
}

U32 axis = 2;
if(n_abs.dx > n_abs.dy)
{
    if(n_abs.dx > n_abs.dz)
        axis = 0;
}
else if(n_abs.dy > n_abs.dz)
    axis = 1;

Point p03d = p[0];
Point p13d = p[1];
Point p23d = p[2];
```

FIG. 5B

```
float t_inv = 2.0f/n3d[axis];

e[0].u = (p23d[PlusOneMod3[axis]]-p03d[PlusOneMod3[axis]])*t_inv;
e[0].v = (p23d[PlusOneMod3[axis+1]]-p03d[PlusOneMod3[axis+1]])*t_inv;

e[1].u = (p13d[PlusOneMod3[axis]]-p03d[PlusOneMod3[axis]])*t_inv;
e[1].v = (p13d[PlusOneMod3[axis+1]]-p03d[PlusOneMod3[axis+1]])*t_inv;

t_inv *= 0.5f;

n.u = n3d[PlusOneMod3[axis]]   *t_inv;
n.v = n3d[PlusOneMod3[axis+1]]*t_inv;

p0.u = -p03d[PlusOneMod3[axis]];
p0.v = -p03d[PlusOneMod3[axis+1]];

d = p03d[axis] + n.u*p03d[PlusOneMod3[axis]] + n.v*p03d[PlusOneMod3[axis+1]];

```
U32 *idx = pointer_to_face_indices;
U32 ofs = projection_case;

for(U32 ii = num_triData; ii--, idx++)
{
    float t = (triData[*idx].d - ray.from[ofs]
               - triData[*idx].n.u*ray.from[PlusOneMod3[ofs]]
               - triData[*idx].n.v*ray.from[PlusOneMod3[ofs+1]])
              / (ray.d[ofs] + triData[*idx].n.u*ray.d[PlusOneMod3[ofs]]
                 + triData[*idx].n.v*ray.d[PlusOneMod3[ofs+1]]);
```

FIG. 6A

```
if(uintCast(t)-1 > uintCast(result.tfar))  //-1 for +0.0f
    continue;

float h1 = t*ray.d[PlusOneMod3[ofs]]    + ray.from[PlusOneMod3[ofs]]
                                        + triData[*idx].p0.u;
float h2 = t*ray.d[PlusOneMod3[ofs+1]]  + ray.from[PlusOneMod3[ofs+1]]
                                        + triData[*idx].p0.v;

float u = h1*triData[*idx].e[0].v - h2*triData[*idx].e[0].u;
float v = h2*triData[*idx].e[1].u - h1*triData[*idx].e[1].v;
float uv = u+v;
if((uintCast(u) | uintCast(v) | uintCast(uv)) > 0x40000000)
    continue;

result.tfar = t;
result.tri_index = *idx;
```

FIG. 6B

```
Point *p = (Point *)&triData[tri_index];
int boxMinIdx, boxMaxIdx;

// boxMinIdx and boxMaxIdx index the smallest and largest vertex of the triangle
// in the component dir[0] of the split plane
```

FIG. 7A-1

```
if(p[0][dir[0]] < p[1][dir[0]])
{
    if(p[2][dir[0]] < p[0][dir[0]])
    {
        boxMinIdx = 2;
        boxMaxIdx = 1;
    }
    else
    {
        boxMinIdx = 0;
        boxMaxIdx = p[2][dir[0]] < p[1][dir[0]] ? 1 : 2;
    }
}
else
{
    if(p[2][dir[0]] < p[1][dir[0]])
    {
        boxMinIdx = 2;
        boxMaxIdx = 0;
    }
    else
    {
        boxMinIdx = 1;
        boxMaxIdx = p[2][dir[0]] < p[0][dir[0]] ? 0 : 2;
    }
}
```

FIG. 7A-2

```
/* If the triangle is in the split plane or completely on one side of the split plane
   is decided without any numerical errors, i.e. at the precision the triangle is
   entered to the rendering system. Using epsilons here is wrong and not necessary.
*/
if((p[boxMinIdx][dir[0]] == split) && (p[boxMaxIdx][dir[0]] == split)) // in split plane ?
{
    on_splitItems++;

if(split < middle_split)                    // put to smaller volume
        left_num_divItems++;
    else
    {
        unsorted_border--;
        U32 t = itemsList[unsorted_border];
        right_num_divItems--;
        itemsList[right_num_divItems] = itemsList[left_num_divItems];
        itemsList[left_num_divItems] = t;
    }
}
else if(p[boxMaxIdx][dir[0]] <= split)          // triangle completely left ?
    left_num_divItems++;
else if(p[boxMinIdx][dir[0]] >= split)          // triangle completely right ?
{
    unsorted_border--;
    U32 t = itemsList[unsorted_border];
```

FIG. 7A-3

```
}
else
// and now detailed decision, triangle must intersect split plane ...
{
    /*
      In the sequel we determine whether a triangle should go left and/or right, where
      we already know that it must intersect the split plane in a line segment.

All computations are ordered so that the more precise computations are done
      first. Scalar products and cross products are evaluated last.
      In some situations it may be necessary to expand the bounding box by
      an epsilon. This, however, will blow up the required memory by large amounts.
      If such a situation is encountered, it may be better to analyze it numerically
      in order not to use any epsilons...

Arriving here we know that p[boxMaxIdx][dir[0]] < split < p[boxMaxIdx][dir[0]]
      and that p[boxMidIdx][dir[0]] \in [p[boxMaxIdx][dir[0]], p[boxMaxIdx][dir[0]]].
      We also know, that the triangle has a non-empty intersection with the current
      voxel. The triangle also cannot lie in the split plane, and its vertices cannot
      lie on one side only.
    */ int boxMidIdx = 3 - boxMaxIdx - boxMinIdx; // missing index, found by 3 = 0 + 1 + 2

/*
      We now determine the vertex that is alone on one side of the split plane.
      Depending on whether the lonely vertex is on the left or right side,
      we have to later swap the decision, whether the
      triangle should be going to the left or right.
    */
```

FIG. 7B-2

```
int Alone    = (split < p[boxMidIdx][dir[0]]) ? boxMinIdx : boxMaxIdx;
int NotAlone = 3 - Alone - boxMidIdx;
// == (split < p[boxMidIdx][dir[0]]) ? boxMaxIdx : boxMinIdx
// since sum of idx = 3 = 0 + 1 + 2 float dist  = split - p[Alone][dir[0]];
U32 swapLR  = uintCast(dist)>>31; // == p[Alone][dir[0]] > split;

/* Now the line segments connecting the lonely vertex with the remaining two verteces
   are intersected with the split plane. a1 and a2 are the intersection points.

The special case "if(p[boxMidIdx][dir[0]] == split)" (yields a x / x, which could
   be optimized) does not help at all since it only can happen as often as the highest
   valence of a vertex of the mesh is...
*/ float at    = dist / (p[boxMidIdx][dir[0]] - p[Alone][dir[0]]);
float at2   = dist / (p[NotAlone][dir[0]] - p[Alone][dir[0]]);

float a1x   = (p[boxMidIdx][dir[1]] - p[Alone][dir[1]]) * at;
float a1y   = (p[boxMidIdx][dir[2]] - p[Alone][dir[2]]) * at;

float a2x   = (p[NotAlone][dir[1]] - p[Alone][dir[1]]) * at2;
float a2y   = (p[NotAlone][dir[2]] - p[Alone][dir[2]]) * at2;
```

FIG. 7B-3

```
// n is a vector normal to the line of intersection a1a2 of the triangle
// and the split plane float nx = a2y - a1y;
float ny = a2x - a1x;

// The signs indicate the quadrant of the vector normal to the intersection line
```

FIG. 7C-1

```
U32 nxs = uintCast(nx)>>31; // == (nx < 0.0f)
U32 nys = uintCast(ny)>>31; // == (ny < 0.0f)

/* Numerical precision: Due to cancellation, floats of approximately same exponent
   should be subtracted first, before adding something of a different order of
   magnitude. All brackets in the sequel are ESSENTIAL for numerical precision.
   Change them and you will see more errors in the BSP...

pMin is the lonely point in the coordinate system with the origin at
        bBox.bMinMax[0]
   pMax is the lonely point in the coordinate system with the origin at
        bBox.bMinMax[1]
*/ float pMinx = pLAlonel[dir[1]] - bBox.bMinMax[0][dir[1]];
float pMiny = pLAlonel[dir[2]] - bBox.bMinMax[0][dir[2]];
float pMaxx = pLAlonel[dir[1]] - bBox.bMinMax[1][dir[1]];
float pMaxy = pLAlonel[dir[2]] - bBox.bMinMax[1][dir[2]];

// Determine coordinates of the bounding box, however, with respect to p + a1 being the origin.

float boxx[2];
float boxy[2];
boxx[0] = (pMinx + a1x) * nx;
boxy[0] = (pMiny + a1y) * ny;
boxx[1] = (pMaxx + a1x) * nx;
boxy[1] = (pMaxy + a1y) * ny;
```

FIG. 7C-2

```
/* Test, whether line of intersection of the triangle and the split plane passes by the
   bounding box. This is done by indexing the coordinates of the bounding box by the
   quadrant of the vector normal to the line of intersection. In fact this is
   the nifty implementation of the 3d test introduced by in the book with Haines:
   "Real-Time Rendering"
   By the indexing the vertices are selected, which are farthest from the line.

Note that the triangle CANNOT completely pass the current voxel, since it must have
   a nonempty intersection with it.
*/
U32 resultS;

if(pMinx + MAX(a1x,a2x) < 0.0f)                    // line segment of intersection a1a2 left of box
    resultS = uintCast(pMinx)>>31;
else if(pMiny + MAX(a1y,a2y) < 0.0f)   // line segment of intersection a1a2 below box
    resultS = uintCast(pMiny)>>31;
else if(pMaxx + MIN(a1x,a2x) > 0.0f)   // line segment of intersection a1a2 right of box
    resultS = (pMaxx > 0.0f);
else if(pMaxy + MIN(a1y,a2y) > 0.0f)   // line segment of intersection a1a2 above box
    resultS = (pMaxy > 0.0f);
```

FIG. 7C-3

```
else if(boxx[1^nxs] > boxy[nys])
    // line passes beyond bbox ? => triangle can only be on one side
    results = (a1y*a2x > a1x*a2y);
    // sign of cross product a1 x a2 is checked to determine side
else if(boxx[nxs] < boxy[1^nys])
    results = (a1y*a2x < a1x*a2y);
else
// Ok, now the triangle must be both left and right
{
    stackList[currStackItems++] = itemsList[left_num_divItems];
    unsorted_border--;
    itemsList[left_num_divItems] = itemsList[unsorted_border];
```

FIG. 7D-1

```
        continue;
    }
    if(swapLR != /*^*/ resultS)
    {
        unsorted_border--;
        U32 t = itemsList[unsorted_border];
        right_num_divItems--;
        itemsList[right_num_divItems] = itemsList[left_num_divItems];
        itemsList[left_num_divItems] = t;
    }
    else
        left_num_divItems++;
}
```

FIG. 7D-2

```
Intersection Boundary::Intersect(Ray &ray) //ray.tfar is changed!
{
    // Optimized inverse calculation (saves 2 of 3 divisions)
    float inv_tmp = (ray.d.dx*ray.d.dy)*ray.d.dz;

if((uintCast(inv_tmp)&0x7FFFFFFF) > uintCast(DIV_EPSILON))
    {
        inv_tmp = 1.0f / inv_tmp;

ray.inv_d.dx = (ray.d.dy*ray.d.dz)*inv_tmp;
        ray.inv_d.dy = (ray.d.dx*ray.d.dz)*inv_tmp;
        ray.inv_d.dz = (ray.d.dx*ray.d.dy)*inv_tmp;
    }
    else
    {
```

FIG. 14A-1

```
ray.inv_d.dx = ((uintCast(ray.d.dx)&0x7FFFFFFF) > uintCast(DIV_EPSILON)) ?
               (1.0f / ray.d.dx) : INVDIR_LUT[uintCast(ray.d.dx) >> 31];
ray.inv_d.dy = ((uintCast(ray.d.dy)&0x7FFFFFFF) > uintCast(DIV_EPSILON)) ?
               (1.0f / ray.d.dy) : INVDIR_LUT[uintCast(ray.d.dy) >> 31];
ray.inv_d.dz = ((uintCast(ray.d.dz)&0x7FFFFFFF) > uintCast(DIV_EPSILON)) ?
               (1.0f / ray.d.dz) : INVDIR_LUT[uintCast(ray.d.dz) >> 31];
}

Intersection result;
result.tfar = ray.tfar;
result.tri_index = -1;

//
//BBox-Check
//
float tnear = 0.0f;
worldBBox.Clip(ray,tnear);
if(uintCast(ray.tfar) == 0x7F7843B0) //ray.tfar==3.3e38f //!!
    return(result);
```

FIG. 14A-2

```
//
U32 current_bspStack = 1; //wegen empty empty stack case == 0
U32 node = 0;

//
//BSP-Traversal
//
const U32 whatnode[3] = {(uintCast(ray.inv_d.dx)>>27) & sizeof(BSPNODELEAF),
                         (uintCast(ray.inv_d.dy)>>27) & sizeof(BSPNODELEAF),
                         (uintCast(ray.inv_d.dz)>>27) & sizeof(BSPNODELEAF)};

U32 bspStackNode[128];
float bspStackFar[128];
float bspStackNear[128];
bspStackNear[0] = -3.4e38f; // sentinel do
{
    //Ist Node ein Leaf (type<0) oder nur ne Verzweigung (type>=0)
    while (((BSPNODELEAF&)bspNodes[node]).type >= 0)
    {
```

FIG. 14B-1

```
//Split-Dimension (x|y|z)
U32 proj = ((BSPNODELEAF&)bspNodes[node]).type & 3;

float distl = (((BSPNODELEAF&)bspNodes[node]).splitlr[whatnode[proj]>>4]
              - ray.from[proj])*ray.inv_d[proj];
float distr = (((BSPNODELEAF&)bspNodes[node]).splitlr[(whatnode[proj]>>4)^1]
              - ray.from[proj])*ray.inv_d[proj];

node = (((BSPNODELEAF&)bspNodes[node]).type - proj) | whatnode[proj];
       //type & 0xFFFFFFF0 if(tnear <= distl)
{
   if(ray.tfar >= distr)
   {
      bspStackNear[current_bspStack] = MAX(tnear,distr);
      bspStackNode[current_bspStack] = node^sizeof(BSPNODELEAF);
      bspStackFar[current_bspStack]  = ray.tfar;

current_bspStack++;
   }
}
```

FIG. 14B-2

```
                ray.tfar = MIN(ray.tfar,distl);
            }
            else
                if(ray.tfar >= distr)
                {
                    tnear = MAX(tnear,distr);
                    node ^= sizeof(BSPNODELEAF);
                }
                else
                    goto stackPop;
        }

//
        //Faces-Intersect
        ... code omitted ...
        //
        //
        //Hit gefunden?
        // do //!! NEEDS bspStackNear[0] = -3.4e38f;     !!!!!
        {
stackPop:
            current_bspStack--;
            tnear = bspStackNear[current_bspStack];
        }while(result.tfar < tnear);

if(current_bspStack == 0)
            return(result);

node    = bspStackNode[current_bspStack];
        ray.tfar = bspStackFar[current_bspStack];
    } while (true);
}
```

FIG. 14C

FIG. 15A
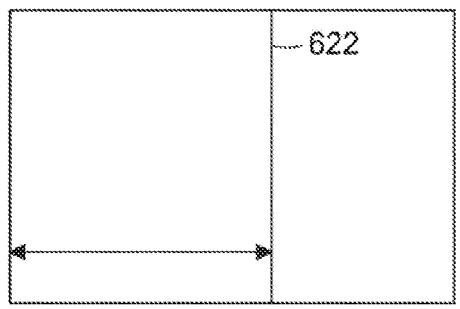
FIG. 15B
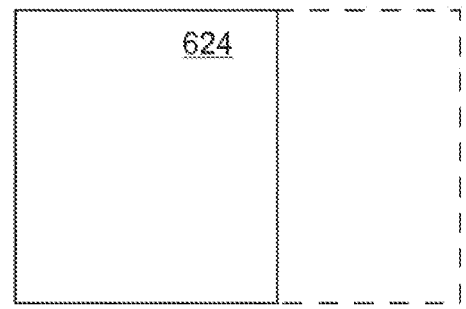
FIG. 15C
```
typedef ALIGN(4) struct \\ example encoding
{
  int type;
  //sign bit=LEAF,
  //lowest 2 bits=PROJECTION_AXIS,
  //else bits=index of BVH or triangles
  union
  {
    U32 endItems;     //NODE: number of tri's
    float splitlr[4];
  };
}BVHNODELEAF;
```
FIG. 16

```
Intersection BVH::Intersect(Ray &ray)
{
    //Optimized inverse calculation (saves 2 of 3 divisions)
    float inv_tmp = (ray.d.dx*ray.d.dy)*ray.d.dz;
    if((uintCast(inv_tmp)&0x7FFFFFFF) > uintCast(DIV_EPSILON))
    {
        inv_tmp = 1.0f / inv_tmp;

ray.inv_d.dx = (ray.d.dy*ray.d.dz)*inv_tmp;
        ray.inv_d.dy = (ray.d.dx*ray.d.dz)*inv_tmp;
        ray.inv_d.dz = (ray.d.dx*ray.d.dy)*inv_tmp;
    }
    else
    {
```

FIG. 17A-1

```
ray.inv_d.dx = ((uintCast(ray.d.dx)&0x7FFFFFFF) > uintCast(DIV_EPSILON)) ?
    (1.0f / ray.d.dx) : INVDIR_LUT[uintCast(ray.d.dx) >> 31];
ray.inv_d.dy = ((uintCast(ray.d.dy)&0x7FFFFFFF) > uintCast(DIV_EPSILON)) ?
    (1.0f / ray.d.dy) : INVDIR_LUT[uintCast(ray.d.dy) >> 31];
ray.inv_d.dz = ((uintCast(ray.d.dz)&0x7FFFFFFF) > uintCast(DIV_EPSILON)) ?
    (1.0f / ray.d.dz) : INVDIR_LUT[uintCast(ray.d.dz) >> 31];
}

Intersection result;
result.tfar = ray.tfar;
result.tri_index = -1;

//
//BBox-Check
//
float tnear = 0.0f;
worldBBox.Clip(ray,tnear);
if(uintCast(ray.tfar) == 0x7F7843B0) //ray.tfar==3.3e38f
    return(result);

```
//
//BSP-Traversal
//
const U32 whatnode[3] = {(uintCast(ray.inv_d.dx)>>28) & sizeof(BVHNODELEAF),
                         (uintCast(ray.inv_d.dy)>>28) & sizeof(BVHNODELEAF),
                         (uintCast(ray.inv_d.dz)>>28) & sizeof(BVHNODELEAF)};

U32 bspStackNode[128];
float bspStackFar[128];
float bspStackNear[128];
bspStackNear[0] = -3.4e38f; //Sentinel
//
do
{
    while(((BVHNODELEAF&)bspNodes[node]).type >= 0)
    {
        //Split-Dimension (x|y|z)
        U32 proj = ((BVHNODELEAF&)bspNodes[node]).type & 3;
```

FIG. 17B-2

```
U32 leftside = ((((BVHNODELEAF&)bspNodes[node]).type & 4)*2;
//sizeof(BVHNODELEAF)=8 float dist = ((((BVHNODELEAF&)bspNodes[node]).split
    - ray.from[proj])*ray.inv_d[proj];

node = ((((BVHNODELEAF&)bspNodes[node]).type & (~7)) | whatnode[proj];

if(leftside != whatnode[proj])
{
    if(dist >= tnear)
    {
        bspStackNear[current_bspStack] = tnear;
        bspStackNode[current_bspStack] = node ^ sizeof(BVHNODELEAF);
        bspStackFar[current_bspStack] = ray.tfar;

//only "put on stack"(inc) if not an empty leaf
        current_bspStack += ((((BVHNODELEAF&)bspNodes[node
            ^ sizeof(BVHNODELEAF)]).type
            & (int)((((BVHNODELEAF&)bspNodes[node
```

FIG. 17B-3

```
            ^ sizeof(BVHNODELEAF)]).endItems-1)) >= 0);
        ray.tfar = MIN(ray.tfar,dist);
      }
      else
        node ^= sizeof(BVHNODELEAF);
    }
    else
```

```
if(dist <= ray.tfar)
{
    if(((((BVHNODELEAF&)bspNodes[node]).type
      & (int)(((BVHNODELEAF&)bspNodes[node]).endItems-1)) >= 0)
    {
        bspStackNear[current_bspStack] = MAX(tnear,dist);
        bspStackNode[current_bspStack] = node ^ sizeof(BVHNODELEAF);
        bspStackFar[current_bspStack]  = ray.tfar;

current_bspStack++;
    }
    else //empty leaf
    {
        tnear = MAX(tnear,dist);
        node ^= sizeof(BVHNODELEAF);
    }
}
```

FIG. 17C-2

```
//
//Faces-Intersect
//
U32 *idx = bspFaces + (((BVHNODELEAF&)bspNodes[node]).type & 0x7FFFFFFF);

for(U32 ii = ((BVHNODELEAF&)bspNodes[node]).endItems; ii != 0; ii--,idx++)
{
    Intersection ri;
    ri.tri_index = (*idx) & ((1<<29)-1);
    U32 ofs      = (bspFaces[ri.tri_index]>>29) & 3;

ri.tfar = (triData[ri.tri_index].d - ray.from[ofs]
            - triData[ri.tri_index].n.u*ray.from[PlusOneMod3[ofs]]
            - triData[ri.tri_index].n.v*ray.from[PlusOneMod3[ofs+1]])
            / (ray.d[ofs] + triData[ri.tri_index].n.u*ray.d[PlusOneMod3[ofs]]
            + triData[ri.tri_index].n.v*ray.d[PlusOneMod3[ofs+1]]);
```

FIG. 17C-3

```
if(uintCast(ri.tfar)-1 > uintCast(result.tfar)) //-1 for +0.0f
    continue;

float h1 = ri.tfar*ray.d[PlusOneMod3[ofs]]
    + ray.from[PlusOneMod3[ofs]]    + triData[ri.tri_index].p0.u;
float h2 = ri.tfar*ray.d[PlusOneMod3[ofs+1]]
    + ray.from[PlusOneMod3[ofs+1]] + triData[ri.tri_index].p0.v;

float u = h1*triData[ri.tri_index].e[0].v - h2*triData[ri.tri_index].e[0].u;
float v = h2*triData[ri.tri_index].e[1].u - h1*triData[ri.tri_index].e[1].v;
float uv = u+v;
if((uintCast(u) | uintCast(v) | uintCast(uv)) > 0x40000000)
    continue;
```

FIG. 17D-1

```
    result = ri;
}
do{}while(result.tfar < bspStackNear[--current_bspStack]);

if(current_bspStack == 0)
    return result;

tnear = bspStackNear[current_bspStack];
node  = bspStackNode[current_bspStack];
ray.tfar = MIN(result.tfar,bspStackFar[current_bspStack]);
}while(true);
```

FIG. 17D-2

```
typedef ALIGN(4) struct \\ example encoding
{
  int type;
  //sign bit=LEAF,
  //lowest 2 bits=PROJECTION_AXIS,
  //else bits=index of BVH or triangles
  union
  {
    U32 endItems;     //NODE: number of tri's
    float splitlr[4];
  };
}BVHNODELEAF;
```

```
Intersection BVH::Intersect(Ray &ray)
{
    //Optimized inverse calculation (saves 2 of 3 divisions)
    float inv_tmp = (ray.d.dx*ray.d.dy)*ray.d.dz;
    if((uintCast(inv_tmp)&0x7FFFFFFF) > uintCast(DIV_EPSILON))
    {
        inv_tmp = 1.0f / inv_tmp;

ray.inv_d.dx = (ray.d.dy*ray.d.dz)*inv_tmp;
        ray.inv_d.dy = (ray.d.dx*ray.d.dz)*inv_tmp;
        ray.inv_d.dz = (ray.d.dx*ray.d.dy)*inv_tmp;
    }
    else
    {
```

```
ray.inv_d.dx = ((uintCast(ray.d.dx)&0x7FFFFFFF) > uintCast(DIV_EPSILON)) ?
    (1.0f / ray.d.dx) : INVDIR_LUT[uintCast(ray.d.dx) >> 31];
ray.inv_d.dy = ((uintCast(ray.d.dy)&0x7FFFFFFF) > uintCast(DIV_EPSILON)) ?
    (1.0f / ray.d.dy) : INVDIR_LUT[uintCast(ray.d.dy) >> 31];
ray.inv_d.dz = ((uintCast(ray.d.dz)&0x7FFFFFFF) > uintCast(DIV_EPSILON)) ?
    (1.0f / ray.d.dz) : INVDIR_LUT[uintCast(ray.d.dz) >> 31];
}

Intersection result;
result.tfar = ray.tfar;
result.tri_index = -1;

//
//BBox-Check
//
float tnear = 0.0f;
worldBBox.Clip(ray,tnear);
if(uintCast(ray.tfar) == 0x7F7843B0)
    return(result);
```

FIG. 20A-2

```
//
U32 current_bspStack = 1; //wegen empty stack case == 0
U32 node = 0;

//
//BSP-Traversal
//
const U32 whatnodelr[3] = {(uintCast(ray.inv_d.dx)>>31),
                           (uintCast(ray.inv_d.dy)>>31),
                           (uintCast(ray.inv_d.dz)>>31)};

const U32 whatnode[3] = {whatnodelr[0] * sizeof(BVHNODELEAF),
                         whatnodelr[1] * sizeof(BVHNODELEAF),
                         whatnodelr[2] * sizeof(BVHNODELEAF)};

U32   bspStackNode[128];
float bspStackFar[128];
float bspStackNear[128];
```

FIG. 20A-3

```
bspStackNear[0] = -3.4e38f; //Sentinel (necessary for StackPops)
do
{
    //Ist Node ein Leaf (type<0) oder nur ne Verzweigung (type>=0)
    while(((BVHNODELEAF&)bspNodes[node]).type >= 0)
    {
        //Split-Dimension (x|y|z)
        U32 proj = ((BVHNODELEAF&)bspNodes[node]).type & 3;

float distff = (((BVHNODELEAF&)bspNodes[node]).splitlr[3-whatnodelr[proj]]
                        - ray.from[proj])*ray.inv_d[proj];
        if(distff < tnear)
            goto stackPop;

float distn = (((BVHNODELEAF&)bspNodes[node]).splitlr[whatnodelr[proj]]
                       - ray.from[proj])*ray.inv_d[proj];
        float distf = (((BVHNODELEAF&)bspNodes[node]).splitlr[whatnodelr[proj]-1]
                       - ray.from[proj])*ray.inv_d[proj];
```

FIG. 20B-1

```
U32 oldnode = node;

node = ((BVHNODELEAF&)bspNodes[node]).type - proj;

if(tnear <= distn)
{
    float distnn = (((BVHNODELEAF&)bspNodes[oldnode]).splitlr[3-(whatnodelr[proj]^1)]
                - ray.from[proj])*ray.inv_d[proj];

if(distnn > ray.tfar)
        goto stackPop;

tnear = MAX(tnear,distnn);

if(ray.tfar >= distf)
    {
        bspStackNear[current_bspStack] = MAX(tnear,distf);
        bspStackNode[current_bspStack] = node + (whatnode[proj]~sizeof(BVHNODELEAF));
        bspStackFar[current_bspStack]  = MIN(ray.tfar,distff);

current_bspStack++;
    } node += whatnode[proj];
    ray.tfar = MIN(ray.tfar,distn);
}
```

FIG. 20B-2

```
else
    if(ray.tfar >= distf)
    {
        tnear = MAX(tnear,distf);
        ray.tfar = MIN(ray.tfar,distf);
        node += whatnode[proj]*sizeof(BVHNODELEAF);
    }
    else
        goto stackPop;
```

FIG. 20C-1

```
//
//Faces-Intersect
//

//Pointer auf Faces
U32 *idx = bspFaces + (((BVHNODELEAF&)bspNodes[node]).type & 0x7FFFFFFF);

U32 ii = ((BVHNODELEAF&)bspNodes[node]).endItems;

do
{
    Intersection ri;
    ri.tri_index = (*idx) & ((1<<29)-1);
    U32 ofs = (bspFaces[ri.tri_index]>>29) & 3;

ii--;
    idx++;

ri.tfar = (triData[ri.tri_index].d - ray.from[ofs] - triData[ri.tri_index].n.u
        *ray.from[PlusOneMod3[ofs]] - triData[ri.tri_index].n.v*ray.from[PlusOneMod3[ofs+1]])
        / (ray.d[ofs] + triData[ri.tri_index].n.u*ray.d[PlusOneMod3[ofs]]
        + triData[ri.tri_index].n.v*ray.d[PlusOneMod3[ofs+1]]);

if(uintCast(ri.tfar)-1 > uintCast(result.tfar))
        continue;
```

FIG. 20C-2

```
float h1 = ri.tfar*ray.d[PlusOneMod3[ofs]]    + ray.from[PlusOneMod3[ofs]]
+ triData[ri.tri_index].p0.u;
float h2 = ri.tfar*ray.d[PlusOneMod3[ofs+1]] + ray.from[PlusOneMod3[ofs+1]]
+ triData[ri.tri_index].p0.v;

float u = h1*triData[ri.tri_index].e[0].v - h2*triData[ri.tri_index].e[0].u;
float v = h2*triData[ri.tri_index].e[1].u - h1*triData[ri.tri_index].e[1].v;
float uv = u+v;
if((uintCast(u) | uintCast(v) | uintCast(uv)) > 0x40000000)
            continue;

result = ri;
    }while(ii != 0);

stackPop:
    do{}while(result.tfar < bspStackNear[--current_bspStack]);
    if(current_bspStack == 0)
        return result;

tnear = bspStackNear[current_bspStack];
    node  = bspStackNode[current_bspStack];
    ray.tfar = MIN(result.tfar,bspStackFar[current_bspStack]);
  }while(true);
}
```

FIG. 20C-3

VARIANT RECORD DEFINITION

```
typedef struct
{
    int Index; //lowest bits: axis (00,01,10) or leaf (11)
    union
    {
        int Items; //leaf only
        float Clip[2]; //internal node only
    };
} BIH_Node;
```

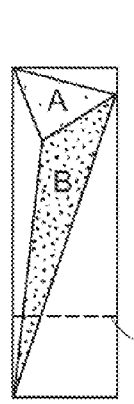
FIG. 33A
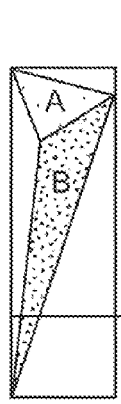
FIG. 33B
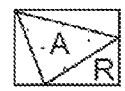
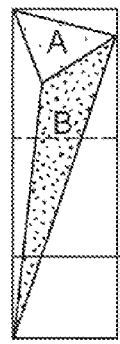
FIG. 33C
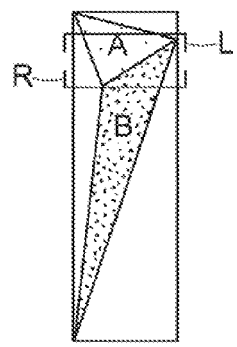
FIG. 33D
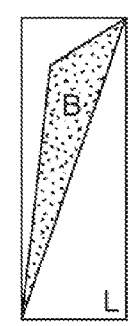
FIG. 33E

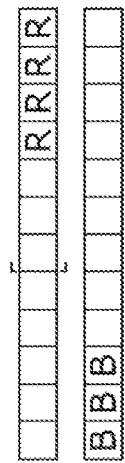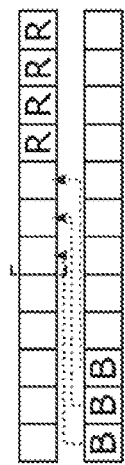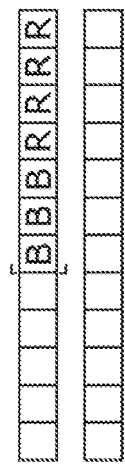
FIG. 36

FIG. 37A

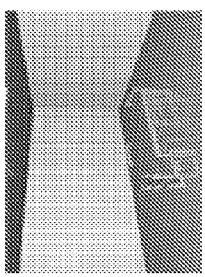
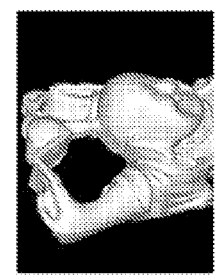
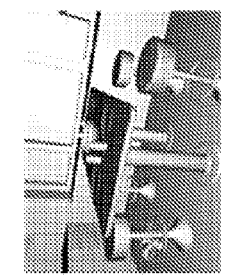

| Shirley Scene 6 | InView | WH06 | kD | BIH | on demand |
|---|---|---|---|---|---|
| Triangles | 1.380 | n.a. | 804 | dto. | dto. |
| Triangle memory | 66.240 | n.a. | 28.944 | dto. | dto. |
| Acc. Data memory | 115.312 | n.a. | 55.188 | 12.828 | 11.972 |
| FPS | 5,02 | n.a. | 11,17 | 11,99 | n.a. |
| Time to image (msec) | 199 | n.a. | 89 | 83 | 87 |
| Stanford Dragon | InView | WH06 | kD | BIH | on demand |
| Triangles | 863.334 | 863k | 871.414 | dto. | dto. |
| Triangle memory | 41.440.032 | n.a. | 31.370.904 | dto. | dto. |
| Acc. Data memory | 26.207.404 | n.a. | 24.014.264 | 13.466.176 | 5.175.936 |
| FPS | 2,49 | n.a. | 5,92 | 5,98 | n.a. |
| Time to image (msec) | 44.500 | 23.900 | 3.106 | 1.557 | 1.102 |
| Stanford Buddha | InView | WH06 | kD | BIH | on demand |
| Triangles | 987.361 | 1.07M | 1.087.716 | dto. | dto. |
| Triangle memory | 47.393.328 | n.a. | 39.157.776 | dto. | dto. |
| Acc. Data memory | 32.518.372 | n.a. | 30.566.796 | 17.344.944 | 2.719.628 |
| FPS | 3,13 | n.a. | 7,55 | 7,41 | n.a. |
| Time to image (msec) | 53.819 | 32.200 | 3.695 | 1.837 | 705 |
| BART Tra.fo. Kitchen | InView | WH06 | kD | BIH | on demand |
| Triangles | 111.116 | n.a. | 110.561 | dto. | dto. |
| Triangle memory | 5.333.568 | n.a. | 3.980.196 | dto. | dto. |
| Acc. Data memory | 9.989.240 | n.a. | 5.812.276 | 1.792.880 | 1.145.972 |
| FPS | 1,77 | n.a. | 4,65 | 1,76 | n.a. |
| Time to image (msec) | 16.565 | n.a. | 871 | 724 | 770 |

940

| Ward Conference | InView | WH06 | kD | BIH | on demand |
|---|---|---|---|---|---|
| Triangles | 964.471 | n.a. | 1.064.498 | dto. | dto. |
| Triangle memory | 46.294.608 | n.a. | 38.321.928 | dto. | dto. |
| Acc. Data memory | 101.627.372 | n.a. | 84.222.332 | 16.007.852 | 1.331.780 |
| FPS | 2,9 | n.a. | 9,55 | 4,12 | n.a. |
| Time to image (msec) | 171.344 | n.a. | 11.204 | 1.523 | 630 |
| Stanford Bunny | InView | WH06 | kD | BIH | on demand |
| Triangles | 70.027 | 69k | 69.451 | dto. | dto. |
| Triangle memory | 3.361.296 | n.a. | 2.500.236 | dto. | dto. |
| Acc. Data memory | 6.186.288 | n.a. | 4.352.248 | 974.080 | 504.744 |
| FPS | 3,53 | n.a. | 9,9 | 10,2 | n.a. |
| Time to image (msec) | 9.283 | 4.800 | 445 | 176 | 165 |
| Car 1 | InView | WH06 | kD | BIH | on demand |
| Triangles | 313.460 | n.a. | 312.888 | dto. | dto. |
| Triangle memory | 15.046.080 | n.a. | 11.263.968 | dto. | dto. |
| Acc. Data memory | 26.785.196 | n.a. | 15.093.468 | 4.989.168 | 1.271.168 |
| FPS | 3,15 | n.a. | 7,97 | 6,99 | n.a. |
| Time to image (msec) | 39.817 | n.a. | 1.656 | 581 | 371 |
| Blender Suzanne | InView | WH06 | kD | BIH | on demand |
| Triangles | 252.436 | n.a. | 251.904 | dto. | dto. |
| Triangle memory | 12.116.928 | n.a. | 9.068.544 | dto. | dto. |
| Acc. Data memory | 12.508.532 | n.a. | 12.139.800 | 3.707.292 | 2.083.020 |
| FPS | 3,84 | n.a. | 7,35 | 8,31 | n.a. |
| Time to image (msec) | 18.260 | n.a. | 1.229 | 448 | 359 |

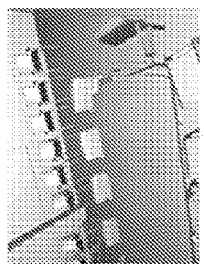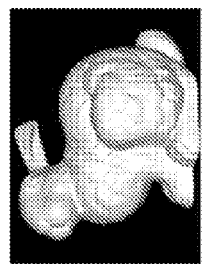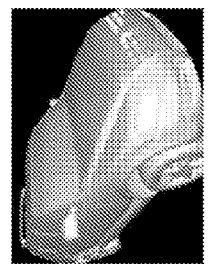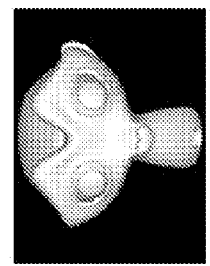

FIG. 37B

| Car 2 | kD | BIH | on demand |
|---|---|---|---|
| Triangles | 542.108 | dto. | dto. |
| Triangle memory | 19.515.888 | dto. | dto. |
| Acc. Data memory | 23.756.320 | 8.807.636 | 8.132.108 |
| FPS (1st Pass) | 0,46 | 0,44 | n.a. |
| Time to image (msec) | 4.595 | 2.944 | 2.830 |

| BART Museum (10k) | kD | BIH | on demand |
|---|---|---|---|
| Triangles | 10.412 | dto. | dto. |
| Average FPS (Primary Ray) | 3,48 | 3,34 | 3,26 |
| Rendering time for complete animation (msec) | 86.286 | 89.935 | 92.327 |
| Average FPS (3,917 Rays) | 0,91 | 0,79 | 0,78 |
| Rendering time for complete animation (msec) | 329.060 | 381.754 | 388.114 |

| BART Museum (75k) | kD | BIH | on demand |
|---|---|---|---|
| Triangles | 75.884 | dto. | dto. |
| Average FPS (Primary Ray) | 0,39 | 2,04 | 2,08 |
| Rendering time for complete animation (msec) | 776.568 | 147.002 | 144.444 |
| Average FPS (4,024 Rays) | 0,28 | 0,49 | 0,48 |
| Rendering time for complete animation (msec) | 1.057.259 | 614.503 | 620.728 |
| BART Kitchen | kD | BIH | on demand |
| Triangles | 110.561 | dto. | dto. |
| Average FPS | 1,45 | 1,96 | 2,17 |
| Rendering time for complete animation (msec) | 552.207 | 407.460 | 368.903 |
| BART Robots | kD | BIH | on demand |
| Triangles | 71.708 | dto. | dto. |
| Average FPS | 1,51 | 1,41 | 1,49 |
| Rendering time for complete animation (msec) | 530.561 | 567.988 | 537.974 |
| Utah Fairy Forest | kD | BIH | on demand |
| Triangles | 174.117 | dto. | dto. |
| Average FPS | 0,78 | 1,79 | 1,95 |
| Rendering time for complete animation (msec) | 26.780 | 11.695 | 10.771 |

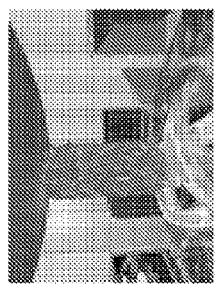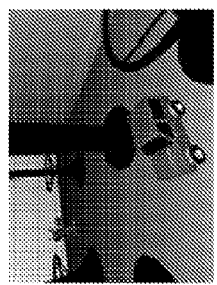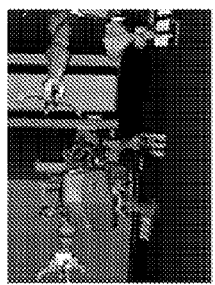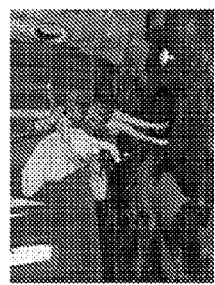

FIG. 39B

| Boeing | View 1 | View 2 | View 3 | View 4 | View 5 | View 6 |
|---|---|---|---|---|---|---|
| Acc. Data | 326.447.848 | 12.748.120 | 15.471.692 | 259.261.404 | 50.963.768 | 324.602.460 |
| FPS | 0,26 | 0,13 | 0,13 | 0,38 | 0,11 | 0,34 |
| Total | 8 min. | 133 sec. | 153 sec. | 270 sec. | 118 sec. | 252 sec. |

970

| Boeing | View 1 | View 2 | View 3 | View 4 | View 5 | View 6 |
|---|---|---|---|---|---|---|
| Triangles | 349.569.456 | dto. | dto. | dto. | dto. | dto. |
| Peak memory | 1.075.418.112 | 538.697.728 | 1.054.035.968 | 1.267.494.912 | 1.078.779.904 | 1.190.248.448 |
| Rendering time | 5 min. 19 sec. | 33 sec. | 68 sec. | 6 min. 45 sec. | 95 sec. | 5 min. 57 sec. |

980

| Stanford Buddha | WH06 | BIH+Bucket | BIH |
|---|---|---|---|
| Triangles | 1.07M | 1.087.716 | dto. |
| FPS | n.a. | 94% | 100% |
| Construction (msec) | 32.200 | 765 | 1.703 |
| Stanford Dragon | WH06 | BIH+Bucket | BIH |
| Triangles | 863k | 871.414 | dto. |
| FPS | n.a. | 93% | 100% |
| Construction (msec) | 23.900 | 657 | 1.390 |
| Stanford Thai Statue | WH06 | BIH+Bucket | BIH |
| Triangles | 10M | 10.000.000 | dto. |
| FPS | n.a. | 94% | 100% |
| Construction (msec) | 61.000 | 7.812 | 17.484 |

| Ward Conference | | BIH+Bucket | BIH |
|---|---|---|---|
| Triangles | | 1.064.498 | dto. |
| FPS | | 96% | 100% |
| Construction (msec) | | 937 | 1.281 |
| Car 1 | | BIH+Bucket | BIH |
| Triangles | | 312.888 | dto. |
| FPS | | 100% | 100% |
| Construction (msec) | | 250 | 438 |
| UNC Power Plant | | BIH+Bucket | BIH |
| Triangles | | 12.748.510 | dto. |
| FPS | | 79% | 100% |
| Construction (msec) | | 11.609 | 20.282 |

FIG. 42

Processor 102 hierarchical ray tracing acceleration data structure construction module, 122 module for generating tree structure nodes utilizing bounding interval hierarchy based on defining axis-aligned scene bounding box and parallel planes to partition set of objects in a scene into left objects and right objects; match split planes to object bounding boxes; the planes are perpendicular to a selected one of x, y, or z-axes; each object in an image is classified either left or right based on a left/right selection criterion, e.g., either left or right depending on which side of the plane it extends most; two splitting plane values of the child nodes are determined by the maximum and minimum coordinate of the left and right objects, respectively);

(given bounding box and the selected axis, left child L results from replacing a maximum value of left object's coordinates along selected axis by first plane, and right child R results from replacing minimum value of right object's coordinates by the second plane, wherein any resulting zero volumes are used to represent empty children)

(splitting planes determined by: selecting candidate splitting planes by hierarchically subdividing an axis-aligned scene bounding box along the longest side in the middle, wherein all candidate splitting planes form a regular grid; if candidate plane is outside the bounding box of a volume element to subdivide, continuing with candidate planes from the half where the volume element resides)

(recursively partitions bounding box into object bounding boxes; if split plane candidate separates objects without overlap, fits resulting split planes to objects on left and right, thereby maximizing empty space; terminates recursion when no more than a predetermined number of objects remains)

(computes scene bounding box and average object size to determine resolution of grid for partitioning space, or use user-specified resolution, allocate counter for each grid cell, initializing all counters, each corresponding to a respective grid cell, to zero; select point for each object to increment respective counter for grid cell containing selected point, transform counter values to offset values by replacing each counter value by the sum of values of all previous counters; allocate global object index array, use offset values to sort objects into buckets, using for each respective object the corresponding point selected for incrementing counter for grid cell containing that point, and for each bucket, computing the bounding box of objects it contains.)

FIG. 45

Disk or other storage, 120 hierarchical ray tracing acceleration data structure construction module, 124 module for generating tree structure nodes utilizing bounding interval hierarchy based on defining axis-aligned scene bounding box and parallel planes to partition set of objects in a scene into left objects and right objects; match split planes to object bounding boxes; the planes are perpendicular to a selected one of x, y, or z-axes; each object in an image is classified either left or right based on a left/right selection criterion, e.g., either left or right depending on which side of the plane it extends most; two splitting plane values of the child nodes are determined by the maximum and minimum coordinate of the left and right objects, respectively):

(given bounding box and the selected axis, left child L results from replacing a maximum value of left object's coordinates along selected axis by first plane, and right child R results from replacing minimum value of right object's coordinates by the second plane, wherein any resulting zero volumes are used to represent empty children)

(splitting planes determined by: selecting candidate splitting planes by hierarchically subdividing an axis-aligned scene bounding box along the longest side in the middle, wherein all candidate splitting planes form a regular grid; if candidate plane is outside the bounding box of a volume element to subdivide, continuing with candidate planes from the half where the volume element resides)

(recursively partitions bounding box into object bounding boxes; if split plane candidate separates objects without overlap, fits resulting split planes to objects on left and right, thereby maximizing empty space; terminates recursion when no more than a predetermined number of objects remains)

(computes scene bounding box and average object size to determine resolution of grid for partitioning space, or use user-specified resolution, allocate counter for each grid cell, initializing all counters, each corresponding to a respective grid cell, to zero; select point for each object to increment respective counter for grid cell containing selected point, transform counter values to offset values by replacing each counter value by the sum of values of all previous counters; allocate global object index array, use offset values to sort objects into buckets, using for each respective object the corresponding point selected for incrementing counter for grid cell containing that point, and for each bucket, computing the bounding box of objects it contains.)

FIG. 46

| ... | references to objects | free memory | ... |
|---|---|---|---|
| | ↓ $m_b$ | ↓ $m_b + n$ | ↓ $m_e$ |

FIG. 47A

| ... | left | unclassified | free memory | left and right | right | ... |
|---|---|---|---|---|---|---|
| | ↓ $m_b$ | ↓ $m_b + l$ | ↓ $m_b + n$ | ↓ $m_b + lr$ | ↓ $m_b + r$ | ↓ $m_e$ |

FIG. 47B

| ... | 2 nodes | memory for left child | memory for right child | ... |
|---|---|---|---|---|
| | ↓ $m_b$ | ↓ $m'_b$ | ↓ $m'_b + \lfloor p \cdot (m_e - m'_b) \rfloor$ | ↓ $m_e$ |

FIG. 47C

| ... | • | • | left subtree | • | right subtree | ... |
|---|---|---|---|---|---|---|

FIG. 47D

TERMINATION CRITERION AND MEMORY SCHEDULING HEURISTIC
MODULE, 2500:

---

SUBMODULE FOR EXTENDING ARGUMENT LIST OF
CONSTRUCTION PROCEDURE, PASSING ALONG CONTIGUOUS
PIECE OF MEMORY ALONG WITH SIZE, AND CONSTRUCTING LEAF
NODE IF TWO RESULTING REFERENCE LISTS PLUS SIZE OF TREE
NODE DO NOT FIT INTO GIVEN MEMORY BLOCK, 2501

SUBMODULE FOR PREDICTING MEMORY CONSUMPTION OF NEW
SUBTREES AND ACCORDINGLY DISTRIBUTING AVAILABLE
MEMORY TO LEFT AND RIGHT CHILDREN WHILE PROCEEDING
RECURSIVELY, 2502

SUBMODULE FOR PROVIDING ADDITIONAL MEMORY ALLOCATION
AND OTHER DESCRIBED FEATURES, 2503

FIG. 51

TERMINATING SPATIAL PARTITION HIERARCHIES BY A PRIORI BOUNDING MEMORY

CROSS-REFERENCE TO RELATED APPLICATIONS

This application for patent claims the priority benefit of U.S. Provisional Patent Application Ser. Nos. 60/886,197 and 60/910,940, filed respectively on Jan. 23, 2007, and Apr. 10, 2007.

The present application is a Continuation-in-Part of U.S. patent application Ser. No. 11/737,424, filed on Apr. 19, 2007, which claims the priority benefit of U.S. Provisional Patent Application Ser. No. 60/793,063, filed on Apr. 19, 2006.

U.S. patent application Ser. No. 11/737,424 is in turn a Continuation-In-Part of U.S. patent application Ser. No. 11/474,517, entitled "Real-Time Precision Ray Tracing"), filed Jun. 23, 2006.

U.S. patent application Ser. No. 11/474,517 claims the priority benefit of U.S. Provisional Patent Application Ser. No. 60/693,231, filed Jun. 23, 2005, and is in turn a Continuation-In-Part of U.S. patent application Ser. No. 10/299,574, filed Nov. 19, 2002.

U.S. patent application Ser. No. 10/299,574 is in turn a Continuation-In-Part of U.S. Ser. No. 09/884,861, filed Jun. 19, 2001, which claims the priority benefit of U.S. Provisional Patent Application Ser. No. 60/265,934, filed Feb. 1, 2001, and U.S. Provisional Patent Application Ser. No. 60/212,286, filed Jun. 19, 2000. Each of these noted patent applications, including the provisional and non-provisional applications, is incorporated by reference herein as if set forth in its entirety.

This application for patent also incorporates by reference herein, as if set forth in their entireties herein, the following:

U.S. patent application Ser. No. 10/299,958 filed Nov. 19, 2002 entitled "System and Computer-Implemented Method for Evaluating Integrals Using a Quasi-Monte Carlo Methodology in Which Sample Points Represent Dependent Samples Generated Using a Low-Discrepancy Sequence".

U.S. patent application Ser. No. 11/619,275 filed Jan. 3, 2007 entitled "Computer Graphics Methods and Systems Using Quasi-Monte Carlo Methodology."

FIELD OF THE INVENTION

The present invention relates generally to methods and systems for image rendering in and by digital computing systems, such as for motion pictures and other applications, and in particular, relates to methods, systems, devices, and computer software for improving performance in ray tracing systems and other computer graphics systems and terminating spatial partition hierarchies by a priori bounding.

BACKGROUND OF THE INVENTION

The term "ray tracing" describes a technique for synthesizing photorealistic images by identifying all light paths that connect light sources with cameras and summing up these contributions. The simulation traces rays along the line of sight to determine visibility, and traces rays from the light sources in order to determine illumination.

Ray tracing has become mainstream in motion pictures and other applications. However, current ray tracing techniques suffer from a number of known limitations and weaknesses, including numerical problems, limited capabilities to process dynamic scenes, slow setup of acceleration data structures, and large memory footprints. Thus, current ray tracing techniques lack the capability to deal efficiently with fully animated scenes, such as wind blowing through a forest or a person's hair. Overcoming the limitations of current ray tracing systems would also enable the rendering of, for example, higher quality motion blur in movie productions.

Current attempts to improve the performance of ray tracing systems have fallen short for a number of reasons. For example, current real-time ray tracing systems generally use 3D-trees as their acceleration structure, which are based on axis-aligned binary space partitions. Because the main focus of these systems is on rendering static scenes, they typically fail to address the significant amount of setup time required to construct the required data structures in connection with fully animated scenes. Along these lines, one manufacturer has improved real-time ray tracing by building efficient 3D-trees and developing an algorithm able to shorten the time needed to traverse the tree. However, it can be shown that the expected memory requirement for the system increases quadratically with an increase in the number of objects to be ray-traced.

Another manufacturer has designed a ray tracing integrated circuit that uses bounding volume hierarchies to improve system performance. However, it has been found that the architecture's performance breaks down if too many incoherent secondary rays are traced.

In addition, attempts have made to improve system performance by implementing 3D-tree traversal algorithms using field-programmable gate arrays (FPGAs). The main increase in processing speed in these systems is obtained by tracing bundles of coherent rays and exploiting the capability of FPGAs to perform rapid hardwired computations. The construction of acceleration structures has not yet been implemented in hardware. The FPGA implementations typically use floating point techniques at reduced precision.

Photorealistic image synthesis involves identifying all light paths that connect simulated lights with simulated cameras, i.e., connecting light sources and pixels by light transport paths, and summing up these contributions. Therefore, the simulation traces rays along the line of sight to determine visibility, and traces rays from the light sources in order to determine illumination. Vertices along these transport paths are found by tracing straight rays from one point of interaction to the next one. Beyond this, many other direct simulation methods in scientific computing rely on tracing particles along straight lines. Usually, a considerable part of the total computation time is spent on ray tracing.

The time spent for tracing many rays can be dramatically shortened by constructing an auxiliary acceleration data structure that allows for the efficient exclusion of large portions of the scene to be intersected with the rays instead of intersecting each ray with all objects in a scene.

The efficiency of ray tracing techniques depends heavily on how the search structures are built. Aside from various existing heuristics, memory management is substantially always an issue. While hierarchically partitioning the list of objects allows one to predict the memory footprint, these techniques based on bounding volumes can suffer from inefficiencies caused by large objects and the convexity of the applied bounding volumes.

Accordingly, it would be desirable to provide methods, systems, devices and computer program products that enable the efficient prediction of such multiplicity and of the memory footprint, and the reduction of the memory footprint, all while enabling rapid processing and maximizing frame rates.

SUMMARY OF THE INVENTION

The present invention provides systems, methods and computer program code (software) products suitable for use in or with, or implementation in, existing computer graphics systems that are operable to render images for storage (such as on a magnetic disk or other storage element) or for display on a human-perceptible display element such as an LCD or CRT display or movie screen. In such systems, the display element, if used, is typically operable to generate a human-perceptible display of a scene in accordance with pixel values generated by the computer graphics system; and in many such systems, the computer graphics system is operable to construct ray tracing data tree structures in memory, wherein the constructing of tree structures includes any of classification and sorting.

One aspect or practice of the invention comprises:

Utilizing a termination criterion and memory scheduling heuristic to enable construction of an efficient ray tracing acceleration data tree structure in a given, a priori fixed memory block, the termination criterion and memory scheduling heuristic comprising:

transmitting, for use in constructing the acceleration data tree structure, a contiguous portion of memory along with a value representative of the size of the contiguous portion of memory, and instead of terminating the hierarchy by controlling a maximum depth of the tree, constructing a leaf node, if two reference lists resulting from a classification step plus the size of a tree node do not fit into the given memory block; and predicting the memory consumption of the two new subtrees in the sorting and accordingly distributing the available memory to the left and right children when continuing recursively, the predicting comprising computing a prediction p∈[0, 1], which schedules a fraction of memory scheduled for the left child, the remainder of the memory being scheduled for the right child, such that depth is implicitly controlled by the scheduled memory, and the scheduling allows local adaptation of depth.

Another aspect of the invention comprises utilizing, for branches with more than two children, a prediction $p_i \in [0, 1]$ for each child i with the condition that all $p_i$ sum up to one.

A further aspect of the invention comprises utilizing the relative frequency expression:

$$p_i = \frac{e_i}{\sum_{j=1}^{m} e_j}$$

determined by the integers $e_i$ of objects to be sorted into the i-th child of an m-ary node, respectively, to predict the fraction of memory to be scheduled for the i-th subtree.

Another aspect of the invention comprises allocating, before calling the construction routine, a memory block in which a root node along with the object references is stored in sequential order.

Still another aspect of the invention comprises, for a next unclassified object, determining whether it belongs to the left, right, or both children in the subtree.

A further aspect of the invention comprises the following:

if a next unclassified object belongs to the left, incrementing the corresponding one variable;

if it belongs to the right, moving the last element of the left-and-right block to the front to make space for the new element on the right, and moving the last unclassified element to the vacancy left by the element classified right; and if it belongs to both children in the subtree, replicating a reference, moving the current element to the front of the left-and-right-block, moving the last unclassified element to the just created vacant memory position, and if not enough memory is available for replication, creating a leaf node by copying back the right block and left-and-right block.

Another aspect of the invention comprises utilizing an in-place sorting procedure.

A further aspect of the invention comprises creating the children only if there is sufficient memory for two nodes and the total number of references including the replicated ones; and wherein, if some elements from the left list have to be moved to its end to make space for the nodes, and the left-and-right block has to be copied to the end of the left list, then moving the memory block of the left-and-right with the only-right items to an offset location, the offset of memory scheduled for the right subtree being calculated by the expression:

$$m_b' + \lfloor p \cdot (m_e - m_b') \rfloor.$$

A further aspect of the invention comprises utilizing prediction p as an upper bound on memory scheduled to the left child and linearly writing the tree data structure into memory.

Still another aspect of the invention comprises constructing bounding volume hierarchies by first sorting into a left-and-right memory block all objects that overlap a potential splitting plane; and scanning all objects and determining, based on the scanning, whether all objects in the left-and-right memory block are to be appended to either a left memory block or a right memory block.

Another aspect of the invention comprises enabling construction on demand.

A further aspect of the invention comprises: where a ray from a simulated light source illuminating a scene traverses a portion of the scene, constructing only a selected number of levels of the hierarchy; and when a next ray intersects the same parts of the hierarchy, again constructing a selected number of levels of the hierarchy, so that the hierarchy is built more deeply in regions of the scene traversed by more rays.

Another aspect of the invention comprises marking the objects, or associating the objects with a priority queue, in accordance with a least-recently used strategy; and separating least-recently used objects by selecting suitable splitting planes.

Another aspect of the invention comprises utilizing a scheduling strategy that counts only more recently used objects; and inferring information about more-recently used objects by utilizing intersection information from a previous image frame.

A further aspect of the invention comprises first computing an image in low resolution and then computing the image at least once again at one or more higher resolution levels.

Yet another aspect of the invention comprises maximizing frame rate by measuring a total time to image and then dynamically adjusting the size of the provided memory block from frame to frame as necessary.

Another aspect of the invention comprises skipping pointers that are followed by one subtree and pointing to the next subtree, and wherein, while a leaf node is directly followed by references to objects or the objects themselves, an inner node is followed by the splitting plane offset.

Still another aspect of the invention comprises reducing page thrashing by storing the upper part of the inner nodes of the spatial hierarchy in a part of memory that permanently remains in main memory, and wherein the objects in a top level tree can be trees themselves that can be flushed to disk and rebuilt or generated on demand.

A further aspect of the invention comprises utilizing two separate memory blocks for, respectively, an upper part and lower parts of the spatial hierarchy, and wherein the termination criterion fits the upper part of the hierarchy into an a prior fixed first memory block, and the lower parts are constructed on demand in the second block of memory. The least recently used parts of the hierarchy can be flushed to free memory space.

Another aspect of the invention comprises implementing directed acyclic scene graphs in a similar manner.

Another aspect of the invention comprises selecting a memory footprint n in accordance with selection criteria. The selection criteria can comprise: providing memory $n=\alpha \cdot n_t$ proportional to the number of objects to be ray traced, wherein the factor $\alpha>1$ represents the amount of allowed reference replication. The selection criteria can also, or alternatively comprise selecting $n=\beta \cdot n_r$ proportional to the number $n_r$ of rays to be shot.

Still another aspect of the invention comprises providing a hybrid hierarchical acceleration data structure.

The techniques of the invention can be applied to any hierarchical structure associated with the acceleration data tree structure. For example, the hierarchical structure can comprise any of a hierarchy of grids, octrees, or ray classifications.

In a further aspect of the invention, the split selection noted herein first attempts to divide the list of objects, unless the division is inefficient and reference replication by spatial partition becomes unavoidable, and further wherein the corresponding ray traversal distinguishes between nodes with and without reference replication.

Yet another aspect of the invention comprises utilizing the expression:

$$p = \frac{l}{l+r}$$

to predict the fraction of memory to be scheduled for the left subtree, and 1-p for the right subtree.

Another aspect of the invention comprises providing two separate memory blocks for nodes and leafs, and utilizing the methods noted above (and discussed in detail below) to fit the inner nodes of an efficient hierarchy into the a priori fixed memory block, and if the leafs do not fit into the provided memory, providing a mechanism to regenerate leafs on demand.

In another aspect of the invention, adapted for use in a computer graphics system for rendering images for display on a human-perceptible display element, the displaying comprising the display of image representations on the display element, wherein (1) the display element is operable to generate a human-perceptible display of a scene in accordance with pixel values generated by the computer graphics system, (2) the computer graphics system is operable to construct ray tracing data tree structures in memory, and (3) the constructing of tree structures includes any of classification and sorting, the invention comprises:

(A) means for utilizing a termination criterion and memory scheduling heuristic to enable construction of an efficient ray tracing acceleration data tree structure in a given, a priori fixed memory block, the means for utilizing the termination criterion and memory scheduling heuristic comprising:

(B) means for transmitting, for use in constructing the acceleration data tree structure, a contiguous portion of memory along with a value representative of the size of the contiguous portion of memory, and instead of terminating the hierarchy by controlling a maximum depth of the tree, constructing a leaf node, if two reference lists resulting from a classification step plus the size of a tree node do not fit into the given memory block; and (C) means for predicting the memory consumption of the two new sub-trees in the sorting and accordingly distributing the available memory to the left and right children when continuing recursively, the predicting comprising computing a prediction $p \in [0, 1]$, which schedules a fraction of memory scheduled for the left child, the remainder of the memory being scheduled for the right child, such that depth is implicitly controlled by the scheduled memory, and the scheduling allows local adaptation of depth.

Another aspect of the invention relates to a computer program product comprising computer program instructions encoded onto a computer-readable medium, the computer program instructions being operable within a computer graphics system for rendering images for display on a human-perceptible display element, the displaying comprising the display of image representations on the display element, wherein (1) the display element is operable to generate a human-perceptible display of a scene in accordance with pixel values generated by the computer graphics system, (2) the computer graphics system is operable to construct ray tracing data tree structures in memory, and (3) the constructing of tree structures includes any of classification and sorting, the computer program product comprising:

computer program code means, the first computer program code means comprising computer-readable instructions executable within the computer graphics system for utilizing a termination criterion and memory scheduling heuristic to enable construction of an efficient ray tracing acceleration data tree structure in a given, a priori fixed memory block, the termination criterion and memory scheduling heuristic comprising: (A) transmitting, for use in constructing the acceleration data tree structure, a contiguous portion of memory along with a value representative of the size of the contiguous portion of memory, and instead of terminating the hierarchy by controlling a maximum depth of the tree, constructing a leaf node, if two reference lists resulting from a classification step plus the size of a tree node do not fit into the given memory block; and (B) predicting the memory consumption of the two new sub-trees in the sorting and accordingly distributing the available memory to the left and right children when continuing recursively, the predicting comprising computing a prediction $p \in [0, 1]$, which schedules a fraction of memory scheduled for the left child, the remainder of the memory being scheduled for the right child, such that depth is implicitly controlled by the scheduled memory, and the scheduling allows local adaptation of depth.

These and other aspects, examples, embodiments and practices of the invention will next be described in greater detail in the following Detailed Description, along with the attached drawing figures.

BRIEF DESCRIPTION OF THE DRAWINGS

FIG. 5 shows an example of a code listing for implementing a described technique for encoding degenerate triangles.

FIG. 6 shows an example of a code listing for implementing a described technique for extending triangles for a robust intersection test.

FIGS. 7A-7D show an example of a code listing for implementing a described triangle-box intersection technique.

FIGS. 14A-14C show an example of a code listing for implementing a described technique for traversing bounding volume hierarchies.

FIGS. 15A-C show a series of diagrams illustrating a technique according to a further aspect of the invention in which a bounding box is intersected by an axis-aligned plane to define a half-space.

FIG. 16 shows an example of a code listing for implementing a described technique for encoding leaf nodes.

FIGS. 17A-D show an example of a code listing for implementing the tracing of one ray through a bounding volume hierarchy.

FIGS. 20A-C show an example of a code listing for implementing a traversal of bounding volume hierarchies using a tree built using the data structure illustrated in FIGS. 18 and 19.

FIG. 24A shows an example of a code listing for implementing a technique for defining a data structure for use with the described ray tracing techniques.

FIGS. 33A-E show the generation of children for objects A and B in the scene shown in FIG. 26.

FIGS. 35-36 show a series of array pairs illustrating a technique for in-place sorting of object indices in accordance with a further aspect of the invention.

FIGS. 37-42 show a series of tables illustrating the results of comparisons between currently used techniques and improved techniques according to the present invention.

FIG. 45 is a schematic block diagram of processing modules within a computer 102 in accordance with one process of the invention.

FIG. 46 is a schematic block diagram of software product modules within a disk (removable or non-removable) or other storage element 120 in a computer or other processing device in accordance with the invention.

FIGS. 47A-D are a series of diagrams illustrating a contiguous block of memory for a binary kd-tree according to a further aspect of the invention.

FIG. 51 shows a schematic block diagram of a processing module having submodules adapted to execute the described methods and techniques.

DETAILED DESCRIPTION OF THE INVENTION

Digital Processing Environment in which Invention can be Implemented

Figure 1:
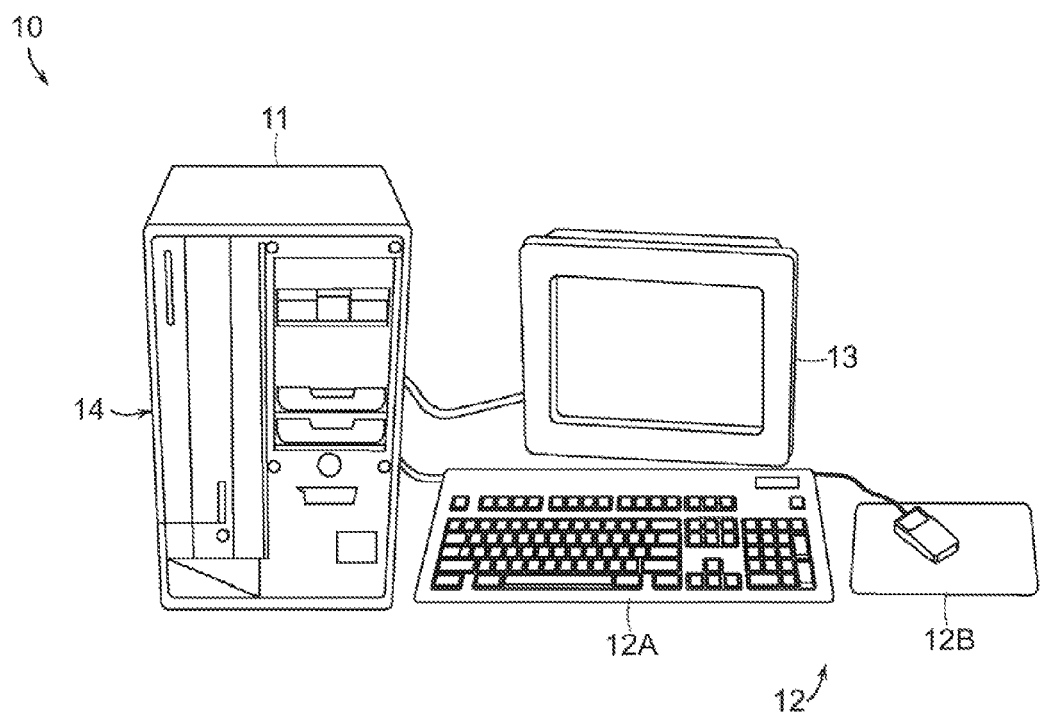
FIG. 1 shows a schematic diagram of a conventional personal computer, or like computing apparatus, in which aspects of the present invention can be deployed.

Before describing particular examples and embodiments of the invention, the following is a discussion, to be read in connection with FIGS. 1 and 2, of underlying digital processing structures and environments in which the invention may be implemented and practiced.

It will be understood by those skilled in the art that the present invention provides methods, systems, devices and computer program products that enable more efficient ray tracing and other activities in computer graphics systems, whose output is typically a human-perceptible (or digitally stored and/or transmitted) image or series of images that can comprise, for example, an animated motion picture, computer aided design representation, or other typical computer graphics output. The present invention can thus be implemented as part of the computer software or computer hardware of a computer that forms part of a computer graphics system, along with a display, user interface elements such as a keyboard, tablet and/or mouse, memory, storage, and other conventional computer graphics system components. While conventional components of such kind are well known to those skilled in the art, and thus need not be described in great detail herein, the following overview indicates how the present invention can be implemented in conjunction with such components in a computer graphics system.

More, particularly, those skilled in the art will understand that the present invention can be utilized in the generation and synthesis of images, such as for display in a motion picture or other dynamic display. The techniques described herein can be practiced as part of a computer graphics system, in which a pixel value is generated for pixels in an image. The pixel value is representative of a point in a scene as recorded on an image plane of a simulated camera. The underlying computer graphics system can be configured to generate the pixel value for an image using a selected methodology, such as that of the present invention.

The following detailed description illustrates examples of methods, structures, systems, and computer software products in accordance with these techniques. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or re-configurable hardware.

As an example, FIG. 1 attached hereto depicts an illustrative computer system 10 that can carry out such computer graphics processes. With reference to FIG. 1, the computer system 10 in one embodiment includes a processor module 11 and operator interface elements comprising operator input components such as a keyboard 12A and/or a mouse 12B (or digitizing tablet or other analogous element(s), generally identified as operator input element(s) 12) and an operator output element such as a video display device 13. The illustrative computer system 10 can be of a conventional stored-program computer architecture. The processor module 11 can include, for example, one or more processor, memory and mass storage devices, such as disk and/or tape storage elements (not separately shown), which perform processing and storage operations in connection with digital data provided thereto. The operator input element(s) 12 can be provided to permit an operator to input information for processing. The video display device 13 can be provided to display output information generated by the processor module 11 on a screen 14 to the operator, including data that the operator may input for processing, information that the operator may input to control processing, as well as information generated during processing. The processor module 11 can generate information for display by the video display device 13 using a so-called "graphical user interface" ("GUI"), in which information for various applications programs is displayed using various "windows."

The terms "memory", "storage" and "disk storage devices" can encompass any computer readable medium, such as a computer hard disk, computer floppy disk, computer-readable flash drive, computer-readable RAM or ROM element or any other known means of encoding digital information. The term "applications programs", "applications", "programs", "computer program product" or "computer software product" can encompass any computer program product consisting of computer-readable programs instructions encoded and/or stored on a computer readable medium, whether that medium is fixed or removable, permanent or erasable, or otherwise As noted, for example, in block 122 of the schematic block diagram of FIG. 2B, applications and data can be stored on a disk, in RAM, ROM, on other removable or fixed storage, whether internal or external, and can be downloaded or uploaded, in accordance with practices and techniques well known in the art. As will also be noted in this document, the present invention can take the form of software or a computer program product stored on a computer-readable medium, or it can be in the form of computer program code that can be uploaded or downloaded, or fixed in an FPGA, ROM or other electronic structure, or it can take the form of a method or a system for carrying out such a method. In each case, the invention is operable to enable a computer or computer system to calculate a pixel value for pixels in an image or scene, and the pixel value can be used by other elements of a computer graphics system, which can be conventional elements such as graphics cards, display controllers, or display elements such as LCDs and/or CRTs, to generate a display-controlling electrical or electronic output, and ultimately to enable the display of an image in a human-perceptible form, and/or the storage of such an image (or data specifying such an image) for later display and/or processing.

Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 can include one or more network ports, generally identified by reference numeral 14, which are connected to communication links which connect the computer system 10 in a computer network. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

Figure 2A:
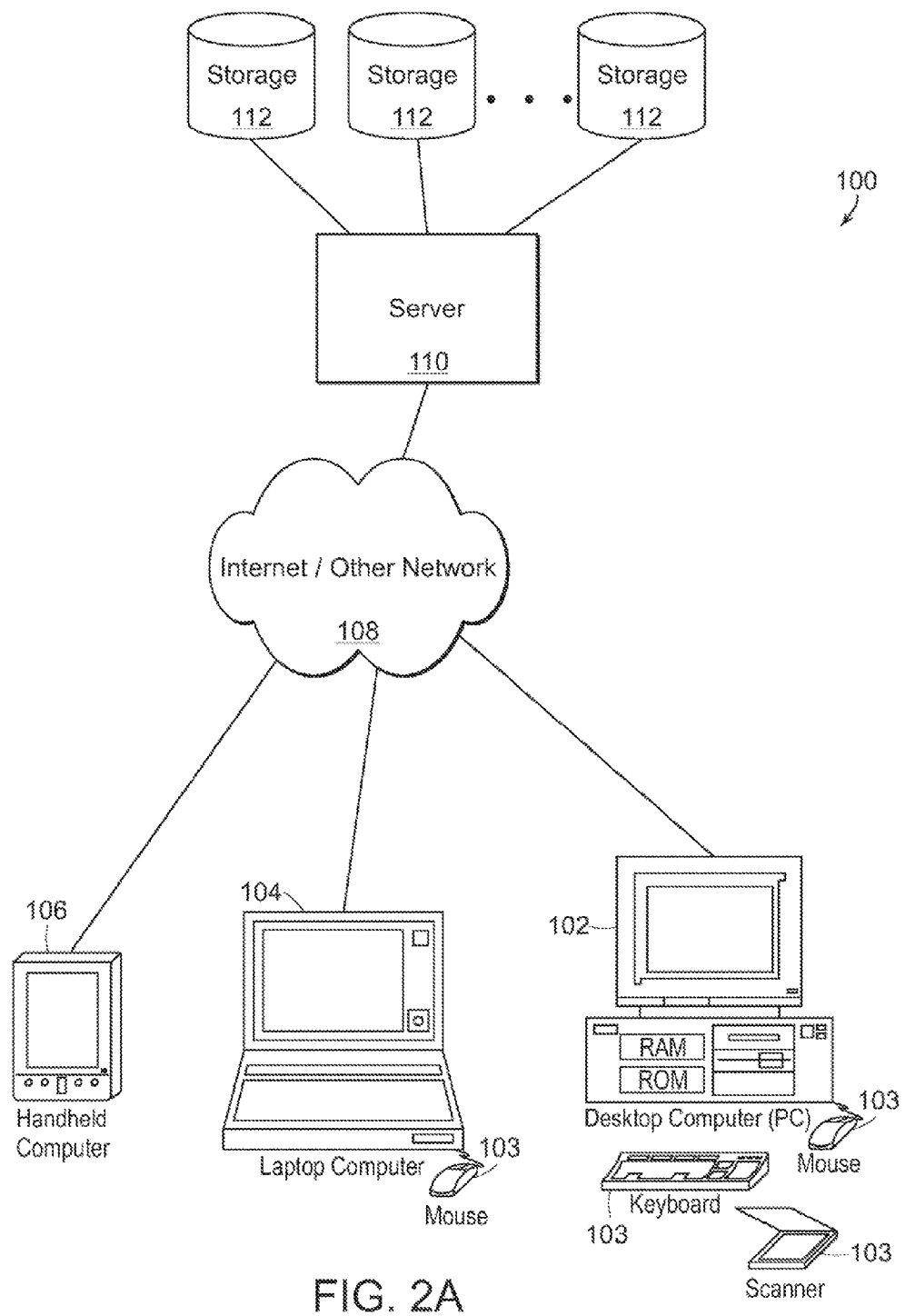
FIGS. 2A-B show schematic diagrams illustrating a conventional network-based computing system and network devices, in which aspects of the present invention can be deployed.
Figure 2B:
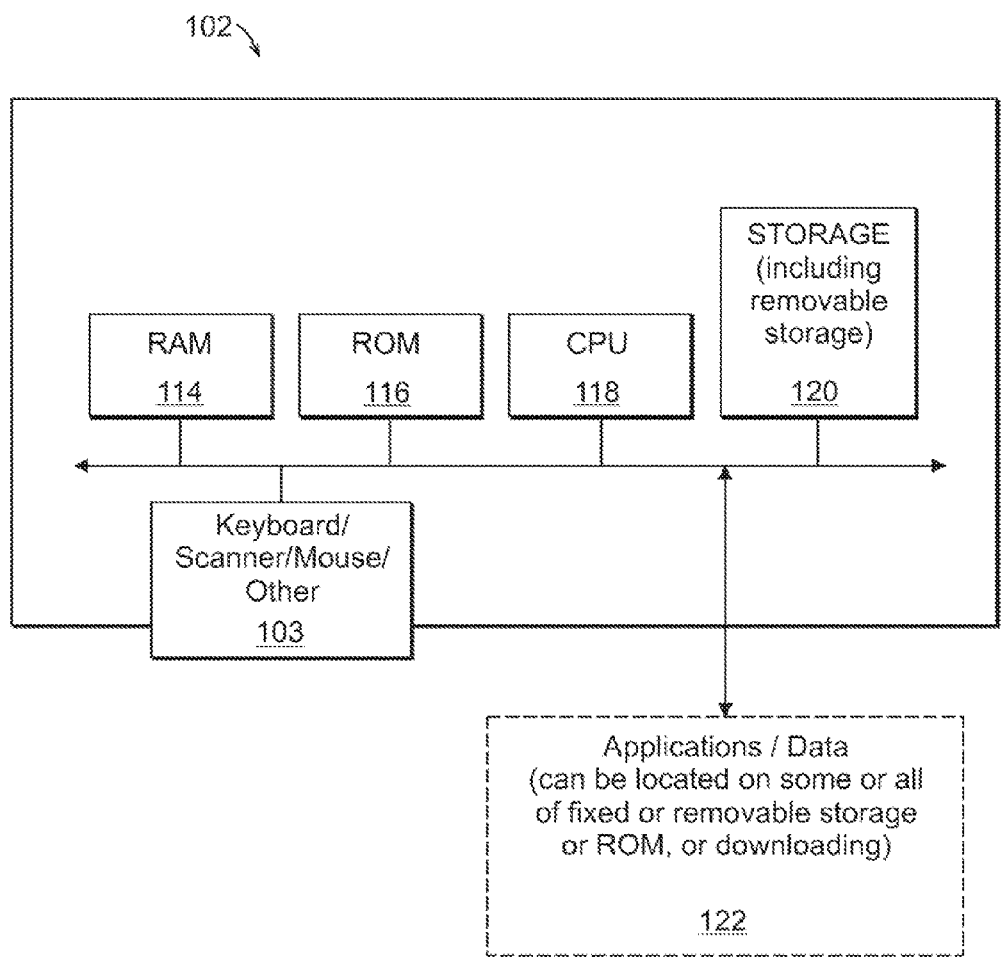

In addition to the computer system 10 shown in the drawings, methods, devices or software products in accordance with the present invention can operate on any of a wide range of conventional computing devices and systems, such as those depicted by way of example in FIGS. 2A and 2B (e.g., network system 100), whether standalone, networked, portable or fixed, including conventional PCs 102, laptops 104, handheld or mobile computers 106, or across the Internet or other networks 108, which may in turn include servers 110 and storage 112.

In line with conventional computer software and hardware practice, a software application configured in accordance with the invention can operate within, e.g., a PC 102 like that shown in FIGS. 1 and 2A-B, in which program instructions can be read from ROM or CD ROM 116 (FIG. 2B), magnetic disk or other storage 120 and loaded into RAM 114 for execution by CPU 118. Data can be input into the system via any known device or means, including a conventional keyboard, scanner, mouse, digitizing tablet, or other elements 103. As shown in FIG. 2B, the depicted storage 120 includes removable storage. As further shown in FIG. 2B, applications and data 122 can be located on some or all of fixed or removable storage or ROM, or downloaded.

Those skilled in the art will understand that the method aspects of the invention described herein can be executed in hardware elements, such as a Field-Programmable Gate Array (FPGA) or an Application-Specific Integrated Circuit (ASIC) constructed specifically to carry out the processes described herein, using ASIC construction techniques known to ASIC manufacturers. Various forms of ASICs are available from many manufacturers, although currently available ASICs do not provide the functions described in this patent application. Such manufacturers include Intel Corporation and NVIDIA Corporation, both of Santa Clara, Calif. The actual semiconductor elements of a conventional ASIC or equivalent integrated circuit are not part of the present invention, and will not be discussed in detail herein.

Those skilled in the art will also understand that ASICs or other conventional integrated circuit or semiconductor elements can be implemented in such a manner, using the teachings of the present invention as described in greater detail herein, to carry out the methods of the present invention as shown, for example, in FIG. 3 et seq. discussed in greater detail below.

Those skilled in the art will also understand that method aspects of the present invention can be carried out within commercially available digital processing systems, such as workstations and personal computers (PCs), operating under the collective command of the workstation or PC's operating system and a computer program product configured in accordance with the present invention. The term "computer program product" can encompass any set of computer-readable programs instructions encoded on a computer readable medium. A computer readable medium can encompass any form of computer readable element, including, but not limited to, a computer hard disk, computer floppy disk, computer-readable flash drive, computer-readable RAM or ROM element or any other known means of encoding, storing or providing digital information, whether local to or remote from the workstation, PC or other digital processing device or system. Various forms of computer readable elements and media are well known in the computing arts, and their selection is left to the implementer. In each case, the invention is operable to enable a computer system to calculate a pixel value, and the pixel value can be used by hardware elements in the computer system, which can be conventional elements such as graphics cards or display controllers, to generate a display-controlling electronic output. Conventional graphics cards and display controllers are well known in the computing arts, are not necessarily part of the present invention, and their selection can be left to the implementer.

EMBODIMENTS OF THE INVENTION

The invention will next be described in detail in the following pages, taken in connection with the attached drawing figures. Those skilled in the art will appreciate that various additions, subtractions, and other modifications and implementations of the invention can be practiced, and are within the spirit and scope of the present invention.

As noted above, known forms of integrated circuit or semiconductor elements such as FPGAs or ASICs can be implemented in such a manner, using the teachings of the present invention described herein, to carry out the methods of the present invention as shown, for example, in the drawings discussed in greater detail below.

Figure 3:
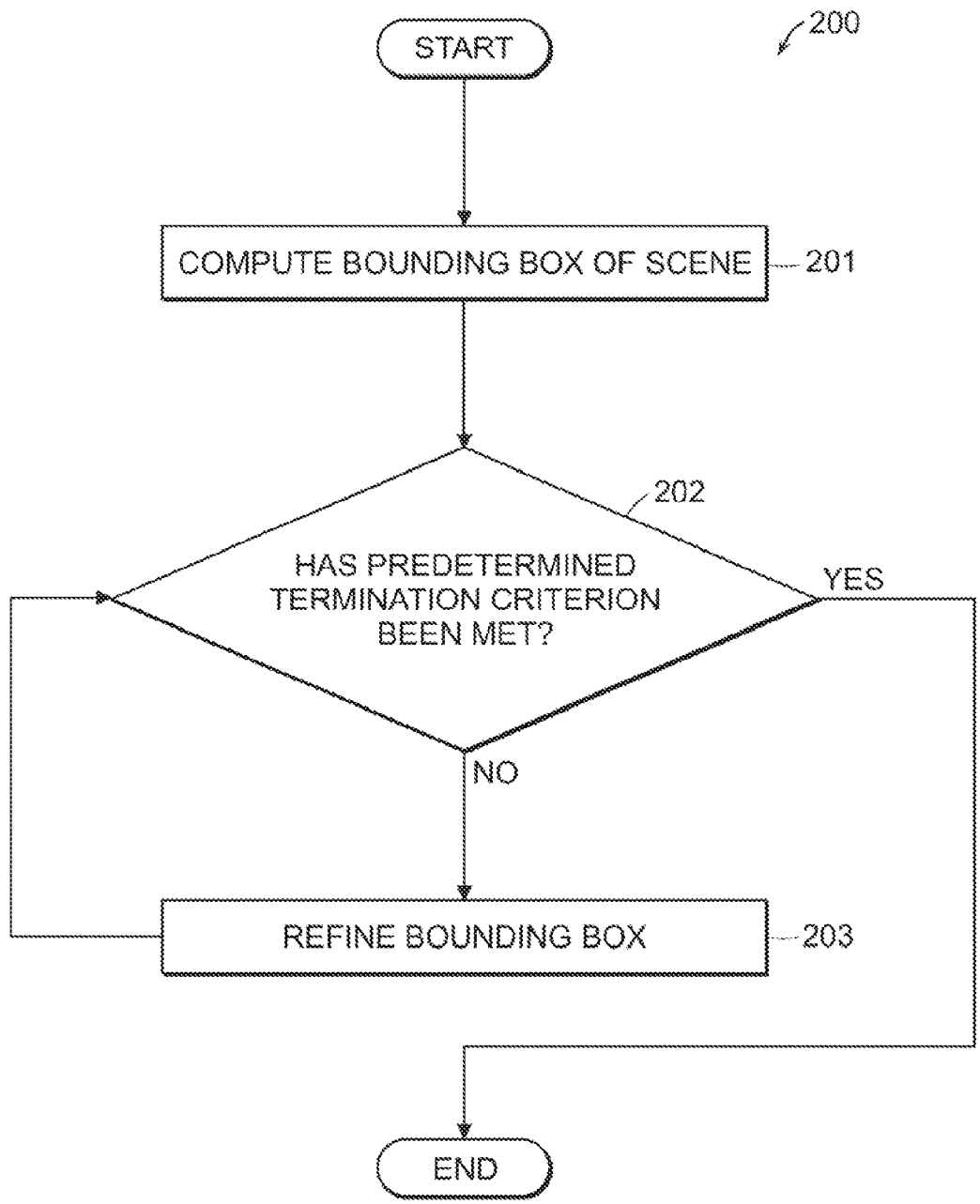
FIG. 3 is a diagram illustrating an overall method in accordance with a first aspect of the present invention.

The following discussion should thus be read with reference to FIG. 3 et seq.; and is organized into the following sections:

I. Real-Time Precision Ray Tracing
1. Overall Method
2. Precision Ray Tracing Architecture
   2.1. Self-Intersection Problem
      2.1.1. Floating Point Precision Ray Freeform Surface Intersection
   2.2. Ray-Triangle Intersection
   2.3. High-Performance 3D-Tree Construction
      2.3.1. Splitting Plane Selection
      2.3.2. Minimum Storage Construction
      2.3.3. Tree Pruning by Left-Balancing
      2.3.4. High Numerical Precision Triangle Rectangle Intersection
   2.4. High-Performance Bounding Volume Hierarchy
      2.4.1. Construction
         2.4.1.1. Finding the Splitting Planes
         2.4.1.2. Inefficient Axis-Aligned Bounding Boxes
      2.4.2. Traversal
      2.4.3. On-the-Fly Bounding Volume Construction
   2.5. Radix Sort Processing
      2.5.1. Construction on Demand
3. Summary of Real-Time Precision Ray Tracing Techniques
4. Additional Techniques
   4A. Constructing a Bounding Volume Hierarchy by Cutting off Half Spaces
   4B. Clipping an Axis-Aligned Bounding Box by Four Axis-Aligned Planes
   4C. High-Performance Setup of Acceleration Data Structures
   4D. Efficient Tree Entry Node Determination
   4E. Bundle Traversal
II. Instant Ray Tracing
1. Introduction
2. Principles of Accelerated Ray Tracing
   2.1. Accelerated Ray Tracing Based on Partitioning of Space
      2.1.1. Space Partitioning Using Regular Grids
      2.1.2. Binary Space Partition
   2.2. Accelerated Ray Tracing Based on Partitioning of Object Lists
      2.2.1. Bounding Volume Hierarchy
   2.3. Summarizing Current Approaches to Accelerated Ray Tracing
3. The Bounding Interval Hierarchy
   3.1. Data Structure
   3.2. Ray Intersection 3.3. Construction of the Hierarchy
   3.3.1. Global Heuristic for Determining Splitting Planes
   3.3.2. Approximate Sorting
   3.3.3. Implementation Details
3.4. Construction on Demand
4. Discussion
   4.1. Memory Footprint
   4.2. Numerical Precision
   4.3. Tracing Ensembles of Rays
   4.4. Hardware Considerations
   4.5. Massive Data Sets
   4.6. Large Objects
5. Results
6. Conclusion
III. Terminating Spatial Partition Hierarchies By A Priori Bounding
1. Introduction
2. Construction of Spatial Hierarchies
   2.1 Termination by Bounding Available Memory
   2.2 Scheduling Available Memory by Prediction
   2.3 Prediction in the Presence of Reference Replication
   2.4 Optimal Scheduling
3. Complexity Analysis and Memory Footprint
4. Implementation
   4.1 Alternative Memory Layout
   4.2 Applied Split Plane Heuristics
   4.3 Massive Scenes
   4.4 Construction on Demand
   4.5 Improving Amortization and Prediction
5. Numerical Experiments and Results
6. Conclusion
7. General Technique
8. Digital Processing Environment in Which Invention Can Be Implemented I. Real-Time Precision Ray Tracing There are now described a precision ray tracing architecture and associated techniques. The described architecture and techniques address a number of issues, including problems in ray tracing due to floating point quantization and large memory requirements, as well as others.

1. Overall Method

FIG. 3 is a diagram depicting an overall method 200 in accordance with the techniques described herein. The method is practiced in the context of a computer graphics system, in which a pixel value is generated for each pixel in an image. Each generated pixel value is representative of a point in a scene as recorded on an image plane of a simulated camera. The computer graphics system is configured to generate the pixel value for an image using a selected ray-tracing methodology. The selected ray-tracing methodology includes the use of a ray tree that includes at least one ray shot from the pixel into a scene along a selected direction, and further includes calculations of the intersections of rays and objects (and/or surfaces of objects) in the scene.

In the FIG. 3 method 200, bounding volume hierarchies are used to calculate the intersections of rays and surfaces in the scene. In step 201, a bounding box of a scene is computed. In step 202, it is determined whether a predetermined termination criterion is met. If not, then in step 203 the axis-aligned bounding box is refined. The process continues recursively until the termination criterion is met. According to an aspect of the invention, the termination criterion is defined as a condition at which the bounding box coordinates differ only in one unit of resolution from a floating point representation of the ray/surface intersection point. However, the scope of the present invention extends to other termination criteria.

The use of bounding volume hierarchies as an acceleration structure is advantageous for a number of reasons. The memory requirements for bounding volume hierarchies can be linearly bounded in the number of objects to be ray traced. Also, as described below, bounding volume hierarchies can be constructed much more efficiently than 3D-trees, which makes them very suitable for an amortized analysis, as required for fully animated scenes.

2. Precision Ray Tracing Architecture

The following discussion describes in greater detail certain issues in ray tracing technology, and particular aspects of the invention that address those issues.

2.1. Self-Intersection Problem

Figure 4:
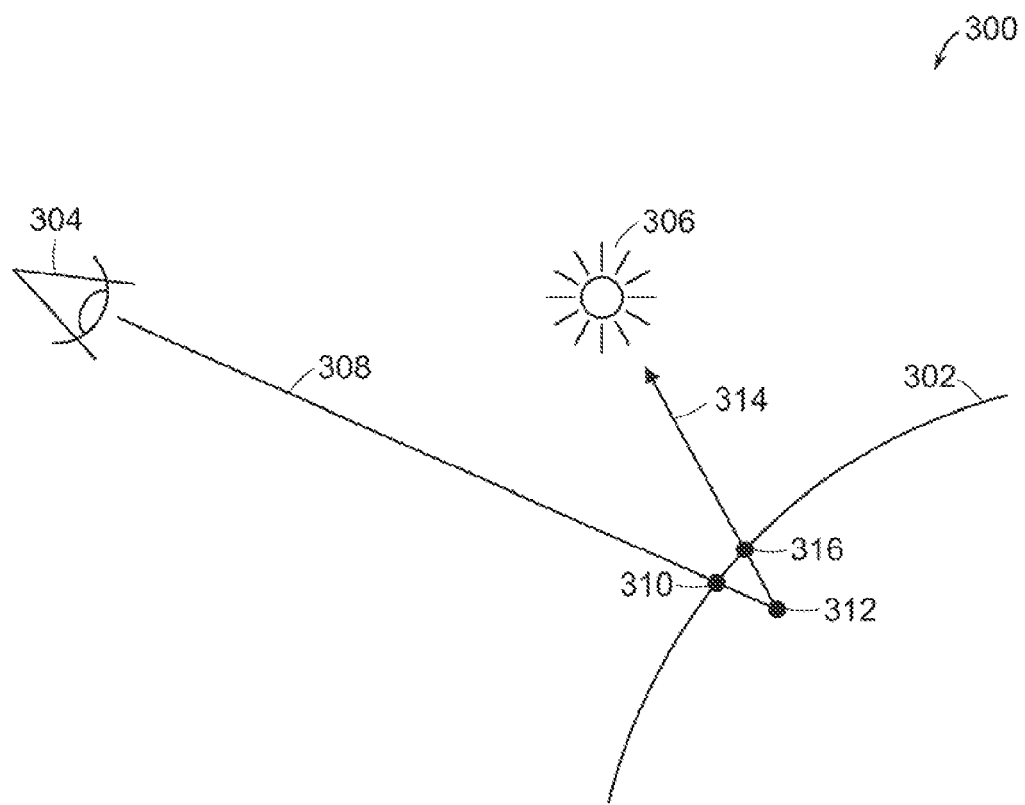
FIG. 4 is a diagram of a ray tracing procedure, illustrating the problem of self-intersection.
Figures 1, 7B:
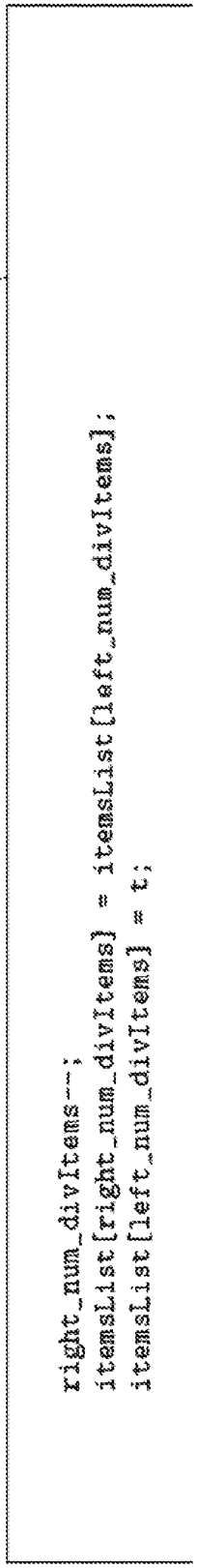

FIG. 4 is a diagram illustrating the "self-intersection" problem. FIG. 4 shows a ray tracing procedure 300, including a surface 302, an observation point 304, and a light source 306. In order to synthesize an image of the surface, a series of computations are performed in order to locate rays extending between the observation point 304 and the surface 302. FIG. 4 shows one such ray 308. Ideally, there is then calculated the exact point of intersection 310 between the ray 308 and the surface 302.

However, due to floating point arithmetic computations on computers, it is sometimes possible for the calculated ray/surface intersection point 312 to be different from the actual intersection point 310. Further, as illustrated in FIG. 4, it is possible for the calculated point 312 to be located on the "wrong" side of the surface 302. In that case, when computations are performed to locate a secondary ray 314 extending from the calculated ray/surface intersection point 312 to the light source 306, these computations indicate that the secondary ray 314 hits the surface 302 at a second intersection point 316 rather than extending directly to the light source 306, thus resulting in an imaging error.

One known solution to the self-intersection problem is to start each secondary ray 314 at a safe distance from the surface 302. This safe distance is typically expressed as a global floating point $f$. However, the determination of the global floating point $f$ depends heavily on the scene, and the particular location within the scene itself, for which an image is being synthesized.

An aspect of the invention provides a more precise alternative. After arriving at a calculated ray/surface intersection point 312, the calculated point 312 and the direction of the ray 308 are then used to re-compute an intersection point that is closer to the actual intersection point 310. This re-computation of the intersection point is incorporated into the ray tracing technique as an iteration that increases precision. If the iteratively computed intersection point turns out to be on the "wrong" side of the surface 302, it is moved to the "correct" side of the surface 302. The iteratively computed intersection point can be moved along the surface normal, or along the axis determined by the longest component of the normal. Instead of using a global floating point $f$, the point is moved by an integer $f$ to the last bits of the floating point mantissas.

The described procedure avoids computations in double precision and has the advantage that it implicitly adapts to the scale of the floating point number, which is determined by its exponent. Thus, in this implementation, all secondary rays directly start from these modified points making an $f$-offset unnecessary. During intersection computation, it can therefore be assumed that the ray interval of validity to begin at 0 rather than some offset.

Modifying the integer representation of the mantissa also avoids numerical problems when intersecting a triangle and a plane in order to decide which points are on what side.

2.1.1. Floating Point Precision Ray Freeform Surface Intersection

Exploiting the convex hull property of convex combinations, intersections of rays and freeform surfaces can be found by refining an axis-aligned bounding box, which contains the point of intersection nearest to the ray origin. This refinement can be continued until the resolution of floating point numbers is reached, i.e., until the bounding box coordinates differ only in one unit of resolution from the floating point representation. The self-intersection problem then is avoided by selecting the bounding box corner that is closest to the surface normal in the center of the bounding box. This corner point then is used to start the secondary ray.

2.2. Ray-Triangle Intersection

The above-described "ray object intersection test" is very efficient and benefits from the avoidance of the self-intersection problem. After constructing the acceleration data structure, the triangles are transformed in-place. The new representation encodes degenerate triangles so that the intersection test can handle them without extra effort. FIG. 5 shows an example of a code listing 320 for implementing the described technique. It of course is also possible to just prevent degenerate triangles to enter the graphics pipeline.

The test first determines the intersection of the ray and the plane of the triangle and then excludes intersections outside the valid interval [0, result.tfar] on the ray. This is achieved by only one integer test. Note that the +0 is excluded from the valid interval. This is important if denormalized floating point numbers are not supported. If this first determination is successful, the test proceeds by computing the Barycentric coordinates of the intersection. Note that again only an integer test, i.e., more specifically only testing two bits, is required to perform the complete inclusion test. Thus the number of branches is minimal. In order to enable this efficient test, the edges and the normal of the triangle are scaled appropriately in the transformation step.

The precision of the test is sufficient to avoid wrong or missed ray intersections. However, during traversal situations may occur in which it is appropriate to extend the triangles for a robust intersection test. This can be done before transforming the triangles. Since the triangles are projected along the axis identified by the longest component of their normal, this projection case has to be stored. This is achieved by counters in the leaf nodes of the acceleration data structure: The triangle references are sorted by the projection case and a leaf contains a byte for the number of triangles in each class. FIG. 6 shows a code listing 340 for implementing this aspect of the invention.

2.3. High-Performance 3D-Tree Construction

A further aspect of the present invention provides an improved approach for constructing acceleration data structures for ray tracing. Compared with prior software implementations that follow a number of different optimizations, the approach described herein yields significantly flatter trees with superior ray tracing performance.

2.3.1. Splitting Plane Selection

Candidates for splitting planes are given by the coordinates of the triangle vertices inside the axis-aligned bounding box to be partitioned. Note that this includes vertices that actually lie outside the bounding box, but have at least one coordinate that lies in one of the three intervals defined by the bounding box. Out of these candidates, there is selected the plane closest to middle of the longest side of the current axis-aligned bounding box. A further optimization selects only coordinates of triangles whose longest component of the surface normal matches the normal of the potential splitting plane. This procedure yields much flatter trees, since placing splitting planes through the triangle vertices implicitly reduces the number of triangles split by splitting planes. In addition, the surface is approximated tightly and empty space is maximized. If the number of triangles is higher than a specified threshold and there are no more candidates for splitting planes, the box is split in the middle along its longest side. This avoids inefficiencies of other approaches, including the use, for example, of long diagonal objects.

2.3.2. Minimum Storage Construction

The recursive procedure of deciding which triangles belong to the left and right child of a node in the hierarchy has typically required extensive bookkeeping and memory allocation. There is a much simpler approach that only fails in exceptional cases. Only two arrays of references to the objects to be ray traced are allocated. The first array is initialized with the object references. During recursive space partition, a stack of the elements on the left is grown from the beginning of the array, while the elements, which are classified right, are kept on a stack growing from the end of the array towards the middle. In order to be able to quickly restore the elements that are intersecting a split plane, i.e., are both left and right, the second array keeps a stack of them. Thus backtracking is efficient and simple.

2.3.3. Tree Pruning by Left-Balancing

Instead of pruning branches of the tree by using the surface area heuristic, tree depth is pruned by approximately left-balancing the binary space partition starting from a fixed depth. As observed by exhaustive experimentation, a global fixed depth parameter can be specified across a vast variety of scenes. This can be understood by observing that after a certain amount of binary space partitions usually there remain connected components that are relatively flat in space.

2.3.4. High Numerical Precision Triangle Rectangle Intersection

In order to decide whether a triangle intersection the splitting plane is contained in the left and/or right partition of a bounding box, a numerically optimized 2d-version of a triangle-box intersection technique has been developed. There is first computed the intersection of the triangle with the splitting plane. A check is then performed as to how this line lies relative to the rectangle give by the intersection of the splitting plane and the bounding box. FIGS. 7A-D show an exemplary code listing 360 for implementing the described technique. Despite the apparent complexity of the code, the technique is more efficient and numerically stable than previous methods.

2.4. High-Performance Bounding Volume Hierarchy

Using bounding volume hierarchies, each object to be ray traced is referenced exactly once. As a consequence, and in contrast with 3D-trees, no mailbox mechanisms are required to prevent the multiple intersection of an object with a ray during the traversal of the hierarchy. This is a significant advantage from the viewpoint of system performance and makes implementations on a shared memory system much simpler. A second important consequence is that there cannot be more inner nodes in the tree of a bounding volume hierarchy than the total number of objects to be ray-traced. Thus the memory footprint of the acceleration data structure can be linearly bounded in the number of objects before construction. Such an a priori bound is not available for the construction of a 3D-tree, where the memory complexity is expected to increase quadratically with the number of objects to be ray-traced.

Thus, there is now described a new concept of bounding volume hierarchies that are significantly faster than current 3D-tree ray tracing techniques, and in which the memory requirements grow linearly, rather than expected quadratically, with the number of objects to be ray-traced.

2.4.1. Construction

The core concept that allows bounding volume hierarchies to outperform 3D-trees is to focus on how space can be partitioned, rather than focusing on the bounding volumes themselves.

Figure 8:
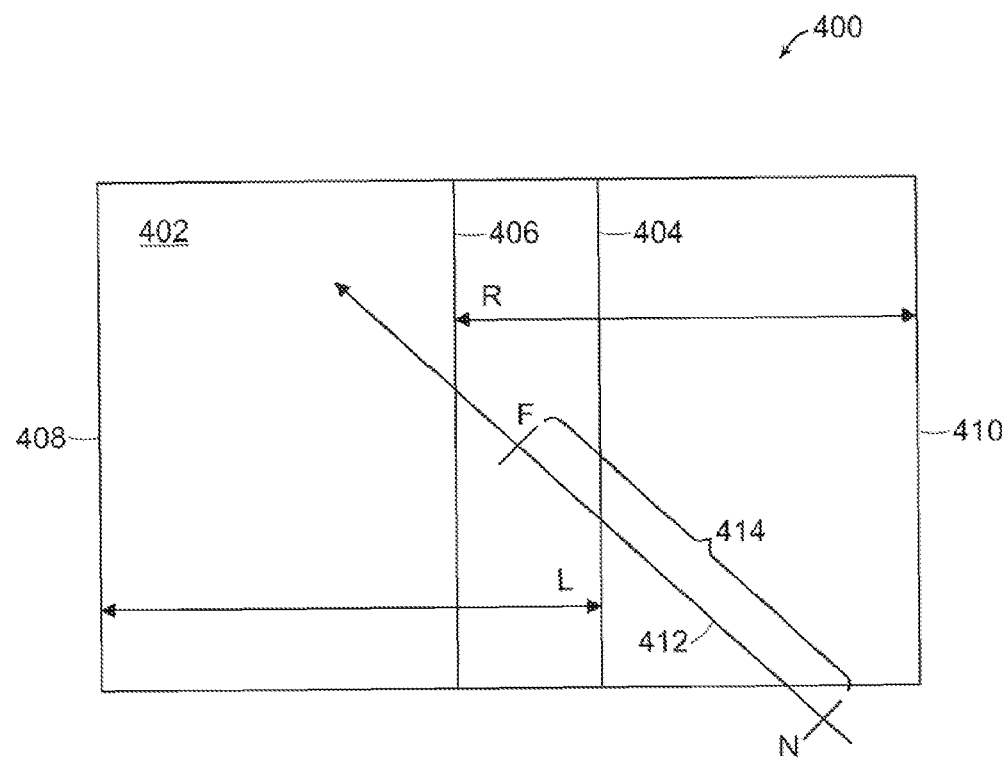
FIG. 8 shows a diagram, in elevation view, of a partitioned axis-aligned bounding box that is used as an acceleration data structure in accordance with a further aspect of the invention.

In a 3D-tree, a bounding box is partitioned by a single plane. According to the present aspect of the invention, two parallel planes are used to define two axis-aligned bounding boxes. FIG. 8 is a diagram illustrating the principal data structure 400.

FIG. 8 shows an axis-aligned bounding box 402, in elevation view. An L-plane 404 and an R-plane 406, which are axis-aligned and parallel with each other, are used to partition bounding box 402 into left and right axis-aligned bounding box. The left bounding box extends from the left wall 408 of the original bounding box 402 to the L-plane 404. The right bounding box extends from the R-plane 406 to the right wall 410 of the original bounding box 402. Thus, the left and right bounding boxes may overlap each other. The traversal of ray 412 is determined by the positions of intersection with the L- and R-planes 404 and 406 relative to the interval of validity [N, F] 414 of the ray 412.

In the FIG. 8 data structure 400, the L- and R-planes 404 and 406 are positioned with respect to each other to partition the set of objects contained within the original bounding box 402, rather than the space contained within the bounding box 402. In contrast with a 3D-tree partition, having two planes offers the possibility of maximizing the empty space between the two planes. Consequently the boundary of the scene can be approximated much faster.

Figure 9:
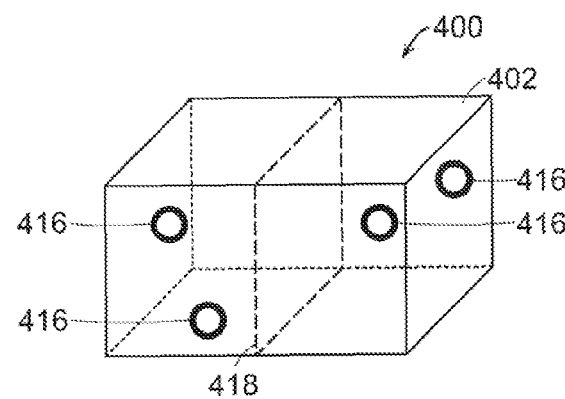
FIGS. 9-11 are a series of diagrams, in isometric view, of the axis-aligned bounding box shown in FIG. 5, illustrating the partitioning of the bounding box with L- and R-planes.
Figure 10:
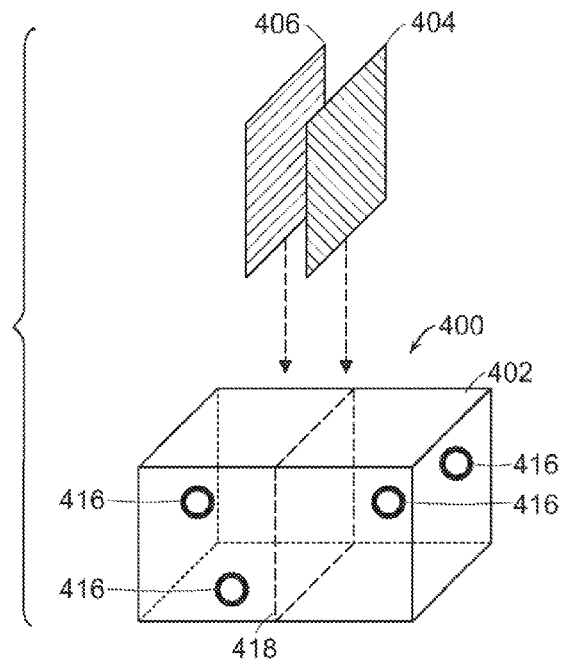
Figure 11:
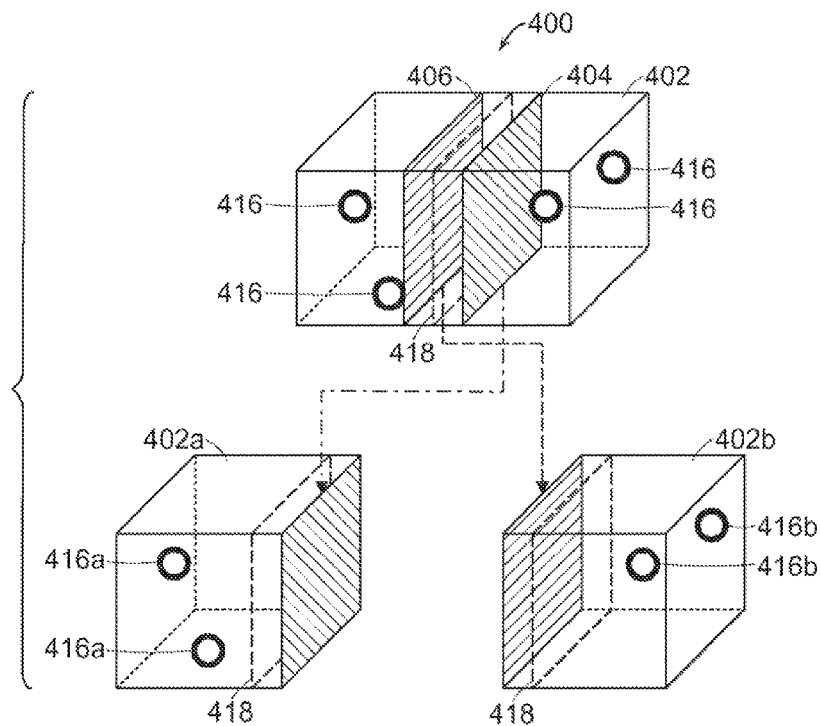

FIGS. 9-11 are a series of three-dimensional diagrams further illustrating data structure 400. FIG. 9 shows a diagram of bounding box 402. For purposes of illustration, virtual objects within bounding box 402 are depicted as abstract circles 416. As shown in FIGS. 10 and 11, L-plane 404 and R-plane 406 are then used to partition bounding box 402 into a left bounding box 402a and a right bounding box 402b. The L- and R-planes are selected such that the empty space between them is maximized. Each virtual object 416 ends up in either the left bounding box 402a or the right bounding box 402b. As shown at the bottom of FIG. 11, the virtual objects 416 are partitioned into "left" objects 416a and "right" objects 416b. Each of the resulting bounding boxes 402a and 402b are themselves partitioned, and so on, until a termination criterion has been satisfied.

Figure 12:
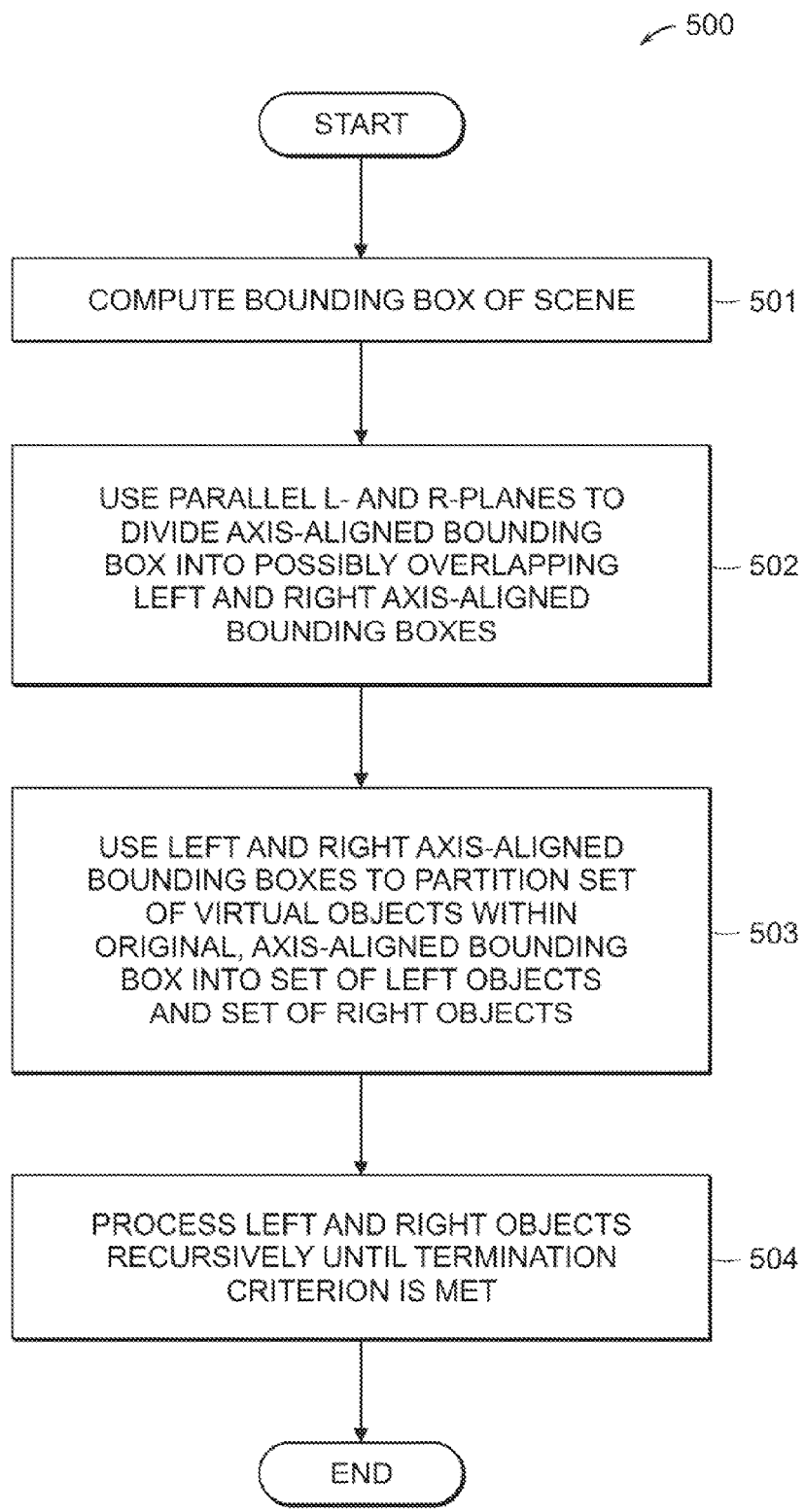
FIGS. 12 and 13 are flowcharts of ray tracing methods according to further aspects of the invention.

FIG. 12 is a flowchart of the described method 500. In step 501, a bounding box of a scene is computed. In step 502, parallel L- and R-planes are used to partition the axis-aligned bounding box left and right axis-aligned bounding boxes, which may overlap. In step 503, the left and right bounding boxes are used to partition the set of virtual objects contained with the original axis-aligned bounding box into a set of left objects and a set of right objects. In step 504, the left and right objects are processed recursively until a termination criterion is met.

Instead of one split parameter, used in earlier implementations, two split parameters are stored within a node. Since the number of nodes is linearly bounded by the number of objects to be ray traced, an array of all nodes can be allocated once. Thus, the costly memory management of 3D-trees during construction becomes unnecessary.

The construction technique is much simpler than the analog for 3D-tree construction and is easily implemented in a recursive way, or by using an iterative version and a stack. Given a list of objects and an axis-aligned bounding box, the L- and R-planes are determined, and the set of objects is determined accordingly. The left and right objects are then processed recursively until some termination criterion is met. Since the number of inner nodes is bounded, it is safe to rely on termination when there is only one object left.

It should be noted that the partition only relies on sorting objects along planes that are perpendicular to the x-, y-, and z-axes, which is very efficient and numerically absolutely stable. In contrast with 3D-trees, no exact intersections of objects with splitting planes need to be computed, which is more costly and hard to achieve in a numerically robust way. Numerical problems of 3D-trees, such as missed triangles at vertices and along edges, can be avoided by extending the triangles before the construction of the bounding volume hierarchy. Also, in a 3D-tree, overlapping objects have to be sorted both into the left and right axis-aligned bounding boxes, thereby causing an expected quadratic growth of the tree.

2.4.1.1. Finding the Splitting Planes

Various techniques may be used to determine the L- and R-planes, and thus the actual tree layout. Returning to FIGS. 9-11, one technique is to determine a plane M 418 using the 3D-tree construction technique described above and partition the objects such that the overlap of the resulting L-plane and R-plane of the new axis-aligned bounding boxes minimally overlaps the suggested splitting plane M 418. The resulting tree is very similar to the corresponding 3D-tree, however, since the object sets are partitioned rather than space, the resulting tree is much flatter. Another approach is to select the R-plane and L-plane in such a way that the overlap of child boxes is minimal and the empty space is maximized if possible.

2.4.1.2. Inefficient Axis-Aligned Bounding Boxes

It should be noted that for some objects axis-aligned bounding boxes are inefficient. An example of such a situation is a long cylinder with small radius on the diagonal of an axis-aligned bounding box.

Figure 13:
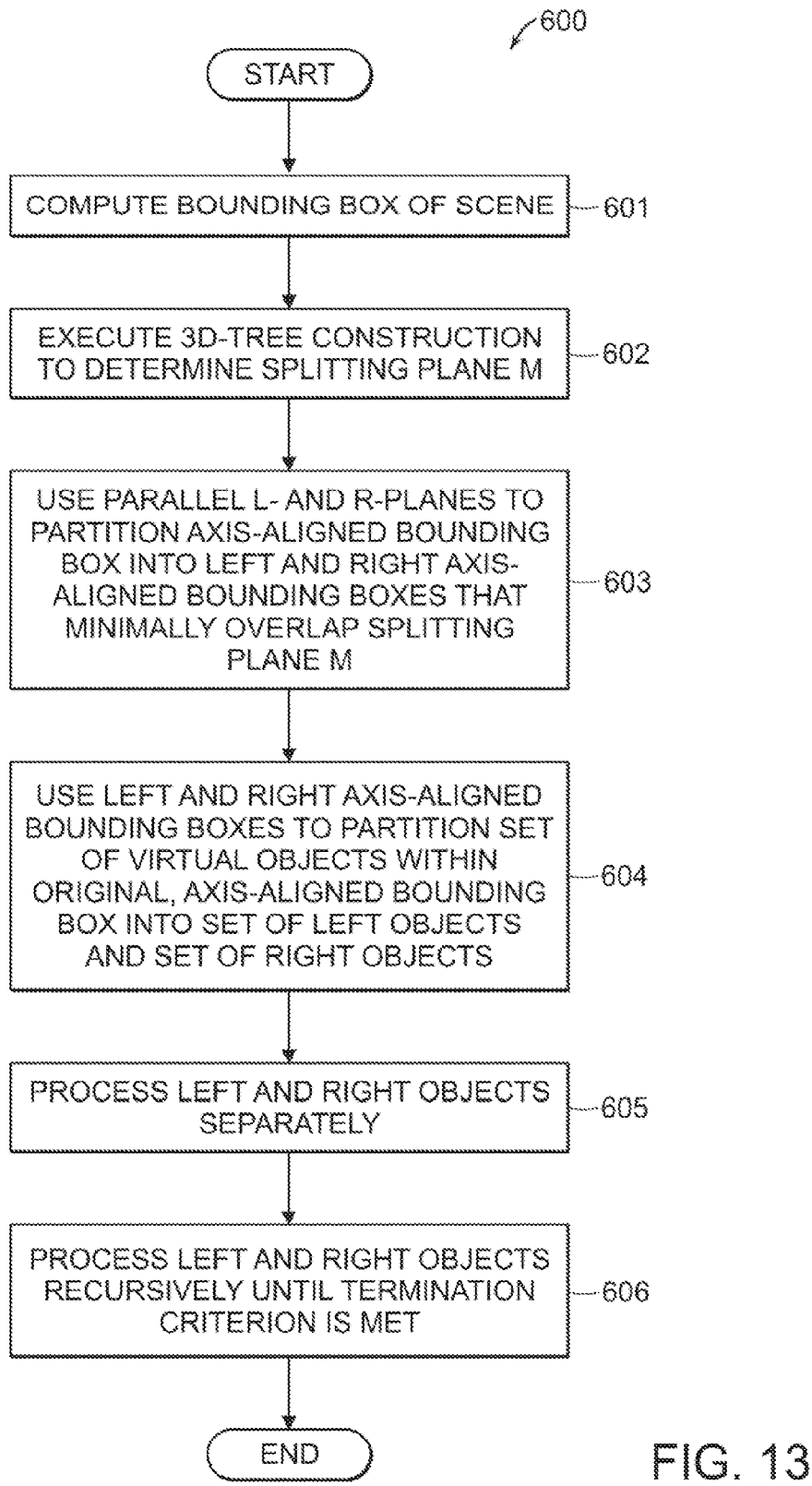
Figures 1, 17B:
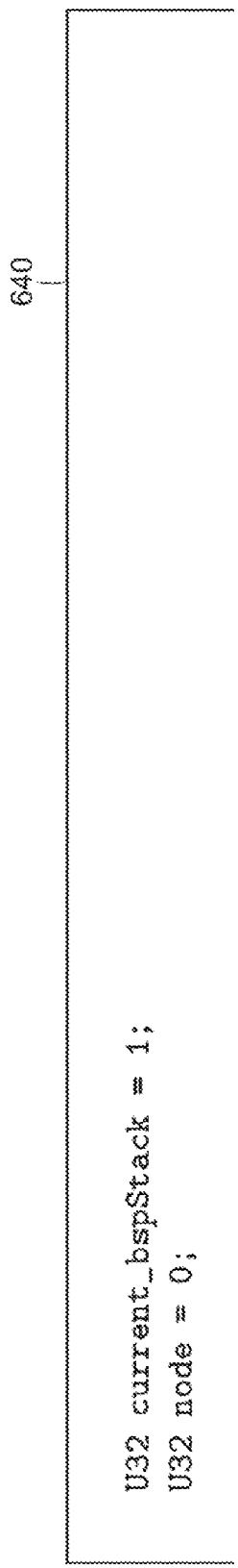

FIG. 13 is a flowchart of a method 600 according to this aspect of the invention. In step 601, a bounding box of a scene is computed. In step 602, a 3D-tree construction is executed to determine a splitting plane M. In step 603, parallel L- and R-planes are used to partition the axis-aligned bounding box into left and right axis-aligned bounding boxes that minimally overlap the splitting plane M. In step 604, the left and right bounding boxes are used to partition the set of virtual objects contained within the original axis-aligned bounding box into a set of left objects and a set of right objects. In step 605, the left and right objects are processed recursively until a termination criterion is met. It should be noted that the method 600 illustrated in FIG. 13, as well as the method 200 illustrated in FIG. 3, may be combined with other techniques described herein, including techniques relating to 3D-tree construction, real-time processing, bucket sorting, self-intersection, and the like.

In the case of the 3D-tree, the spatial subdivision is continued so as to cut off the empty portions of the space around the object. In the case of the described bounding volume hierarchy, partitioning such objects into smaller ones results in a similar behavior. In order to maintain the predictability of the memory requirements, a maximum bounding box size is defined. All objects with an extent that exceeds the maximum bounding box size are split into smaller portions to meet the requirement. The maximum allowed size can be found by scanning the data set for the minimal extent among all objects.

2.4.2. Traversal

The data structure described herein allows the transfer of the principles of fast 3D-tree traversal to bounding volume hierarchies. The cases of traversal are similar: (1) only the left child; (2) only the right child; (3) the left child and then the right child; (4) the right child and then the left child; or (5) the ray is between split planes (i.e., empty space). Since one node in the described technique is split by two parallel planes, the order of how to traverse the boxes is determined by the ray direction. FIGS. 14A-C set forth a source code listing 610 incorporating the techniques described above.

Previous bounding volume hierarchy techniques could not efficiently determine the order of how to traverse the child nodes or required additional effort, such as updating a heap data structure. In addition a whole bounding volume had to be loaded and tested against the ray, while the present approach only requires the two plane distances. Checking the ray against the two planes in software seems to be more expensive, however. The traversal is the bottle neck in 3D-trees, and doing some more computation here better hides the latencies of memory access. In addition, the bounding volume hierarchy trees tend to be much smaller than corresponding 3D-trees of same performance.

Although there is herein described a new bounding volume hierarchy, there is a strong link to traversing 3D-trees: Setting L=R, the classical binary space partition is obtained, and the traversal algorithm collapses to the traversal algorithm for 3D-trees.

2.4.3. On-the-Fly Bounding Volume Construction

The described bounding volume hierarchy also can be applied to efficiently find ray freeform surface intersections by subdividing the freeform surface. Doing so allows the intersection of a freeform surface with a convex hull property and a subdivision algorithm efficiently to be computed up to floating point precision, depending on the actual floating point arithmetic. A subdivision step is performed, for example, for polynomial surfaces, rational surfaces, and approximating subdivision surfaces. For each axis in space the possibly overlapping bounding boxes are determined as discussed above. In case of a binary subdivision, the intersection of the L-boxes and the intersection of the R-boxes for new bounding boxes of the new meshes. Now the above-described traversal can be efficiently performed, since the spatial order of the boxes is known. Instead of pre-computing the hierarchy of bounding volumes, it can be computed on the fly. This procedure is efficient for freeform surfaces and allows one to save the memory for the acceleration data structure, which is replaced by a small stack of the bounding volumes that have to be traversed by backtracking. The subdivision is continued until the ray surface intersection lies in a bounding volume that collapsed to a point in floating point precision or an interval of a small size. Section 2.1.1 of the Appendix sets forth a code listing in accordance with this aspect of the invention.

2.5. Radix Sort Processing

Using regular grids as an acceleration data structure in ray tracing is simple, but efficiency suffers from a lack of spatial adaptivity and the subsequent traversal of many empty grid cells. Hierarchical regular grids can improve on the situation, but still are inferior as compared to bounding volume hierarchies and 3D-trees. However, regular grids can be used to improve on the construction speed of acceleration data structures. The technique for constructing the acceleration data structures are similar to quick sorting and are expected to run in O(n log n). An improvement can be obtained by applying bucket sorting, which runs in linear time. Therefore the axis-aligned bounding box of the objects is partitioned into $n_x \times n_y \times n_z$ axis-aligned boxes. Each object then is sorted into exactly one of these boxes by one selected point, e.g., the center of gravity or the first vertex of each triangle could be used. Then the actual axis-aligned bounding box of the objects in each grid cell is determined. These axis-aligned bounding boxes are used instead of the objects they contain as long as the box does not intersect one of the division planes. In that case the box is unpacked and instead the objects in the box will be used directly. This procedure saves a lot of comparisons and memory accesses, noticeably improves the constant of the order of the construction techniques, and also can be applied recursively. The above technique is especially appealing to hardware implementations, since it can be realized by processing a stream of objects.

2.5.1. Construction on Demand

The acceleration data structures can be built on demand, i.e., at the time when a ray is traversing a specific axis-aligned bounding box with its objects. Then on the one hand the acceleration data structure never becomes refined in regions of space, which are invisible to the rays, and caches are not polluted by data that is never touched. On the other hand after refinement the objects possibly intersected by a ray are already in the caches.

3. Summary of Real-Time Precision Ray Tracing Techniques

From the above discussion, it will be seen that the present invention addresses long known issues in ray tracing and provides techniques for ray tracing having improved precision, overall speed and memory footprint of the acceleration data structures. The improvements in numerical precision transfer to other number systems as well as, for example, to the logarithmic number system used in the hardware of the ART ray tracing chips. It is noted that the specific implementation of the IEEE floating point standard on a processor or a dedicated hardware can severely influence performance. For example, on a Pentium 4 chip denormalized numbers can degrade performance by a factor of 100 and more. As discussed above, an implementation of the invention avoids these exceptions. The view of bounding volume hierarchies described herein makes them suited for real-time ray tracing. In an amortized analysis, the described techniques outperform the previous state of the art, thus allowing more precise techniques to be used, for example, for computing motion blur in fully animated scene, as in a production setting or the like. It will be apparent from the above discussion that the described bounding volume hierarchies have significant advantages when compared with 3D-trees and other techniques, particularly in hardware implementations and for huge scenes. In an amortized analysis, the described bounding volume hierarchies outperform current 3D-trees by at least a factor of two. In addition, the memory footprint can be determined beforehand and is linear in the number of objects.

4. Additional Techniques

In addition to the above-described techniques, other techniques according to further aspects of the invention may be used to improve the performance of a ray tracing system. These aspects of the invention include the following:

4A. Constructing a Bounding Volume Hierarchy by Cutting off Half Spaces

4B. Clipping an Axis-Aligned Bounding Box by Four Axis-Aligned Planes

4C. High Performance Setup of Acceleration Data Structures

4D. Efficient Tree Entry Node Determination

4E. Bundle Traversal

Each of the aspects of the invention is described in further detail below.

4A. Constructing a Bounding Volume Hierarchy by Cutting off Half Spaces

It is possible to construct a bounding volume hierarchy by cutting off half-spaces. Using a half-space, which intersects an axis-aligned bounding box, a bounding volume hierarchy is given by the original bounding box and the new bounding box, which results from the intersection with the given half-space.

FIG. 15 shows a diagram illustrating the described technique. In FIG. 15, a bounding box 620 that is intersected by an axis-aligned plane 622. The plane 622 defines a smaller axis-aligned box 624, i.e., a half-space, which is a subset of the original box 620. The part of the original box, which is to be clipped, is determined by the normal of the clipping plane 622. During ray traversal, three cases have to be determined: The valid interval [N, F] on the ray intersects (1) only the original box 620; (2) first the original box 620, and then the clipped box 624; or (3) first the clipped box 624, and then the original box 620.

The described technique can be applied recursively in order to represent a bounding volume hierarchy constructed from the axis-aligned bounding box of the scene and half-spaces. A binary tree is used to represent the hierarchy. The inner nodes of the tree represent the half-spaces.

The described technique provides many of the advantages as the techniques described above. In addition, the memory footprint of the nodes is smaller. FIG. 16 shows an exemplary code listing 630 embodying the described technique. It should be noted that leafs can also be encoded by using the 4th case of the projection axis, i.e., bits 0 and 1 are "one," which is not used in the code example.

Intersecting a ray with the bounding volume hierarchy is done depth first, where in each node, only three cases have to be distinguished, as discussed above: The valid interval of the ray intersects (1) only the original bounding box; (2) first the clipped box and then the original box; or (3) first the original box and then the clipped box.

FIGS. 17A-D show an example of a code listing 640 for implementing the tracing of one ray through a bounding volume hierarchy. For the sake of efficiency, the implementation avoids visiting empty leaf nodes. Visiting all empty leaf nodes simplifies the implementation at the cost of efficiency.

The triangle test used is highly optimized. However, any other triangle ray intersection test can be used as well.

4B. Clipping an Axis-Aligned Bounding Box by Four Axis-Aligned Planes

Figures 18, 19:
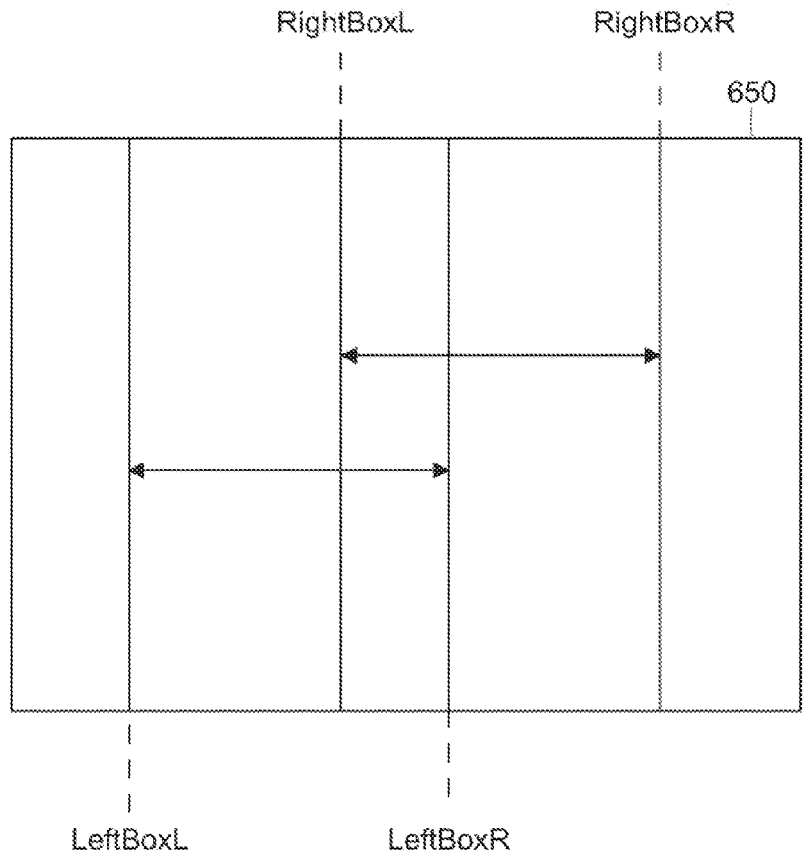
FIG. 18 shows a diagram of a bounding box that has been clipped by four axis-aligned planes in accordance with a further aspect of the invention.
FIG. 19 shows an example of a code listing for implementing a data structure in accordance with the diagram shown in FIG. 18.

FIG. 18 shows a diagram illustrating a technique according to a further aspect of the invention. In FIG. 18, an axis-aligned bounding box 650 has been clipped by four axis-aligned planes LeftBoxL, RightBoxL, LeftBoxR and RightBoxR, resulting in a left child box and a right child box. The left and right boundaries of the left child box are defined by planes LeftBoxL and LeftBoxR. The left and right boundaries of the right child box are defined by planes RightBoxL and RightBoxR. During ray traversal, five cases have to be determined: The valid interval [N, F] on the ray intersects: (1) only the left child box; (2) only the right child box; (3) first the left child box and the right child box; (4) first the right child box and then the left child box; or (5) neither the left child box nor the right child box.

The hierarchy is represented as a binary tree, where each node specifies two intervals along a selected axis. Opposite to a classic bounding volume hierarchy implementation, an ordering of the children nodes is possible, and it is not necessary to store full axis-aligned bounding boxes. Compared with the technique described in the previous section, a single node requires more memory. However, no special case of empty nodes can occur. In total, the memory then remains substantially the same.

FIG. 19 shows an exemplary code listing 660 embodying the described technique. It should be noted that leafs can also be encoded by using the 4th case of the projection axis, i.e., bits 0 and 1 are "one," which is not used in the code example.

FIGS. 20A-C show an exemplary code listing 670 of an implementation of a traversal using a tree built using the above data structure. The depicted implementation does not include certain optimizations. For example, as one of the intervals defined by a node can completely include the other one along the specified axis, a more efficient traversal would consider that case by not only selecting the first node to be traversed by the ray direction, but also by the relative position of the intervals itself. As this optimization is relatively straightforward, it has not been included in the present example.

4C. High-Performance Setup of Acceleration Data Structures

The setup procedure of the tree acceleration data structures implicitly invokes sorting algorithms, which have a time complexity of O(n log n) in the number n of triangles. Only radix, bucket, and related sorting algorithms can obtain a lower order of time complexity.

In Section II, below, there is described an instant ray tracing technique, in which rapid tree setup procedures are developed. These setup procedures in fact were used for setting up all the data structures mentioned above. As described below, a bucket sort preprocessing is described that also can be used in a hierarchical fashion, i.e., using a hierarchy of regular grids. As further described below, a global subdivision criterion is used rather than a local one.

This setup routine is rapid for kd-trees and bounding volume hierarchies. The described technique is especially efficient for setting up the hierarchy from subsection 4B, above. A lot of candidate splitting planes are immediately rejected, since the described technique does not only separate right from left objects, but in fact bounds the intervals spanned by the right and left objects. Thus, the hierarchy becomes flatter and is even more efficient to traverse. As these optimizations are relatively straightforward, they have not been included in the example code listings herein.

While the specification of intervals along an axis as in section 4B allows the efficient rejection of rays that are outside these intervals, it can, in addition, allow the efficient cutting off of empty volumes on the other axes. This can be done by specifying the clip volume in the leaf nodes of the hierarchies. A simple heuristic inserts a bounding box test in a leaf if the empty volume of the leaf node is beyond a certain threshold. Alternatively, in the case of the techniques described in section 4B, there may be inserted a test for the maximally missing two axes.

As further described below, the acceleration data structures can be built on demand, meaning that only the parts of the trees are constructed that are traversed by rays. The required data is easily stored in preliminary leaf nodes. Considering the techniques described in section 4B, it is also possible to maximize empty space instead of minimizing overlap.

4D. Efficient Tree Entry Node Determination

For a given set of rays, the axis-aligned bounding box can be determined in linear time in the number of rays or determined in even constant time, if more properties are known. For this bounding box, it is relatively straightforward and numerically robust to determine whether it lies on one side of a splitting plane or intersects the splitting plane. This technique can be used in a recursive procedure to traverse down an acceleration data structure as mentioned above. If the box lies on one side of the splitting planes identified by the inner nodes of the tree, this branch is used for further traversal. Upon encountering a leaf node or a plane, which intersects the ray bounding box, this node is identified as the common entry node for the bundle of rays. Then, instead of traversing the rays from the root node of the acceleration data structure, the traversal can be started from the entry node.

The advantage of this technique is that, instead of intersecting all rays with the splitting planes, only one bounding box is tested against the splitting planes, thus saving a lot of arithmetic computations.

The described technique relies on ray bundles that take a small fraction of space instead of coherent directions, which is much harder to achieve, especially for secondary rays. It is simpler to implement and more general than other techniques.

4E. Bundle Traversal

According to a further aspect of the invention, ray bundle intersection routines have been implemented wherein SIMD instructions are used to simultaneously trace a bundle of rays through the different acceleration structures. The implementation is derived from traversed ray bundles in 3d trees. It is noted that the optimization introduced can also be used with the described bounding volume hierarchy representations.

II. Instant Ray Tracing

There are now described ray tracing techniques and systems that allow an acceleration data structure to be constructed instantly. The described techniques and systems are based on a global heuristic, which significantly improves upon previous techniques based on local criteria. Besides speed, the described techniques and systems have a number of advantages compared to previous techniques. The described techniques and systems are simpler to implement, exhibit higher numerical precision, and use only a fraction of the memory used by prior techniques. The described techniques and systems have been demonstrated by extensive measurements of their application to massive as well as dynamic scenes.

1. Introduction

As discussed above, ray tracing is a core technique in photorealistic image synthesis by global illumination simulation. It also underlies many other simulation methods. Recently, real-time ray tracing has become available. Current ray tracing algorithms owe their efficiency to additional data structures that are constructed beforehand based upon an analysis of the scene geometry. The construction of additional data structures typically requires considerable amounts of processing time and memory. Consequently, preprocessing has typically amortized only for environments that are static or that contain moderate dynamics.

Software ray tracing can compete with high-end graphics image synthesis hardware for massive geometry. Further, the acceleration data structures of ray tracing can be used to enhance the performance of rasterization. Compared to immediate-mode rendering on a rasterizer, however, the construction time and memory footprint of the acceleration data structures have been prohibitive.

Described herein is a hierarchical acceleration data structure for ray tracing that can be constructed much more efficiently than data structures constructed using prior techniques. The procedure has proven to be sufficiently rapid to allow interactive ray tracing of dynamic scenes to be made available even on monoprocessor systems.

Figure 21B:
FIGS. 21A-D show a series of images from animations and interactive applications generated using the described ray tracing techniques.
Figure 21D:
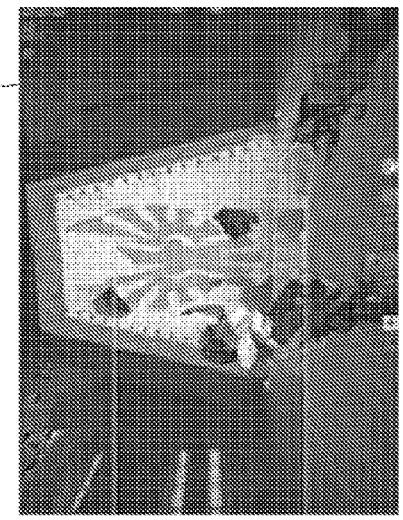
Figure 21A:
Figure 21C:
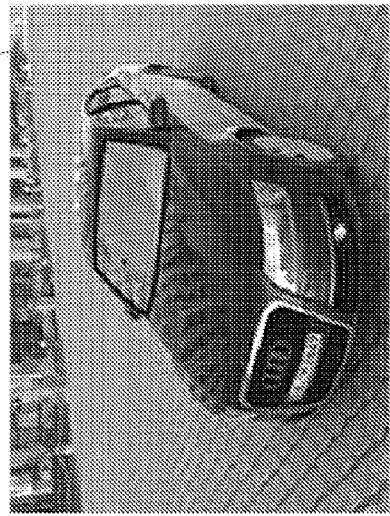

FIGS. 21A-D shows a series of images 701-704 from animations and interactive applications generated using the ray tracing techniques described herein at interactive rates on a single processor. FIG. 21D shows a scene from Quake II (Id Software, www.idsoftware.com). Applying the techniques described herein, it has been found that Quake II can be played smoothly on a dual-core processor with one shadow, reflections, and transparency.

2. Principles of Accelerated Ray Tracing

Generally speaking, a "scene" is an arrangement of objects within a three-dimensional space. The basic task in ray tracing is to search for the closest point of intersection of each ray with objects within a scene. Generally speaking, when tracing extremely large numbers of rays for image synthesis, it is not efficient to test for intersections of each ray with all of the objects in a scene. Therefore, it typically amortizes to construct additional data structures that split the scene into a number of partitions. Once the scene has been partitioned, a partition-level search, often a backtracking search, can be conducted that excludes most of the objects in the scene from actual intersection testing.

Two basic approaches are currently used to partition a scene. A first approach is based on spatial partitioning, according to which the scene is partitioned into a set of disjoint volume elements that may or may not be the same size. A second approach is based on object listing, according to which the scene is partitioned into a hierarchy of lists of objects contained in the scene. These two approaches are briefly sketched in the following subsections. As further discussed below, aside from amortizing the construction cost of the acceleration data structure, there are situations in which the additional cost of not only tracing single rays, but also ensembles of rays, can amortize.

2.1. Accelerated Ray Tracing Based on Partitioning of Space

The space containing the objects is partitioned into disjoint volume elements. Efficiency is obtained by enumerating the volume elements intersected by a ray and then testing the objects within the enumerated volume elements for intersection. A major disadvantage of space partitions is that objects often have non-empty intersections with more than one volume element, and are therefore referenced more than once. This redundancy results in a huge memory footprint and may require a mailbox mechanism to avoid performance losses arising from multiple tested intersections of a single ray with the same geometric object.

In partitioning the space, the resulting volume elements may form a regular grid. Alternatively, for example, using a binary space partitioning scheme, the space may be split into a hierarchical tree of voxels (volume cells), and sub-voxels. Each approach is discussed in turn.

2.1.1. Space Partitioning Using Regular Grids

In a partition based on a regular grid, the space is partitioned into a raster of identical rectangular axis-aligned volumes. This regular structure allows for simple techniques for enumerating the volume elements along a given ray. Each volume element contains a list of the objects that it intersects. Thus, only the listed objects in the enumerated volume elements are tested for intersection with the ray.

The memory footprint of the acceleration data structure cannot be determined a priori (i.e., in advance). Because objects can intersect multiple volume elements in the grid, the memory footprint cannot be determined until the space has been partitioned and the objects listed. Thus, dynamic memory management is required. The data structure is constructed by rasterizing the objects. Rasterization is typically performed using variants of an object-volume intersection routine, which is numerically unreliable due to the finite precision of floating point arithmetic. Rasterizing the bounding box of an object is numerically stable, but increases the memory footprint.

The efficiency of the regular grid approach suffers severely when traversing empty volume elements, especially in massive scenes. One solution to this problem is to use hierarchical grids that allow empty space to be traversed faster, while still having a moderate number of objects per volume element. Switching between the levels of the hierarchy, however, is computationally expensive and can be achieved more efficiently by other spatially adaptive schemes.

2.1.2. Binary Space Partition

A binary space partition is a hierarchical data structure. The general idea is to subdivide a scene space using arbitrary splitting planes. A first arbitrary plane is used to divide the scene space into two cells. Additional arbitrary planes are used to adaptively divide each of the two cells into sub-cells. The process is repeated recursively, in order to generate a binary search tree. Each leaf cell of the generated search tree is a volume element that contains a list of objects intersecting the leaf cell.

A binary space partitioning scheme helps to overcome the efficiency issues of regular grids caused by empty volume elements. In polygonal scenes, an obvious choice for the location of the splitting planes is to use the planes determined by the polygons themselves. However, it is currently not known how to do this in an optimal way, and randomized algorithms are expected to yield trees of quadratic size based on the number of objects in the scene.

A type of tree known as a "k-dimensional tree," or "kd-tree," restricts binary space partitions to using only planes that are perpendicular to the canonical axes. Since all normals of the subdivision planes coincide with a unit vector of one of the canonical axes, scalar products and object-volume element intersection tests become more efficient and numerically robust than those obtainable using a binary space partition scheme that is not axis-aligned. Along with heuristics for subdivision, kd-trees have been used successfully for accelerating ray tracing. However, the determination of how a volume element intersects an object remains a numerical issue.

As with all spatial partitioning schemes, in a kd-tree-based scheme, objects can reside in more than one volume element. Although the number of multiple references can be effectively reduced by allowing only partitioning planes through the vertices of the objects, or through the sides of axis-aligned bounding boxes, the number of references cannot efficiently be bounded a priori. Consequently, memory management becomes an issue during the construction of the hierarchy. Known heuristics used for memory estimation and allocation can be far too pessimistic for some scenes or, even worse, can result in various reallocations if the memory footprint increases during the construction phase. These reallocations can result in significant performance losses.

2.2. Accelerated Ray Tracing Based on Partitioning of Object Lists

When partitioning a list of objects, each object remains referenced at most once, and it is therefore possible to predict memory requirements a priori. In addition, each object is intersected at most once with a given ray. Consequently, mailboxes become redundant. As an unavoidable consequence, however, the volumes enclosing groups of objects often cannot be disjoint.

2.2.1. Bounding Volume Hierarchy

A bounding volume hierarchy is a type of partitioning scheme in which objects in a scene are bounded by axis-aligned volume elements. Bounding volume hierarchies are commonly used in industry since memory requirements can be bounded linearly, a priori, based upon the number of objects. Implementing bounding volume hierarchies does not require object-plane intersection routines. As a consequence, they are simpler to implement than spatial partitioning schemes. Using axis-aligned rectangular bounding volume elements avoids any numerical stability issues during construction as only minimum/maximum operations are used.

There exist heuristics for both bottom-up and top-down construction of bounding volume hierarchies. The usual heuristic is to minimize the overall volume or area of all bounding volume elements. Exact optimization procedures along these lines are prohibitively slow. Currently, it is not clear which construction technique is the most efficient.

Severe performance penalties stem from the fact that, in contrast with space partitions, the bounding volume elements are not ordered spatially. Thus, usually all child nodes have to be intersected with a ray, and an early pruning is impossible.

2.3. Summarizing Current Approaches to Accelerated Ray Tracing

The simplicity, numerical robustness, and predictable memory footprint make bounding volume hierarchies an attractive choice for accelerated ray tracing. However, current performance is far from what is obtainable using kd-trees. At the price of generally unpredictable memory requirements and numerical issues arising during the construction of the acceleration data structure, kd-trees can be used to obtain real-time performance for static and moderately dynamic scenes.

Both principal approaches, i.e., those based on either space partitioning or on object lists, suffer from construction routines that are far from real-time and use greedy algorithms. Even the most successful implementation, the surface area heuristic, is extremely time-consuming. As this heuristic requires a significant amount of analysis of scene geometry and twiddling, the construction of acceleration data structures for a complex mesh can easily range from minutes to even days.

Using current techniques, it is possible to reduce data structure construction times to the point where they amortize for static scenes, very moderate dynamics, or deformables. However, it is far more difficult for construction times to amortize in fully dynamic settings. Current attempts to deal with fully dynamic scenes use an approach based on regular grids, with all its disadvantages, and are only efficient for scenes of moderate complexity.

3. The Bounding Interval Hierarchy

An aspect of the present invention provides a technique, based on a "bounding interval hierarchy," that offers significantly increased speed for both static and dynamic scenes, features much higher numerical precision, and allows the memory footprint to be fixed a priori. The described techniques, thus, combine the advantages of spatial partitioning and partitioning object lists. Comparisons with two fully optimized, state-of-the-art, kd-tree-based ray tracers show that the described technique can outperform a kd-tree-based technique for most scenes by a factor of two or greater for both total rendering time and overall memory consumption. Some of the results obtained using the described techniques are set forth in the table shown in FIG. 37, discussed below.

3.1. Data Structure

For each node in the data structure, a bounding interval hierarchy stores, for one of the x-, y-, or z-axes, two parallel planes perpendicular to the axis. By contrast, in a classic bounding volume hierarchy a full axis-aligned bounding box is stored for each child.

According to the presently described technique, given a bounding box and a selected axis, a left child L is generated by replacing the maximum value along the selected axis by an L splitting plane. The right child R is generated by replacing the minimum value along the selected axis by an R splitting plane.

Thus, the left side of the generated L child will be inherited from the left side of the parent bounding box, and the right side of the L child will be the L splitting plane. The left side of the R child will be the R splitting plane, and the right side of the R child will be inherited from the right side of the parent bounding box. As described in greater detail below, the L child and R child may or may not overlap. If the placement of the splitting planes results in a child with zero volume, the zero volume is used to represent an empty child. As discussed below, the described technique allows the storage of empty leaf nodes to be omitted.

Figure 22A:
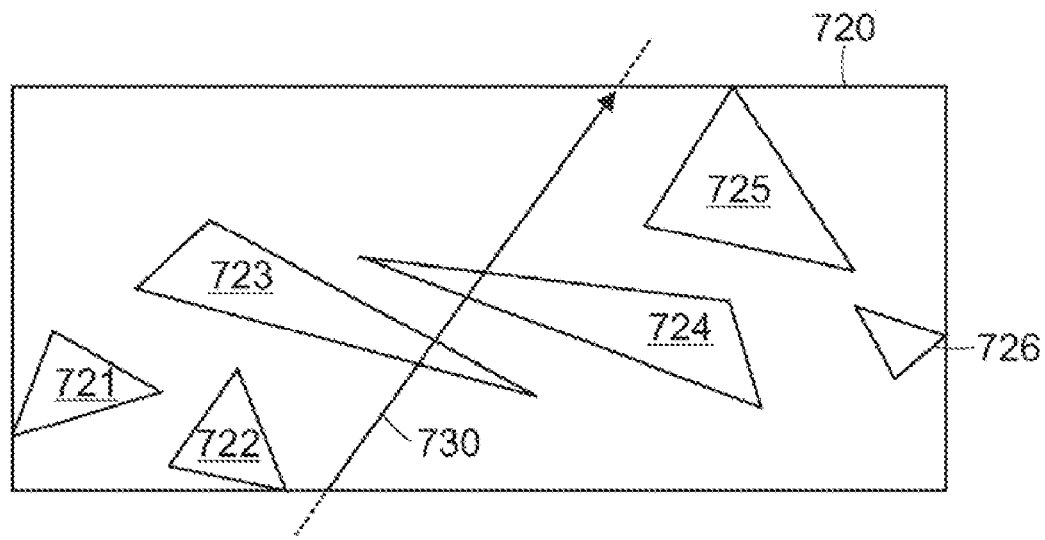
FIGS. 22A-E and 23A-D are a series of diagrams illustrating differences between a binary space partitioning technique and the described bounding interval hierarchy technique.

FIGS. 22A-E and 23A-D are a series of diagrams illustrating differences between a binary space partitioning technique and a bounding interval hierarchy. FIG. 22A shows a bounding box 720 containing six geometric primitive objects 721-726, in this case, triangles. A ray 730 traverses the bounding box 720.

Figure 22B:
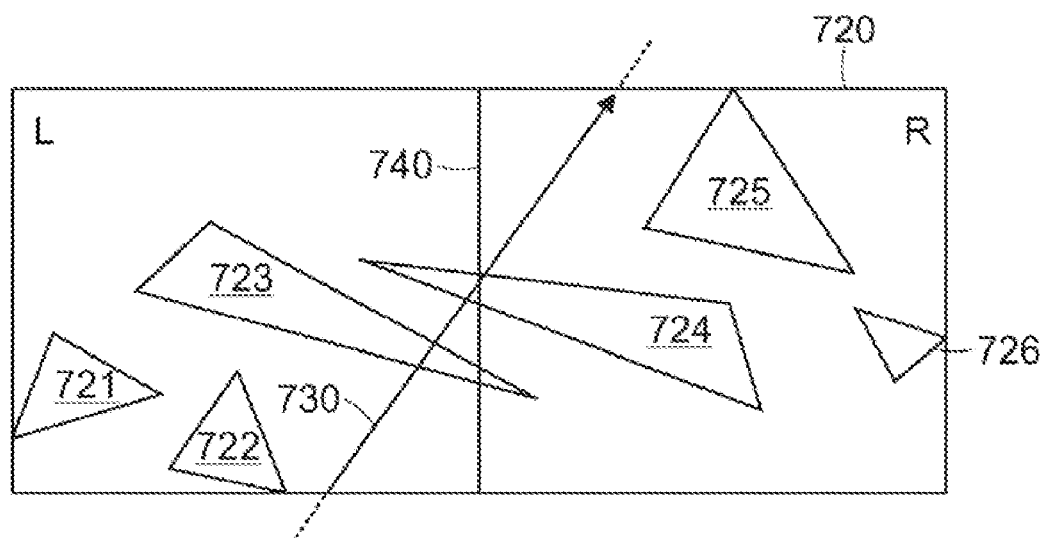

FIG. 22B illustrates the use of a binary space partitioning technique. A central splitting plane 740 is used to subdivide the bounding box 720 into an L child and an R child. As shown in FIG. 22B, objects 721 and 722 are entirely contained within the L child, and objects 725 and 726 are entirely contained with the R child. However, it will be seen that the middle two objects 723 and 724 intersect the splitting plane, and are therefore intersect both the L child and the R child. The middle objects 723 and 724 are therefore referenced in both the L and R child volume elements.

Figure 22C:
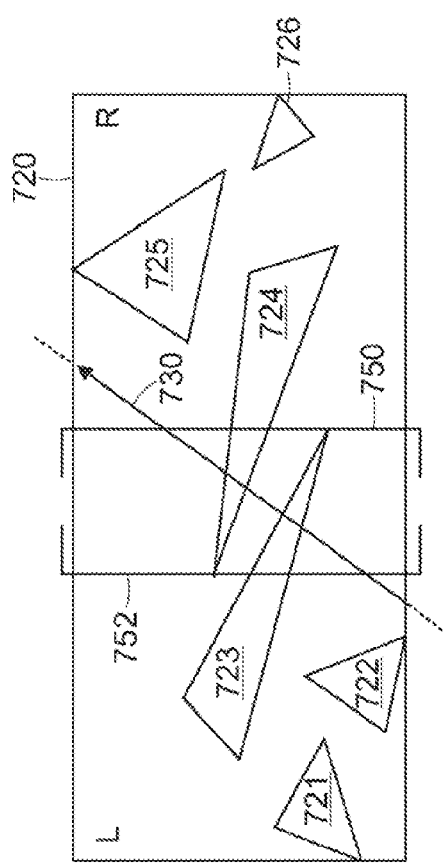
Figure 22E:
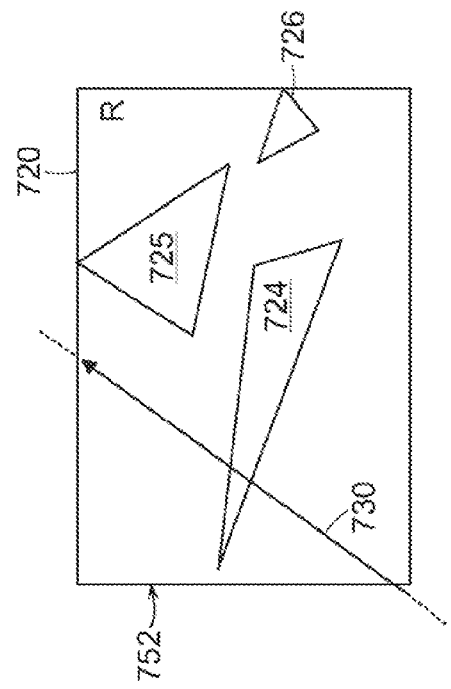

FIG. 22C shows the bounding box of FIG. 22A, which has been subdivided using a boundary interval hierarchy technique according to the present invention. Each of the primitive objects 721-726 in the bounding box 720 is classified as a left object or a right object, based upon their position relative to a candidate splitting plane. According to a further aspect of the invention, discussed below, the location of the candidate splitting plane may advantageously determined at a global, scenic level, rather than locally. Where an object is intersected by a candidate splitting plane, the object is classified as left or right depending upon which side of the plane the object intersects most.

Figure 22D:
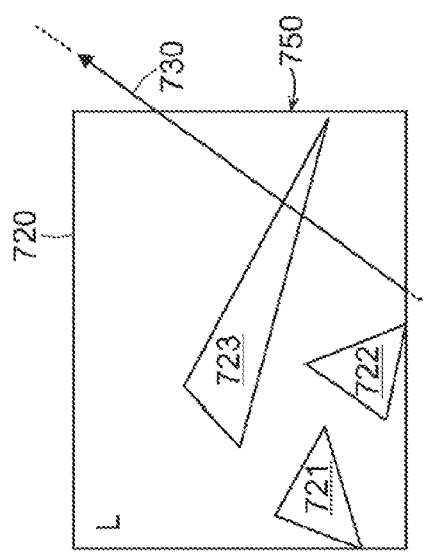

Once all of the objects have been classified as L objects or right objects, an axis-aligned L splitting plane is placed at the maximum, i.e., rightmost, point of the L objects, according to the selected axis. Similarly, an axis-aligned R splitting plane is placed at the minimum, i.e., leftmost, point of the R objects, according to the selected axis. In FIG. 22D, the L splitting plane is represented by bracket 750, and the R splitting plane is represented by bracket 752. The L and R splitting planes split the bounding box 720 into an L child and an R child that, in the present example, overlap.

As described above, the left side of the L child is inherited from the left side of the parent bounding box 720, and the right side of the L child is the L splitting plane 750. Similarly, the left side of the R child is the R splitting plane 752, and the right side of the R child is inherited from the parent bounding box 720. For purposes of clarity, the resulting L child and R child are drawn separately in FIGS. 22D and 22E.

Figure 23A:
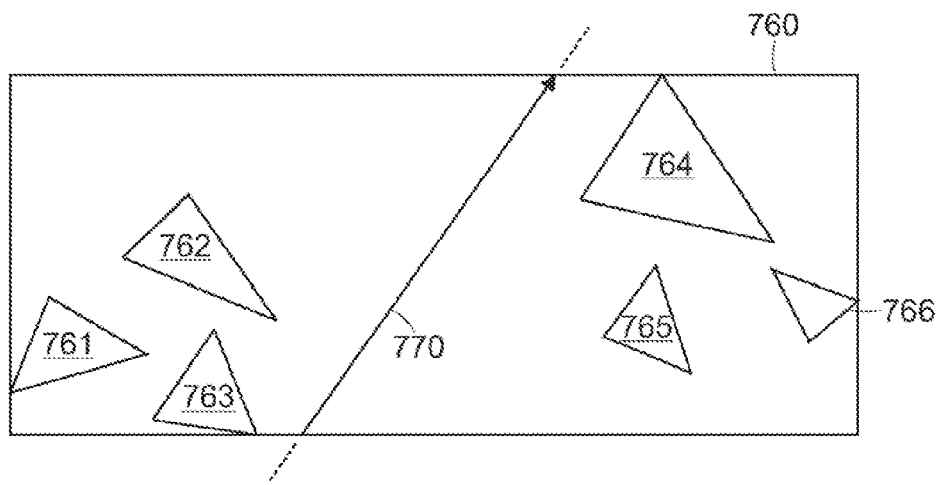

FIGS. 23A-D illustrate a second case illustrating the difference between a binary space partitioning scheme and a bounding interval hierarchy. FIG. 23A shows a diagram of a bounding box 760 is shown containing a number of objects 761-766. A ray 770 traverses the bounding box 500.

Figure 23B:
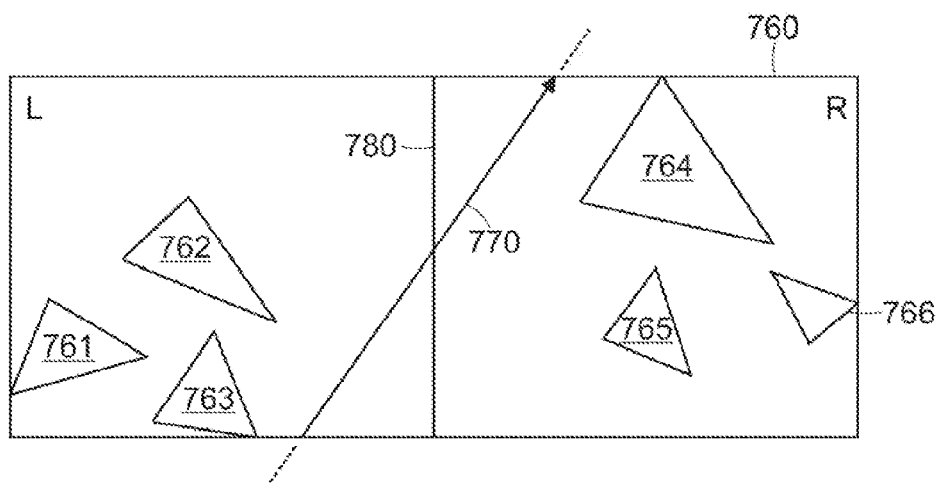

FIG. 23B shows the application of a binary space partitioning scheme. The bounding box is divided by a central splitting plane 780 into abutting L and R child volume elements. In this example, none of the contained objects 761-766 intersect the splitting plane 780. However, it will be seen that the ray 770 traverses a significant amount of empty space in both the L and R cells.

Figure 23C:
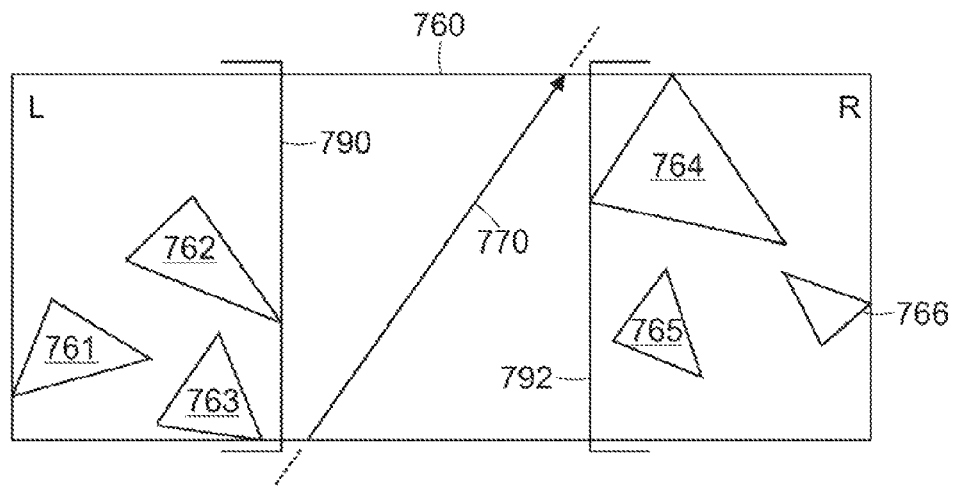

In FIG. 23C, a bounding interval hierarchy approach is applied. The objects are classified as L or R objects, based upon their position relative to a candidate splitting plane. Here, assuming a centrally located candidate splitting plane, the classification process is straightforward, since objects 761-763 are clearly to the left of center, and objects 764-766 are clearly to the right of center. An L splitting plane 790 is placed at the maximum, i.e., rightmost, point of the L objects, and an R splitting plane 792 is located at the minimum, i.e., leftmost, point of the R objects.

Once again, the left side of the L child is inherited from the left side of the parent bounding box 760, and the right side of the L child is the L splitting plane 790. Similarly, the left side of the R child is the R splitting plane 792, and the right side of the R child is inherited from the parent bounding box 760. For purposes of clarity, the resulting L child and R child are drawn separately in FIG. 23D.

Figure 23D:
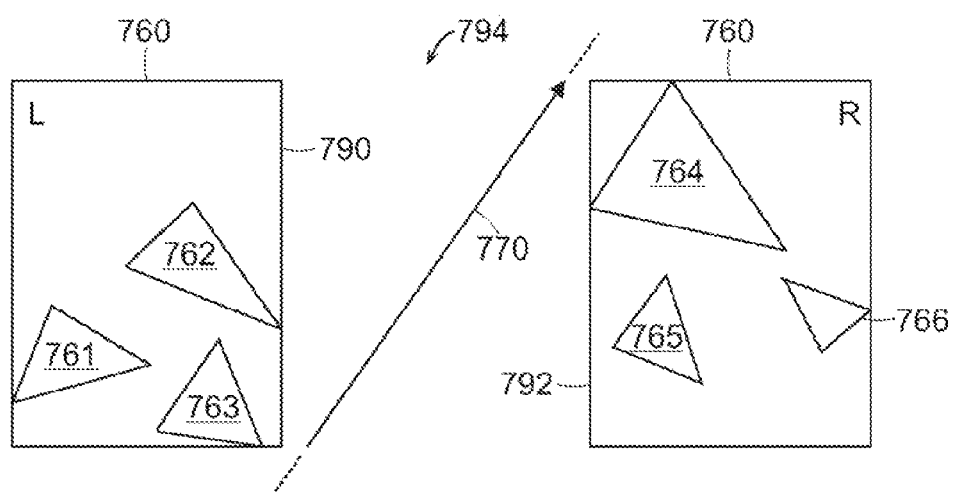

As shown in FIG. 23D, in this example, there is an empty space 794 between the two cells. Returning to FIG. 23B, it will be seen that in a binary space partitioning technique, only four traversal cases need to be accounted for: left only (L), right only (R), left-then-right (LR) and right-then-left (RL). However, as shown in FIG. 23D, in constructing a bounding volume hierarchy, there is a fifth case that needs to be accounted for, i.e., the "empty volume" case. However, it will be appreciated that the bounding interval hierarchy results in a significant savings in computational cost, because it reduces the amount of empty space that is processed within an individual cell.

Thus, it will be seen from FIGS. 22A-E and 23A-D that the described technique significantly improves over currently used binary space portioning techniques by, first, eliminating intersections between objects and splitting planes and, second, by significantly reducing the amount of empty space in child volume elements.

Figure 24B:
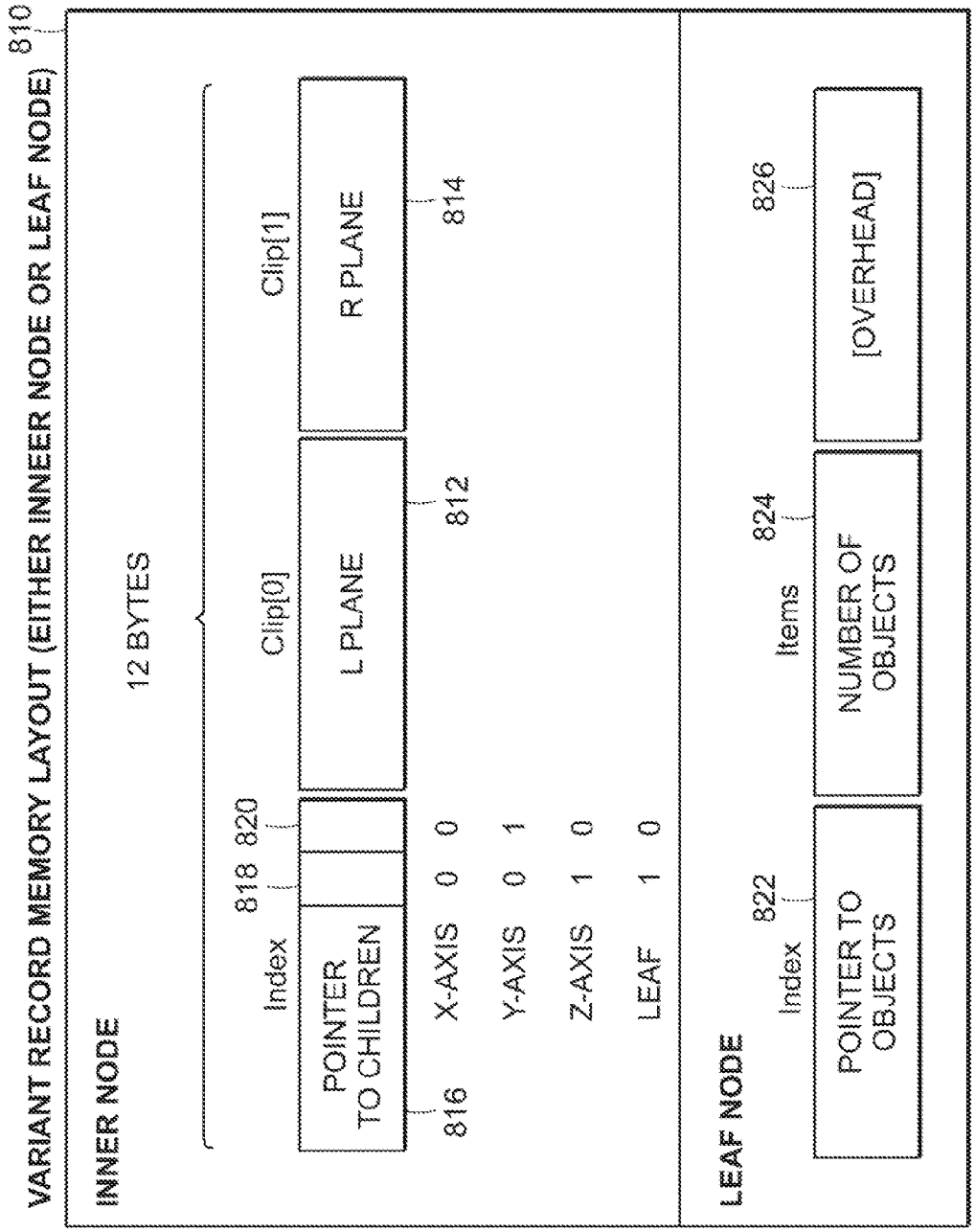
FIG. 24B shows a memory layout of the data structure.

FIG. 24A shows an exemplary code listing 800 for defining a data structure for use with the above-described techniques, and FIG. 24B shows a 12-byte memory layout 810 of the data structure. The inner nodes of the tree are described by (1) the two splitting planes 812 and 814 defining a bounding interval and (2) a pointer 816 to a pair of children. As this sums up to 12 bytes in total, all nodes are aligned on four-byte boundaries. This alignment allows the use of the lower two bits 818 and 820 of the children-pointer to indicate the axis (00: x, 01: y, 10: z) or a leaf (case 11). Leaf nodes comprise a 32-bit pointer to the referenced objects 822 and their overall number 824. The overhead 826 of four bytes in the leaf nodes can be resolved by a careful implementation, as they use only eight bytes out of the node data structure. It should be noted that aspects of the depicted code listing and data structure, including the use of a 12-byte memory layout and a 32-bit pointer, are specific to the example implementation, and may be modified for different computing environments having different word sizes.

3.2. Ray Intersection

Intersecting a ray with a bounding interval hierarchy binary tree is similar to traversing a bounding volume hierarchy. (As discussed above, a bounding volume hierarchy is a partitioning technique based on a list of objects contained within a scene.) However, unlike the children in a bounding volume hierarchy, the children in a bounding interval hierarchy are spatially ordered. Thus, a bounding interval hierarchy can be processed much more efficiently than a bounding volume hierarchy, since it is possible to directly access the child that is closer to the ray origin by the sign of the ray direction. Thus, as illustrated in FIGS. 22A-E and 23A-D, discussed above, the traversal becomes almost identical to that of a kd-tree-based spatial partitioning.

In analogy to bounding volume hierarchies, it is also possible to not intersect any child at all if the valid ray segment is between two non-overlapping children, as shown in FIG. 23D. Handling this additional case is beneficial, because it implicitly skips empty space. Consequently, empty leafs can never be accessed and therefore do not need to be stored, as mentioned above.

In contrast to spatial partitions, the volume elements of a bounding interval hierarchy can overlap. Consequently, the recursive traversal cannot stop as soon as an intersection is found. It is generally necessary to test all remaining volume elements on the stack for closer intersections. However, as soon as an intersection is found, branches of the hierarchy can be pruned if they represent volume elements farther away than the current intersection.

3.3. Construction of the Hierarchy

The key to the performance of the described data structure is its efficient construction. Assuming a given candidate splitting plane, the technique used in the presently described implementation is relatively straightforward: Each object is classified as either a "left object" or a "right object" depending on which side of the plane it overlaps most. Other heuristics may be used to classify the objects as left objects or right objects. The two partitioning plane values of the child nodes are then determined, respectively, by the maximum (i.e., rightmost) coordinate of the classified left objects and the minimum (i.e., leftmost) coordinate the classified right objects, along a selected axis.

A further aspect of the invention provides a technique for determining the location of candidate splitting planes for use in the construction of bounding interval hierarchies.

3.3.1. Global Heuristic for Determining Splitting Planes

There is now described a technique for using a global heuristic to determine candidate splitting planes. Unlike previous approaches, the described heuristic is non-greedy and is cheap to evaluate, because it does not explicitly analyze the objects to be ray traced.

According to the presently described technique, candidate splitting planes are used that result from hierarchically subdividing an axis-aligned scene bounding box along the longest side in the middle. It should be noted that, applying this technique, all of the candidate planes form a regular grid.

Figure 25A:
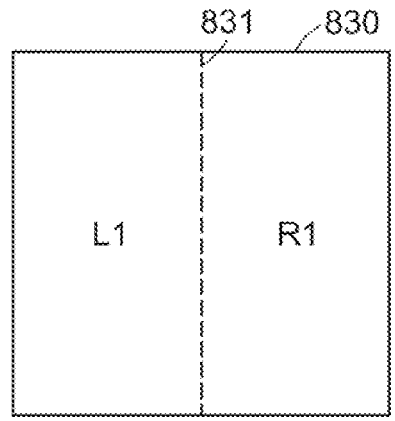
FIGS. 25A-D show a series of simplified diagrams illustrating a described technique for determining candidate splitting planes without object analysis.

FIGS. 25A-D show a series of simplified diagrams illustrating the determination of candidate splitting planes without object analysis. FIG. 25A shows a bounding box 830 that has been split by a "first generation" candidate splitting plane 831. The splitting plane 831 passes through the center of the bounding box 700 dividing it into an L1 region and an R1 region. It is important to note that the L1 and R1 regions are not children, but instead provide an indication as to how objects residing in those regions are to be classified. In actuality, as described above, one or both of the children may overlap the splitting plane. Also there may be an empty space between the children. In addition, one of the children may have a zero volume.

Figure 25B:
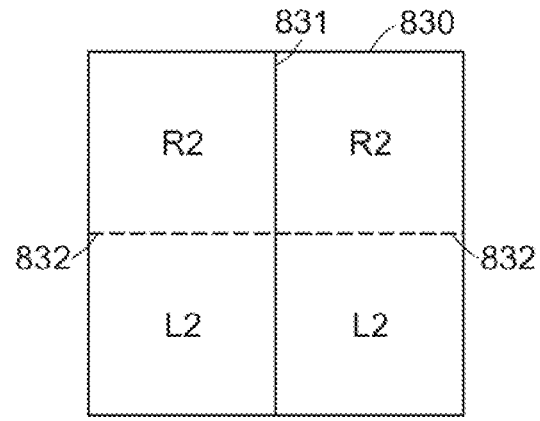

FIG. 25B shows the bounding box 830, which is split by the first splitting plane 831, and by a pair of "second generation" candidate splitting planes 832. The candidate splitting planes are all "single" planes, even if they coincide. They are generated during recursion. The second generation planes 832 are used to determine L2 and R2 for a second generation of children.

Figure 25C:
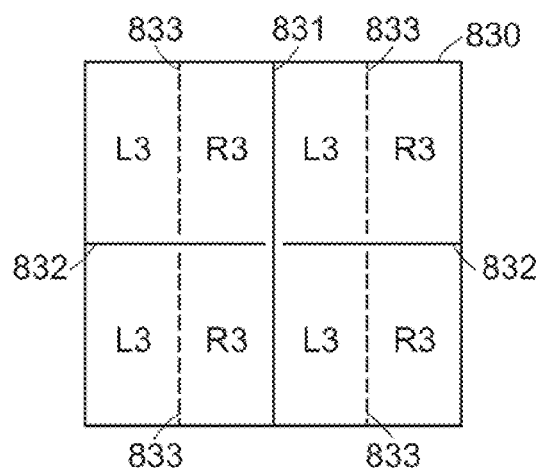
Figure 25D:
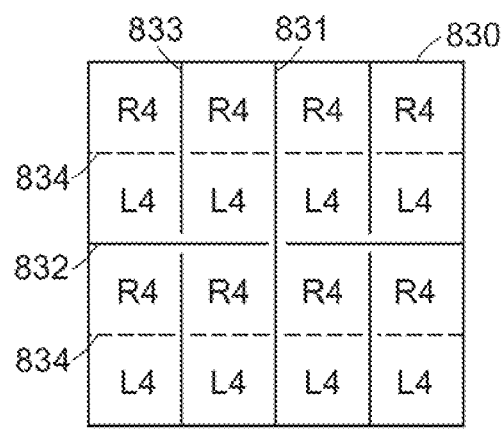

FIGS. 25C and 25D show the bounding box 830 split by third and fourth generation planes 833 and 834. These planes 833 and 834 determine L and R for the third and fourth generation of children (respectively, L3/R3 and L4/R4). The process continues recursively in order to generate as many generations of candidate splitting planes as necessary.

Because the candidate splitting planes are determined globally without an analysis of the particular objects contained in the bounding box 830, it will be seen that, in certain situations, it is possible that the globally determined candidate splitting plane for a particular generation may lie outside of the bounding box of a parent volume element of that generation to be subdivided. In that case, the process is continued with candidate planes lying within the half in which the parent volume element resides.

Figure 26:
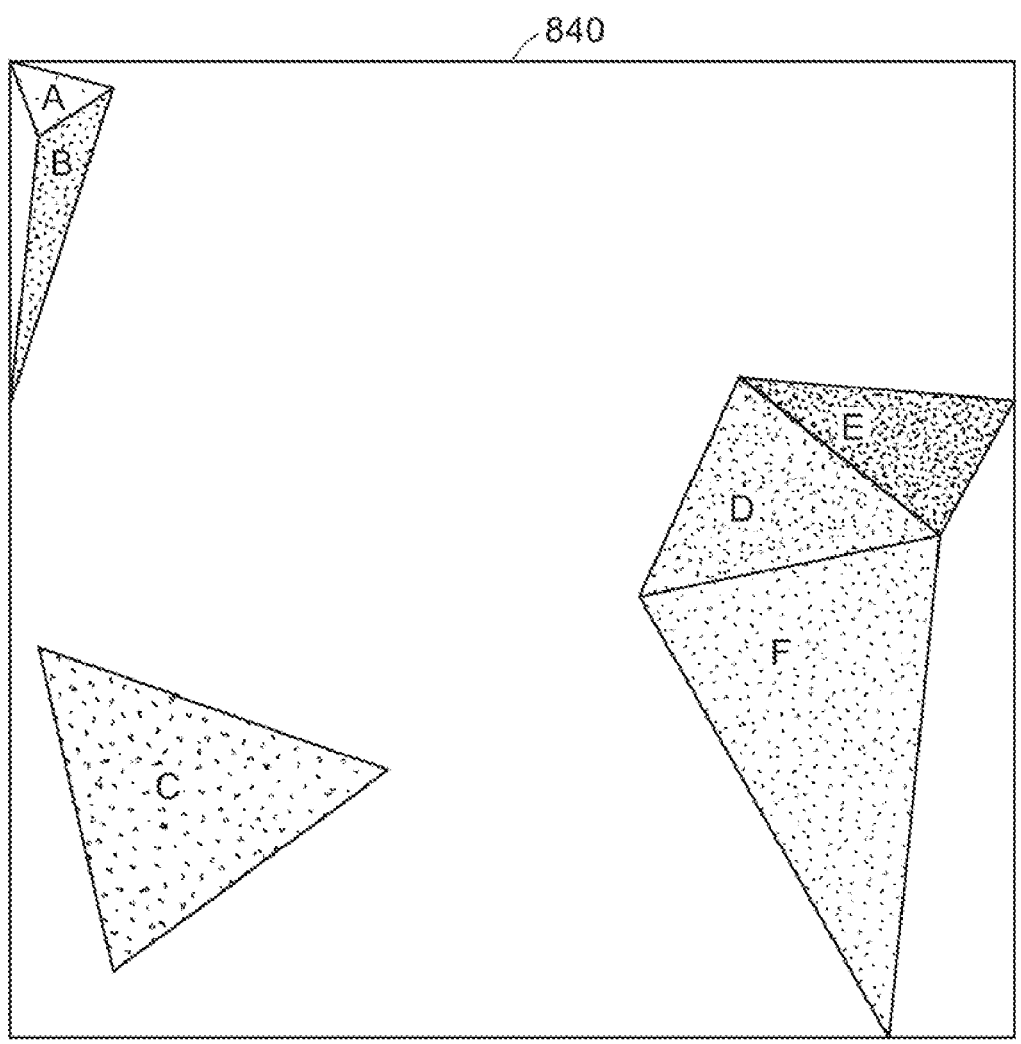
FIG. 26 shows a diagram of an exemplary bounding box containing six objects A-F.
Figure 27:
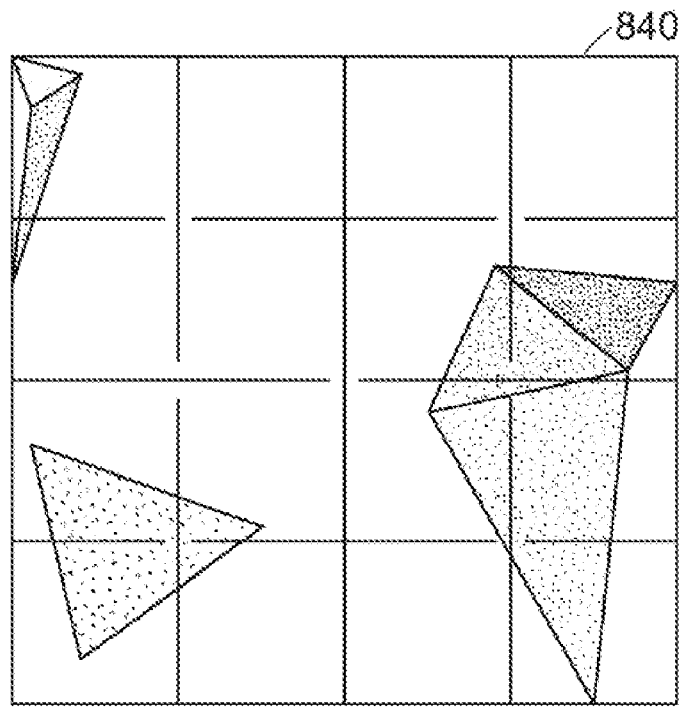
FIG. 27 shows four generations of candidate splitting planes superimposed over the bounding box shown in FIG. 26.
Figure 28:
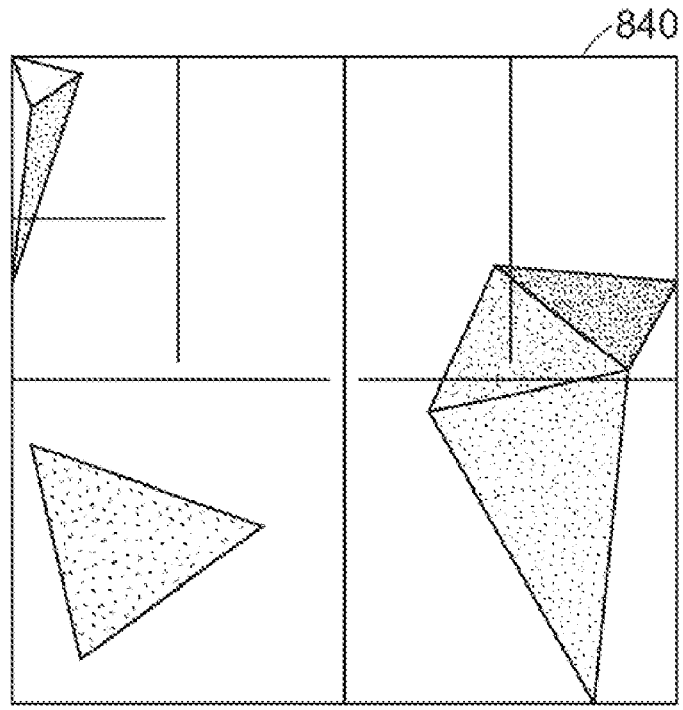
FIG. 28 shows the splitting planes of interest in FIG. 27.
Figure 29:
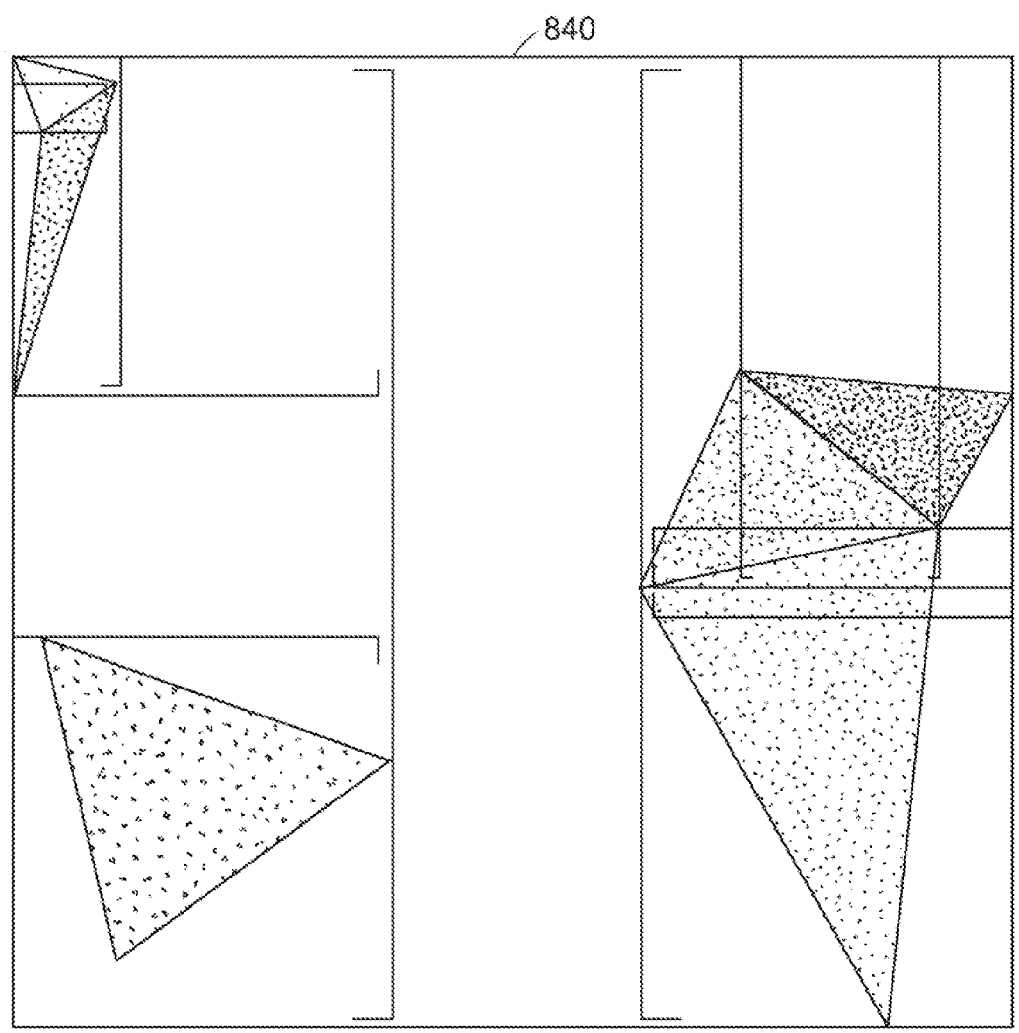
FIG. 29 shows a diagram illustrating how each of objects A-F are contained in child bounding boxes of various generations.

The use of the globally determined candidate splitting planes is now discussed with respect to a specific example. FIG. 26 shows a diagram of a bounding box 840 containing six objects A-F. FIG. 27 shows four generations of candidate splitting planes superimposed over the bounding box 840, and FIG. 28 shows the splitting planes of interest in building a bounding interval hierarchy based upon the particular set of objects A-F contained in the bounding box. FIG. 29 shows a diagram illustrating how each of objects A-F are contained in child bounding boxes of various generations, determined in accordance with the presently described techniques.

FIG. 29 is now explained, generation by generation.

Figure 30A:
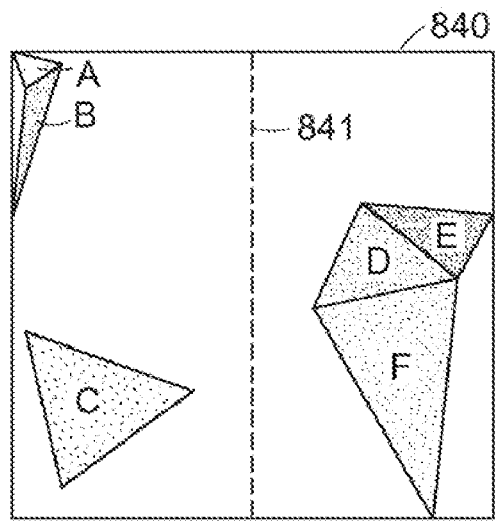
FIGS. 30A-C illustrate the first generation of children generated from the scene shown in FIG. 26.
Figure 30B:
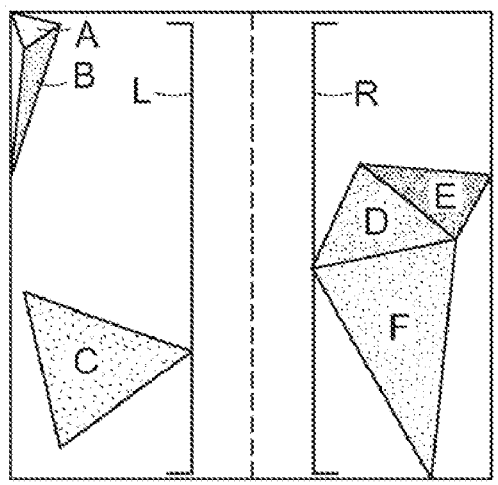
Figure 30C:
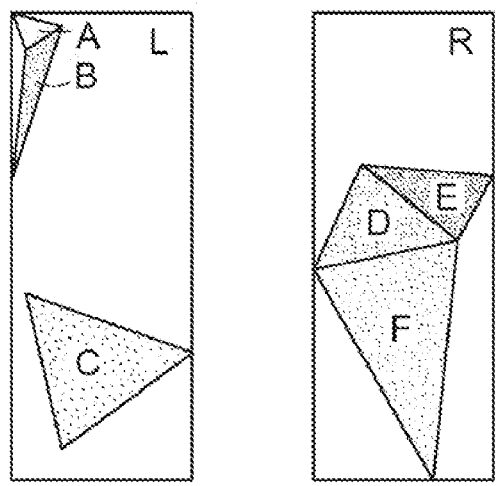

FIGS. 30A-D illustrate the first generation of children generated from the FIG. 26 scene 840. In FIG. 30A, the globally determined the first generation candidate splitting plane 841 is used to classify objects A-F as L objects or R objects. Clearly, A-C are L objects and objects D-F are R objects. FIG. 30B shows the first generation of L and R children. The right side of the L child is a plane passing through the rightmost point of the L objects, and the left side of the R child is a plane passing through the leftmost point of the R objects. FIG. 30C shows the result L and R children.

Figure 31A:
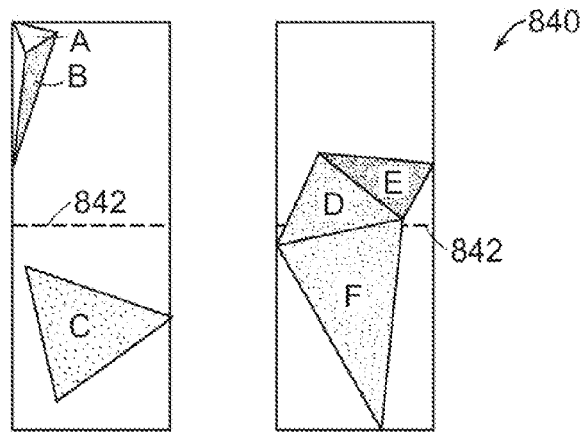
FIGS. 31A-C illustrate the second generation of children generated from the scene shown in FIG. 26.
Figure 31B:
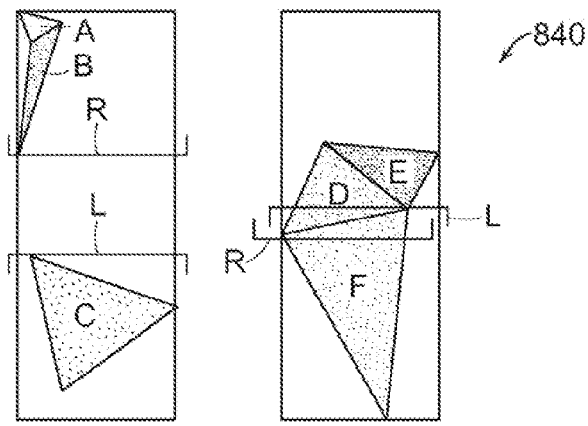
Figure 31C:
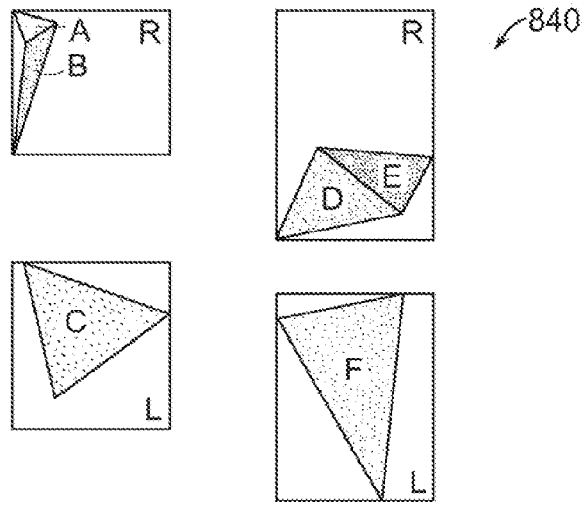

FIGS. 31A-C illustrate the second generation of children. In FIG. 31A, the globally determined second generation candidate splitting plane 842 is used to classify the objects in the first generation children into L and R objects, and as shown in FIG. 31B, L and R children are generated according to the described technique. The resulting second generation children are shown in FIG. 31C. On the right side of the diagram, it will be seen that the position triangles D and F result in overlapping children, which have been separated for clarity.

Figure 32A:
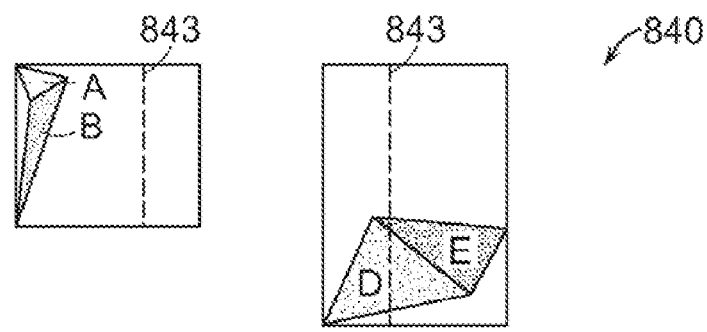
FIGS. 32A-C illustrate the third generation of children generated from the scene shown in FIG. 26.
Figure 32B:
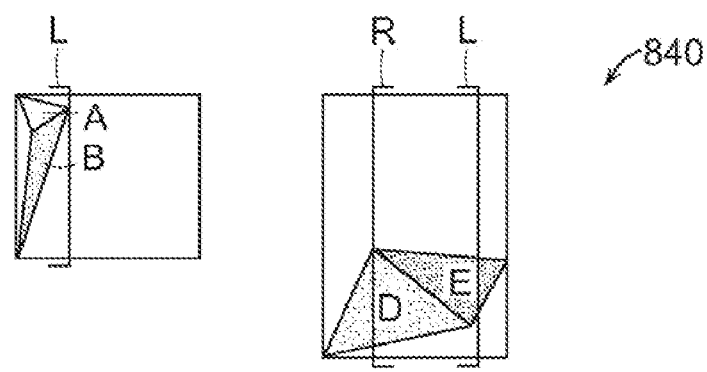
Figure 32C:
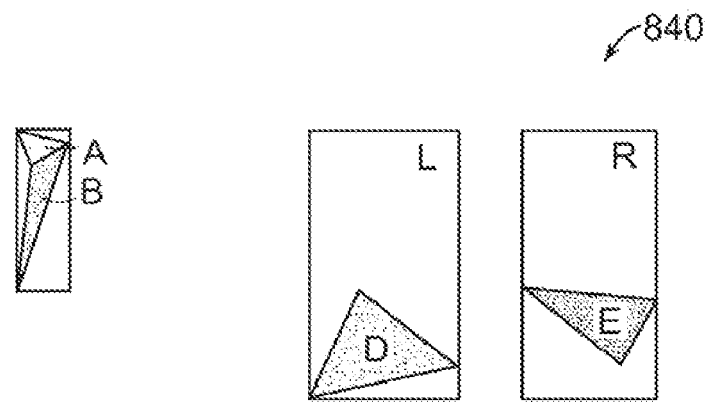

FIG. 32A-C illustrate the third generation of children. It will be seen that since the candidate planes have been generated globally, the candidate splitting planes 843 in the present example are off-center, and do not subdivide the child boxes into boxes of equal volume. FIG. 32B shows the placement of L and R splitting planes, and FIG. 32C shows the resulting children. It should be noted with respect to the bounding box containing objects A and B that the described technique results in an R child having an empty volume. The resulting L child contains objects A and B, but with reduced empty space.

FIGS. 33A-E show the generation of children for objects A and B. As shown in FIG. 33A, the globally determined candidate fourth generation splitting plane 844 do not divide A and B into L and R objects. Rather, both are classified as R objects. Because the left side of the bounding box is determined by the leftmost point of the R objects, the result is an empty-volume L child and an R child inheriting all of its sides from its parent.

As shown in FIG. 33B, because the candidate splitting planes have been generated globally rather than locally, the fifth generation candidate splitting plane 845 does not bisect the bounding box, but rather lies outside of the bounding box. It will be seen in FIG. 33B that the bounding box resides to the left of plane 845. Thus, as described above, the process continues with candidate planes lying to the left of plane 845.

FIG. 33C shows the sixth generation candidate splitting plane 846. This time, the candidate splitting plane 846 divides the bounding box such that A is now an L object and B is an R object. FIG. 33D shows the placement of L and R splitting planes, and FIG. 33E shows the resulting L and R children.

Together with the technique described in the previous subsection, the object list is recursively partitioned and bounding boxes are always aligned to object bounding boxes. If a splitting plane candidate separates objects without overlap, the resulting splitting planes implicitly become tightly fitted to the objects on the left and right thus maximizing empty space, as shown in FIGS. 23C-D. Although the recursion terminates when only one object is left, it is efficient to define the number of objects, for which a recursion still pays off.

It is important to note that the splitting plane candidates are not adapted to actual bounding boxes of the inner nodes, but are solely determined by the global bounding box of the scene. In other words, after child cells have been defined after one iteration, the subsequently used candidate plane is not the midpoint of that new cell, but is rather the corresponding initial global candidate plane This aspect of the technique is different from previous approaches, and tends to keep bounding boxes as cubic as possible throughout the whole hierarchy.

3.3.2. Approximate Sorting

The amount of time required to construct the above-described data structures is O (n log n), on the average. According to a further aspect of the invention, a bucket sorting preprocess is used to decrease the constant of the order.

In a bucket sorting preprocess, a high-level sort is performed in which individual items to be sorted are first sorted into "buckets." For example, sorting a deck of cards by rank and suit may be accomplished by first sorting the cards into four piles by suit, and then sorting each individual suit pile by rank. Each suit pile functions as a bucket. Generally speaking, dividing the sorting function in this way tends to decrease the overall amount of time required for the process.

Similarly, the amount of time required to sort the objects in a scene into a hierarchically ordered set of bounding boxes containing the objects may be significantly reduced if the objects are first preliminarily sorted into meaningful buckets containing like numbers of objects for which bounding boxes are to be constructed.

Figure 34:
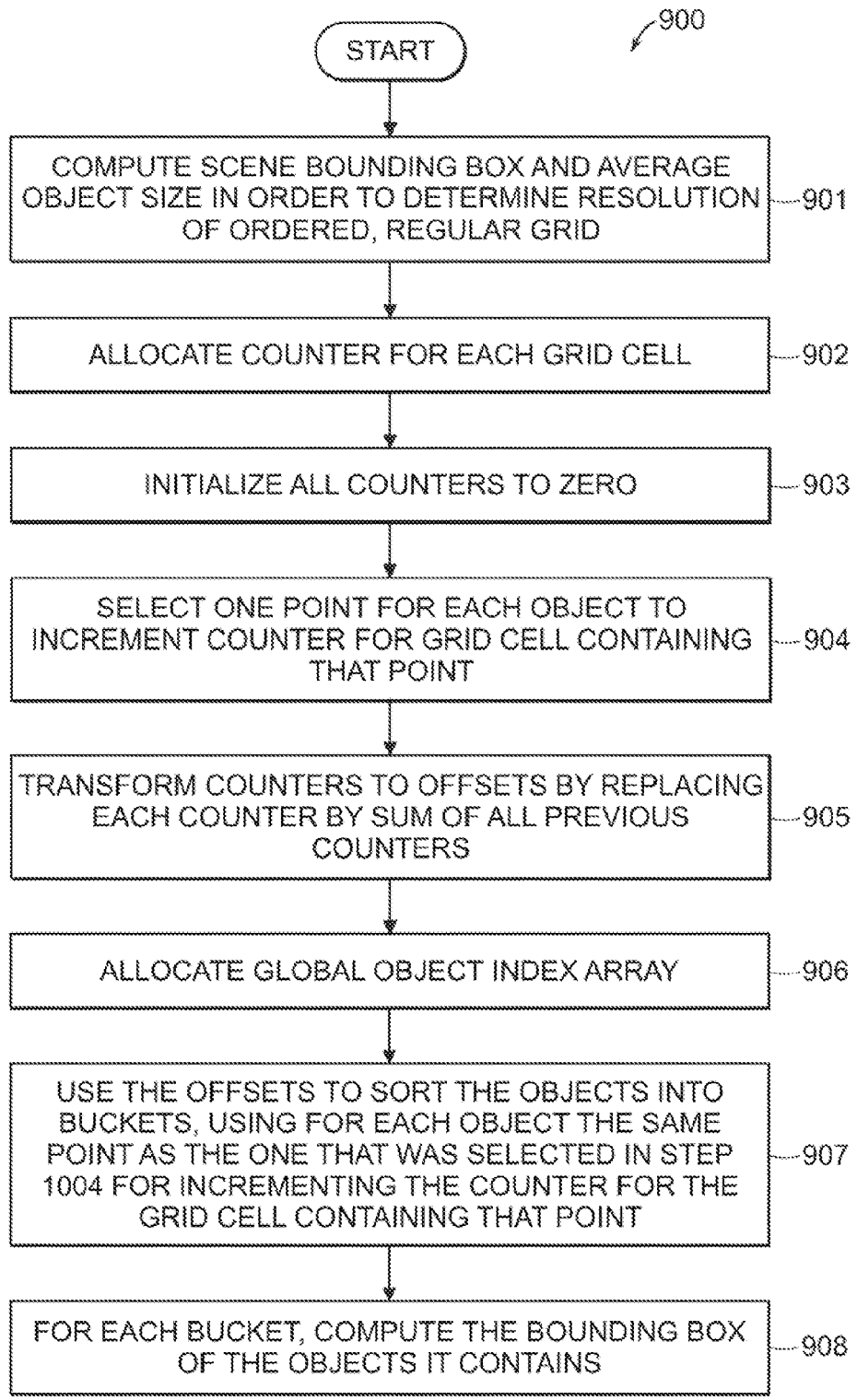
FIG. 34 shows a flowchart of a method according to a further aspect of the invention for performing a bucket-sorting preprocess in conjunction with the construction of the described data structures.

FIG. 34 shows a flowchart of a method 900 according to this aspect of the invention. In step 901, the size of a scene bounding box and the average size of the objects contained therein are computed in order to determine the resolution of a regular, ordered grid. Alternatively the resolution can be specified by the user. As shown in step 902, each grid cell includes a counter. In step 903, all of the counters are set to zero.

In step 904, one point for each object, such as, for example, one corner of its bounding box, is used to increment the counter in the grid cell containing that point. It is worth noting that the point selected "for" an object does not necessarily need to be a point "on" the object. It will be seen that the number of points within a particular grid cell may vary widely, depending upon how the objects are distributed within the scene. It may be possible for some grid cells to contain only one point, or even zero points. It will further be seen that since one and only one point for each object is counted, the sum of all counters equals the number of objects.

It will further be seen that objects may overlap more than one cell, or even several grid cells. Also, it may be possible for most of an object to reside outside of the grid cell in which the object's selected point resides. It will be seen that such occurrences may reduce the overall amount of time saved by the bucket sort, but will not affect the validity of the final data structures.

In step 905, the counters are then transformed into offsets by replacing each counter by the sum of all previous counters in the voxel order of the cells/voxels in the grid, or in the order in which they are laid out in memory.

In step 906, a global object index array is allocated. In step 907, using the same point of every object, the objects now can be sorted into buckets of like size, using the offsets from step 905. As discussed above, the sum of the grid counters yields the number of objects in the scene and determines the size of the index array. The bucket size is determined by the number of counted objects within.

In step 908, for each bucket, there is computed, as described above, the bounding box of the objects it contains.

Sorting the bounding boxes instead of the objects they contain speeds up construction by a factor of two to three. If a volume element consists of one container only, the container is replaced by the objects within. The resulting trees are very similar in rendering performance and size, as illustrated in FIG. 42, discussed below.

By using this simple streaming technique, it is possible to partition a scene using a limited amount of memory and in linear time. Even the index array can be processed in chunks.

3.3.3. Implementation Details

Because the bounding interval hierarchy is an object partitioning scheme, all object sorting can be done in place and no temporary memory management is required. The recursive construction procedure only needs two pointers to the left and right objects in the index array, similar to a quicksort-based technique.

On the other hand, spatial partitioning schemes need to handle objects that overlap volume elements. For example the recursive kd-tree construction needs a vast amount of temporary data to be placed on the stack to be able to continue with backtracking later on.

A variant of the above scheme can alleviate these inefficiencies and makes in-place sorting available for kd-trees. The procedure requires a second array of object references that is used to keep the objects that are classified as "both left and right" (i.e., as overlapping the kd-tree splitting plane). Testing with a large number of scenes has indicated that the size of the second array can be chosen by a default value. Generally speaking, a length equal to the number of objects is far more than what would be required 99 percent of the time. However, because the real length of the array cannot be predicted, it might be necessary to reallocate memory.

Figure 35:
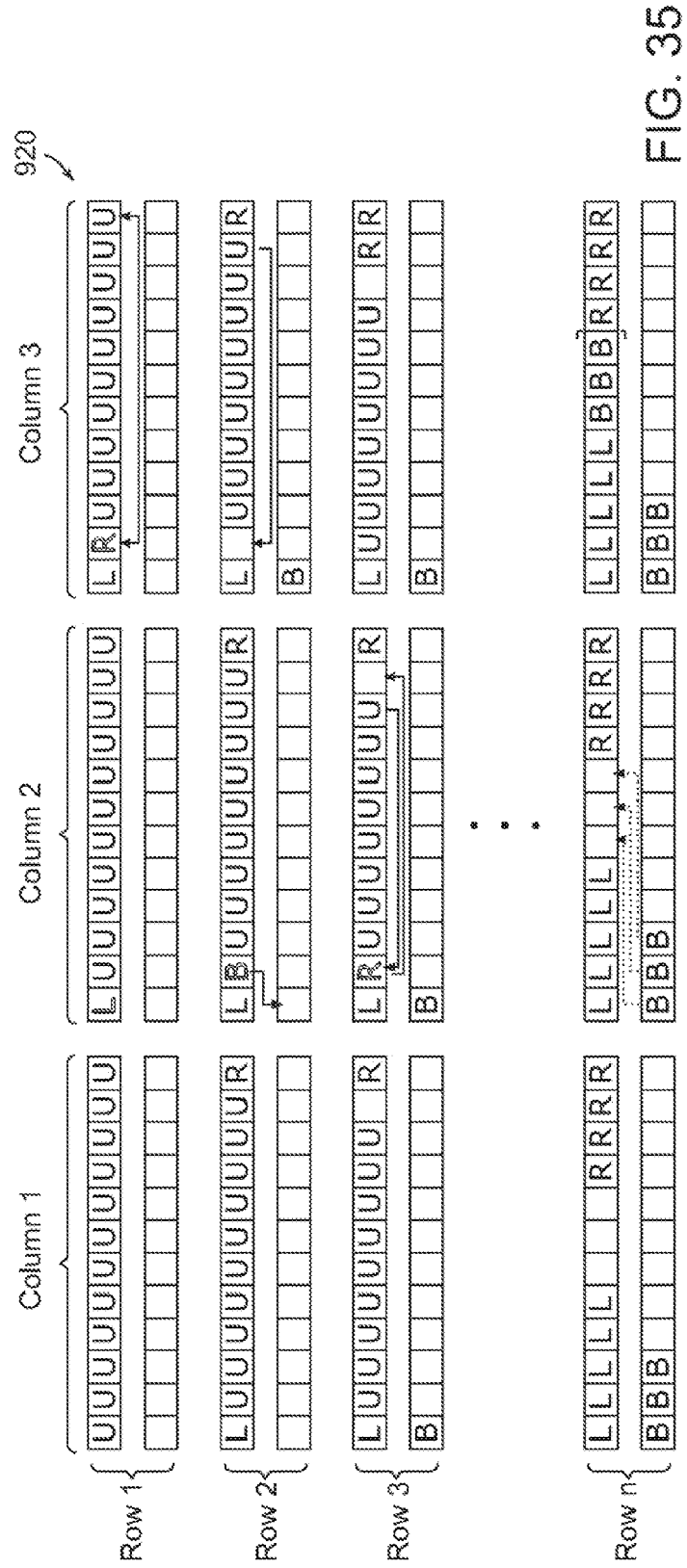

The procedure is illustrated in FIGS. 35 and 36. FIG. 35 shows a series of pairs of arrays 920, in which the upper array illustrates in-place sorting of object indices, and in which the lower array illustrates storing operations onto the global stack during tree construction. The series of array pairs proceeds from left to right and top to bottom.

In the first row, first column, the upper array contains a set of unordered elements. In the second column, sorting the unordered array has revealed a left element, which stays in place. In the third column, the second element is an R element, which must go to the right, and is therefore exchanged with an unsorted element from the right end of the upper array.

In the second row, first column, the second element has been exchanged for an unsorted element from the right end of the upper array. In the second column, the element now in second position is revealed to be a "both" (i.e., overlapping) element, and is therefore moved to the global stack, i.e., the lower array. In the third column, the rightmost unsorted element is moved into the vacant position in the array.

In the third row, first column, the rightmost unsorted element has been moved into the vacant second position in the array. This element is now revealed to be an "R" object and is moved to the vacant position at the right side of the array. The third column shows the upper array configuration that results after this move.

The process continues recursively until all of the elements in the array have been ordered, as shown in row n. As shown in the first column of row n, the sorting operating has revealed three "both" objects, which are stored in the first three positions in the lower array. In the second column, the three "both" objects are moved into the upper array in the vacant positions between the L and R objects. The third column shows the completed sort.

FIG. 36 shows a series of three array pairs 930, illustrating the restoring of stacked object indices after a stack "pop" operation.

3.4. Construction on Demand

So far the presented framework already allows for interactive ray tracing. However, construction time and memory footprint of the acceleration data structure can be further optimized by constructing it only, where rays traverse, i.e., where geometry is intersected. The implementation with the bounding interval hierarchy is relatively straightforward and is especially beneficial for large scenes that feature a high depth complexity. Since all object sorting is done in place, only a flag is required to mark volume elements that have not yet been subdivided. Upon traversal of a ray, the subdivision routine is called if the flag is set. A simple optimization is to subdivide a node completely, if all objects contained in it fit into the cache (e.g. L1- or L2-cache). The on-demand construction removes the classic separation of traversal and construction routines. Using this simple extension it was possible to render the Boeing 777 mesh shown in FIG. 22 at HDTV resolution in 3-9 minutes (depending on camera position) from scratch on a single core Opteron 2.2 GHz 32 GB RAM machine. Compared to previous approaches only a fraction of memory is used.

4. Discussion

The bounding interval hierarchy is an object partitioning scheme that benefits from the efficient traversal techniques of spatial partitioning schemes. In this section, there are discussed some of the advantages of this approach.

4.1. Memory Footprint

Since the construction algorithm matches splitting planes to object bounding boxes, the number of inner nodes in the hierarchy is bounded by six times the number of objects. In the case of polygons this number is bounded by the minimum of the previous bound and three times the number of vertices. The number of object references exactly matches the number of objects in the scene.

Due to multiple object references, the latter bound is not available for spatial partitioning schemes as for example the kd-tree. The problem becomes apparent, where objects feature a locally high number of overlapping bounding boxes or almost random distribution: In the BART museum the number of replicated triangle indices was about 400 times (peak value) the number of triangles, which also resulted in a 40 times higher number of nodes than in the bounding interval hierarchy. This problem is intrinsic to kd-trees, as the first top level splits already duplicate a lot of object references. This duplicative effect is often continued during recursion.

4.2. Numerical Precision

The bounding interval hierarchy construction only uses bounding box information and minimum/maximum operations in the canonical coordinate system. As such the procedure is numerically unconditionally robust. Spatial partitioning schemes require object plane intersection routines that rely on operations that suffer from floating point imprecisions. In order to make the schemes stable, tolerances must be added. As a consequence, performance suffers.

4.3. Tracing Ensembles of Rays

If rays are coherent, it can pay off to trace ensembles (or arrays) of rays instead of single rays. While primary rays easily can be grouped in coherent sets, it becomes already difficult to get the same benefits for ensembles of shadow rays from point light sources. Transparent, reflected, or rays from random walk simulations lack sufficient coherency. Nevertheless, given an ensemble of coherent rays, the approaches to trace ensembles of rays benefit from the data structure described herein. This benefit is due to the reduced memory bandwidth and increased cache coherency resulting from the small memory footprint. Furthermore the volume elements appear generally larger than the corresponding volumes of a kd-tree, which relaxes the conditions on coherency. Experiments have indicated that the speedup-ratio from single ray to 2-ray-bundle-tracing is slightly higher for the bounding interval hierarchy as compared to a kd-tree. Frustum-culling techniques have been successfully transferred to bounding volume hierarchies. These techniques can be readily transferred to the bounding interval hierarchy by tracking the current volume element bounding box on the stack. Although the hierarchy also can be updated in other ways, the described construction routine is significantly faster than the surface area heuristic, and removes the severe restriction to meshes animated by deformations. For 2×2 ensembles of rays the ray tracing performance obtained by the more general technique is at least as fast. Finally, the node data structure is much smaller. For the sake of completeness, it is noted that ensembles of rays also can be efficiently traced using the grid acceleration data structure. However, large objects overlapping multiple grid cells, as well as secondary rays, cause severe performance losses. In general, the shaft-culling techniques fail over distance for diverging ensembles of rays.

4.4. Hardware Considerations

Based on the recent findings in real-time ray tracing the RPU (ray processing unit) chip has been designed. While the architecture efficiently can ray trace and shade bundles of rays, it can be easily improved by our approach: The bounding interval hierarchy has a much smaller memory footprint and as an object partitioning scheme does not need a mailbox unit. Only the TPU unit has to be extended by a second plane intersection. These modifications easily can be incorporated due to the similarity of the bounding interval hierarchy traversal to a kd-tree traversal. More important the above-described data structure construction technique uses only simple operations and therefore is a very good candidate for hardware implementation.

4.5. Massive Data Sets

Figure 38:

Current data sets used in industrial applications and production rendering consist of massive amounts of geometry, which usually range from hundreds of megabytes to several gigabytes of raw data. Although, as discussed above, the small memory footprint of the boundary interval hierarchy allows massive scenes to be efficiently ray-traced by simple means, there still may be situations in which the data does not fit into the main memory. Accordingly, a minimal memory footprint renderer has been implemented, which is able to render pictures of the Boeing 777 using only 50 MB of RAM. If more RAM is available (1 GB was assumed for measurement purposes), it is possible to render a picture from scratch in less than an hour even on a standard consumer desktop PC, as illustrated in FIG. 38. To achieve the minimal memory usage, the above-described preprocessing step is used to sort the objects into buckets, which are then stored on the computer's hard drive. For the rendering step, a top-level bounding interval hierarchy is created out of the buckets, without the need to touch any object. Each bucket that is intersected by a ray creates its own tree using the on-demand policy. The bucket's objects and the acceleration data structure are kept in a cache of either dynamic (i.e., able to grow until no more RAM is available) or fixed, user-defined size. The bucket with the largest number of objects defines the maximum memory footprint. It should be noted that this result is obtained for free from the bucket sorting preprocess. In this scenario, the processing speed is determined by the speed of the hard drives. The tree construction algorithm is so fast that, if parts of the acceleration data structure have to be flushed, they are just thrown away and rebuilt on demand.

4.6. Large Objects

It might be suggested that the bounding interval hierarchy performance suffers when encountering a mixture of small and large geometric elements. While this is partially true, it is also true for spatial partitioning schemes. In this situation a kd-tree subdivides the scene by inserting more splitting planes. This results in deeper trees, a duplication of object references, and an overall increased memory footprint. Deeper trees increase the traversal time. The performance problem of boundary interval hierarchies in such a scenario can be spotted by the example of the BART robots, shown in FIG. 39. The scene is made up of large triangles for the streets and houses, but also features a lot of finer geometry, such as the signs and the walking robots. As the large triangles cause large overlapping volumes in the hierarchy, an early pruning of the tree becomes impossible and more triangles per ray have to be tested. The classic workaround in a rendering system is to subdivide large objects beforehand. In order to moderately increase memory, the objects should be divided by planes perpendicular to the canonical axis. While the memory consumption now increases similar to the kd-tree, it is still possible to determine memory consumption a priori. As the described approach is intended for production systems with displacement mapping and a significant amount geometric detail, the above discussion does not impose problems. In fact, the problem only persists for low-polygon-count architectural scenarios. Even older games typically use 200,000 to 500,000 visible triangles per frame.

5. Results

The results of comparisons between currently used techniques and the improved techniques described herein are set forth in FIGS. 37-42.

FIG. 37 shows a table 940 comparing the presently described techniques and state-of-the-art kd-tree implementations, using a very simple shader and 2×2 (SSE accelerated) ray bundles. The performance data were measured on a P4HT 2.8 GHz, with a resolution of 640×480. The InView column refers to a professional real-time rendering product (in Trace GmbH, www.intrace.com). The WH06 column refers to data achieved using techniques described in Wald and Havran, "On Building Fast kD-Trees for Ray Tracing," Technical Report, SCI Institute, University of Utah, No. UUSCI-2006-009 (submitted for publication) (2006). The WH06 performance data were measured on a faster Opteron 2.6 GHz. The term "time to image" refers to a measurement of the total rendering time for one picture, thus including on-demand tree construction, ray tracing, and shading. As shown in FIG. 37, the bounding interval hierarchy (BIH) achieved superior results in both memory and total time to image.

FIG. 38 shows a table 950 comparing the present described techniques and a state-of-the-art kd-tree implementation, using advanced shades that trace single rays only (640×480, P4HT 2.8 GHz). "Time to image" measures the total rendering time for one picture, thus including on-demand tree construction, ray tracing, and shading. FIG. 38 illustrates a stress test for on-demand construction, because the global illumination computations require a construction of almost the entire tree.

Figure 39A:
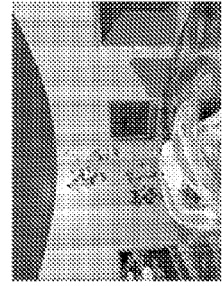

FIG. 39 shows a table 960 setting forth the results of a comparison using dynamic environments (640×480, P4HT 2.8 GHz). The complete data structure is rebuilt per frame, from scratch. The museum is traced using (a) simple shading and (b) full shading, using an average of 4 rays per pixel. In both cases, only single rays were traced. The remaining BART scenes were rendered using the simple shader, while the Utah Fairy Forest used full shading.

Figures 40, 41:
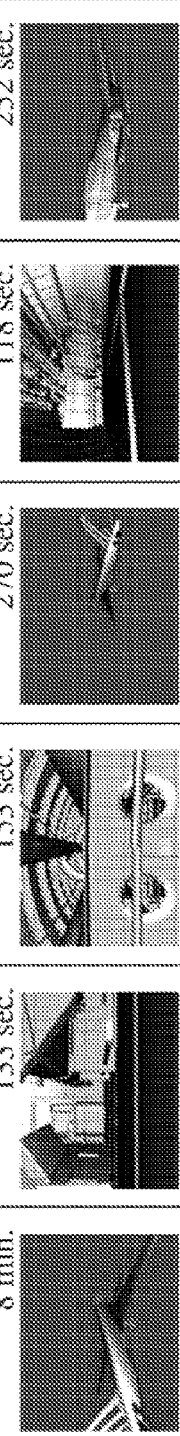

FIG. 40 shows a table 970 setting forth total rendering times (1280×1024, single-core Opteron 875 2.2 GHz 32 GB) including on-demand tree construction for the huge Boeing 777 data set (349,569,456 triangles, which amounts to 12,584,500,416 bytes). Reading the triangle data from hard disk is omitted, since it depends heavily on the hard disks used. In the present example, with the particular equipment used, the loading time was 40-90 seconds.

FIG. 41 shows a table 980 setting forth rendering times (1280×1024, P4HT 2.8 GHz 2 GB RAM), including low-level, on-demand tree construction and loading all necessary triangle groups from disk. The top-level bucket sort preprocess, done once for all views, required an additional 53 minutes, but only used a peak 737 MB of RAM. The cache sizes for the preprocessing and rendering were chosen to be suitable for any consumer machine offering at least 1 GB of RAM. More RAM allows for even faster rendering times, as in the previous figure, whereas the preprocessing step is mainly limited by the hard disk, which in the present example was relatively slow and inexpensive.

FIG. 42 shows a table 990 comparing the bounding interval hierarchy (BIH) with and without the above-described bucket sort preprocess (640×480, P4HT 2.8 GHz) to numbers taken from Wald and Havran, where a faster Opteron 2.6 GHz process was used. Frames per second (FPS) are given relative to the "pure" bounding interval hierarchy, as FPS for several camera positions was averaged. The bounding interval hierarchy shows superior results, particular when combined with a bucket sort preprocess.

6. Conclusion

Aspects of the present invention provide improved techniques for accelerating ray tracing, particularly when used in fully dynamic environments or for massive data sets. Both the memory footprint and construction time of the described data structure are significantly smaller, compared to previous approaches. The described techniques allow for real-time ray tracing of dynamic content without restrictions to the geometry. These techniques also enable the much more efficient computation of unbiased motion blur. The simplicity and predictability of the technique along with its global heuristic make it a good candidate for a hardware implementation. First experiments using the bounding interval hierarchy with freeform surfaces have been promising. The new global heuristic was compared to the much more complicated kd-tree construction heuristics that were used for measurement purposes in the paper: The simpler scheme results in almost identical performance.

Figure 43:
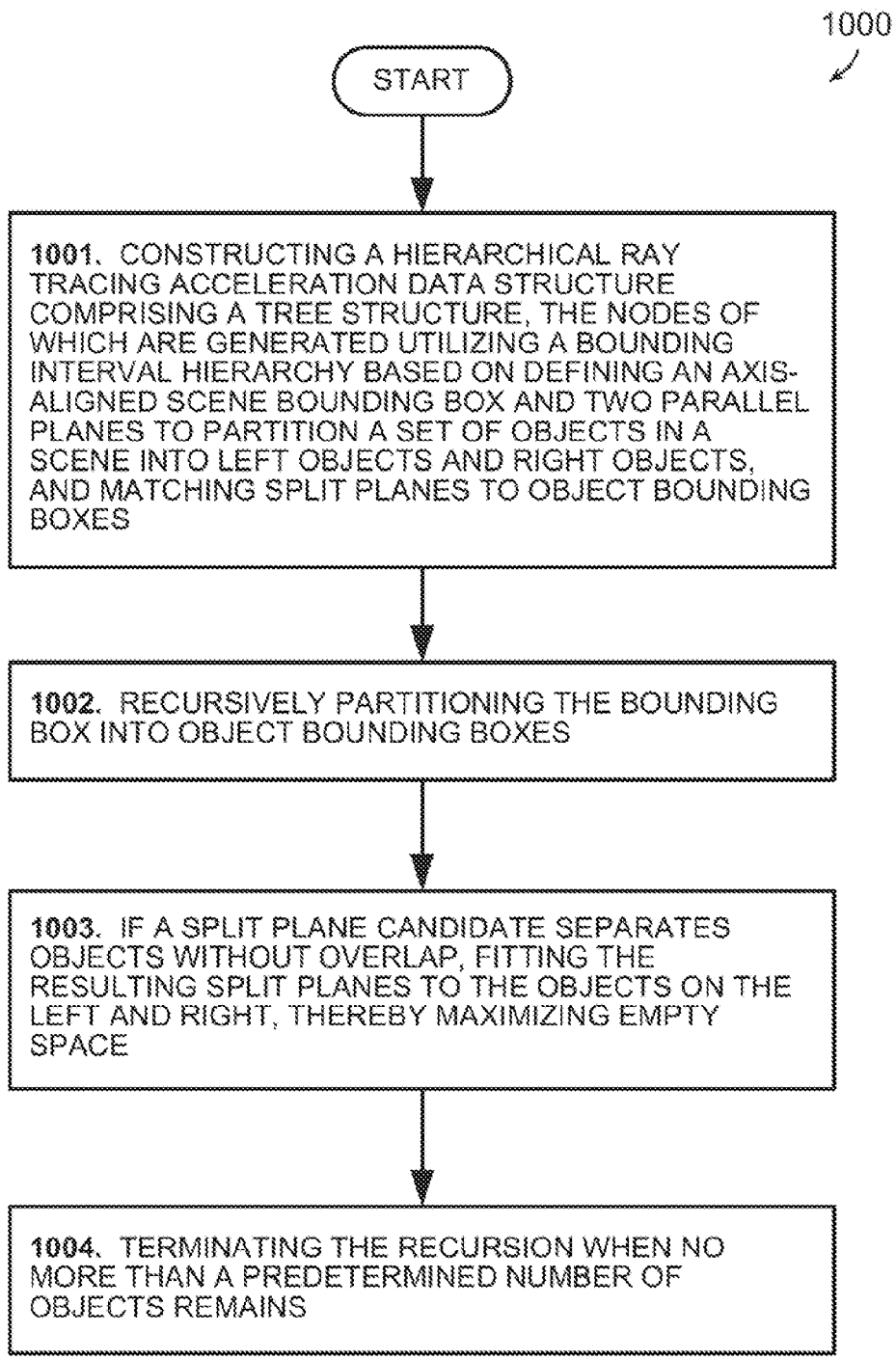
FIGS. 43 and 44 show flowcharts of overall techniques in accordance with described aspects of the invention.

FIG. 43 shows a flowchart 1000 of an overall technique according to described aspects of the invention. As discussed above, the technique is advantageously implemented in a computer graphics system comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of points in a scene as recorded on an image plane of a simulated camera, the computer being operable to generate pixel values for an image using a ray-tracing methodology, the ray-tracing methodology comprising the use of a ray tree and an associated ray tracing data structure, the ray tree including at least one ray shot from the pixel into a scene along a selected direction, the ray-tracing methodology further comprising the calculating of the intersections of rays and surfaces of objects in the scene, and the ray-tracing being determined in response to the results of processing of objects in an image.

In step 1001, a hierarchical ray tracing acceleration data structure is constructed comprising a tree structure. The nodes of the tree structure are generated utilizing a bounding interval hierarchy based on defining an axis-aligned scene bounding box and two parallel planes to partition a set of objects in a scene into left objects and right objects, and matching split planes to object bounding boxes.

In step 1002, the bounding box is recursively partitioned into object bounding boxes.

In step 1003, if a split plane candidate separates objects without overlap, the resulting split planes are fitted to the objects on the left and right, thereby maximizing empty space.

In step 1004, recursion is terminated when no more than a predetermined number of objects remains.

Figure 44:
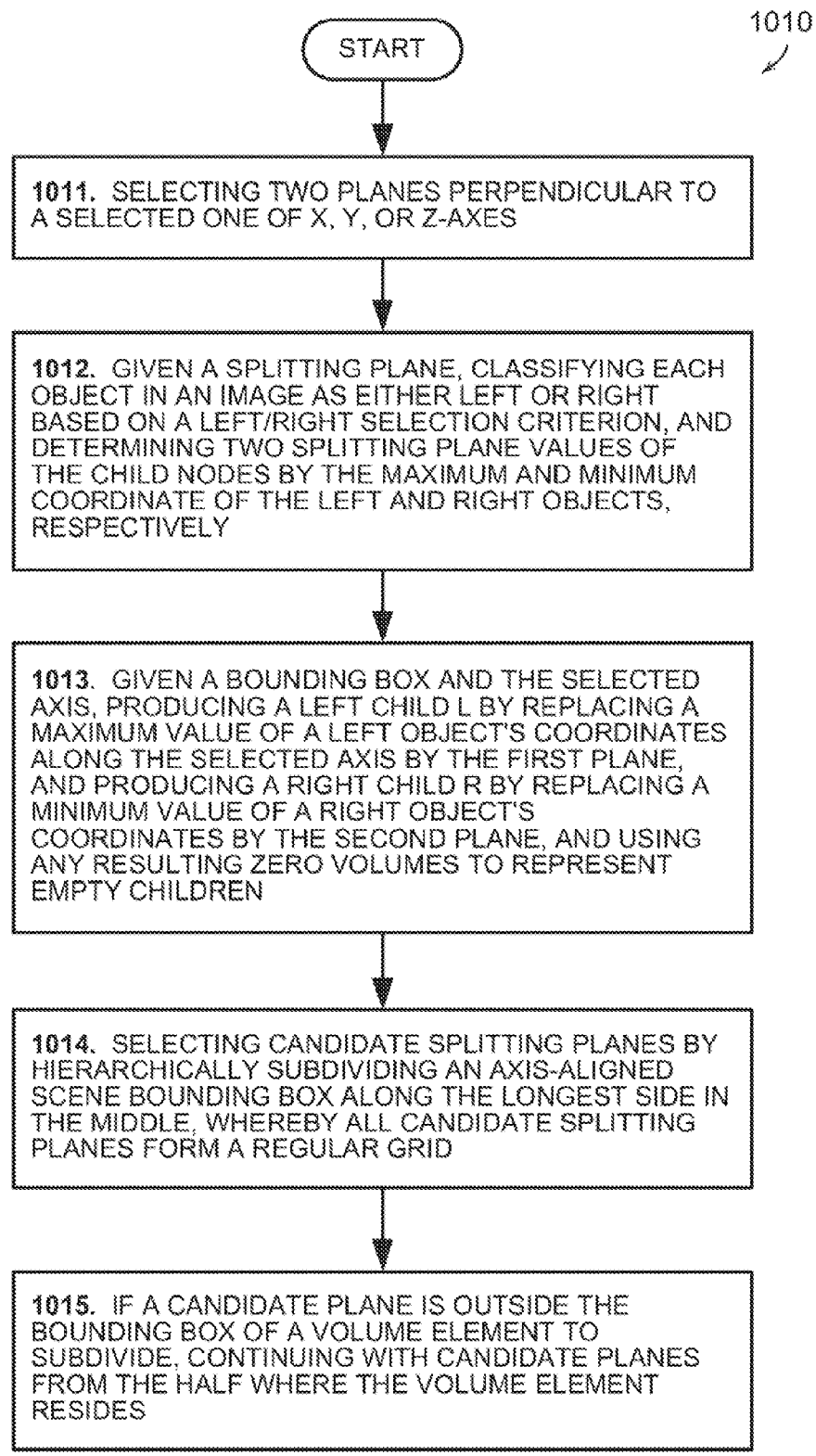

FIG. 44 shows a flowchart 1010 setting forth further aspects of constructing a hierarchical ray tracing acceleration data structure in step 1001 shown in FIG. 43.

In step 1011, two planes are selected that perpendicular to a selected one of x, y, or z-axes.

In step 1012, given a splitting plane, each object in an image is classified either left or right based on a left/right selection criterion, and two splitting plane values of the child nodes are determined by the maximum and minimum coordinate of the left and right objects, respectively.

In step 1013, given a bounding box and the selected axis, a left child L results from replacing a maximum value of a left object's coordinates along the selected axis by the first plane, and a right child R results from replacing a minimum value of a right object's coordinates by the second plane. Any resulting zero volumes are used to represent empty children.

In step 1014, splitting planes are determined by selecting candidate splitting planes by hierarchically subdividing an axis-aligned scene bounding box along the longest side in the middle, whereby all candidate splitting planes form a regular grid.

In step 1015, if a candidate plane is outside the bounding box of a volume element to subdivide, the process is continued with candidate planes from the half where the volume element resides.

FIG. 45 is a schematic block diagram of processing modules 122 within a computer 102 in accordance with one process of the invention. As shown in FIG. 45, the computer 102, or other processing device, when operating in conjunction with the present invention, contains some or all of the processing modules and/or other components shown therein. These modules correspond to and execute the method aspects shown in FIGS. 43 and 44. Such method aspects may be implemented by those skilled in the art using known computer operating system and applications programming techniques.

FIG. 46 is a schematic block diagram of software product modules 124 within a disk (removable or non-removable) or other storage element 120 in a computer or other processing device in accordance with the invention. As shown in FIG. 46, disk or other storage device 120, whether removable or non-removable, can contain computer program code executable by a conventional computing device to implement the method aspects of the invention, such as those shown in FIGS. 43 and 44.

III. Terminating Spatial Partition Hierarchies by a Priori Bounding

There are now described systems and techniques for the efficient construction of spatial hierarchies for accelerating ray tracing, and a new termination criterion that allows for a priori fixing of the memory footprint of the data structure. The resulting simplification of memory management makes techniques shorter, more efficient, and more widely applicable, especially when considering hardware implementations. Even the on-demand construction of parts of the hierarchy becomes significantly easier to perform. In addition, the hierarchy construction time can readily be predicted by the size of the provided memory block. This in turn allows for the automatic balancing of construction and ray tracing time in order to minimize the total time needed to render a frame from scratch.

1. Introduction

Typical photorealistic image synthesis techniques include connecting light sources and pixels by light transport paths and summing up their contributions. Vertices along these transport paths are found by tracing straight rays from one point of interaction to the next one. Other direct simulation methods in scientific computing rely on tracing particles along straight lines. Usually, a considerable part of the total computation time is spent on ray tracing.

The time spent for tracing many rays can be dramatically shortened by constructing an auxiliary acceleration data structure that allows for the efficient exclusion of large portions of the scene to be intersected with the rays, instead of intersecting each ray with all objects in a scene.

The present description focuses on implementations of ray tracing as a backtracking technique that searches trees or directed acyclic graphs, because these schemes apply best to general geometry. Constructing these hierarchical data structures may be formulated as a recursive procedure whose construction time is amortized when tracing many rays.

The efficiency of a ray tracing technique depends, in significant part, on how the search structures are constructed. Aside from various existing heuristics, memory management is an issue. While hierarchically partitioning the list of objects allows one to predict the memory footprint, techniques based on bounding volumes can suffer from inefficiencies caused by large objects and the convexity of the applied bounding volumes. Partitioning space ameliorates these problems. However, objects now can be referenced multiple times, as they may intersect multiple elements of a spatial hierarchy. Using prior techniques, it has not been feasible to efficiently predict this multiplicity and thus the memory footprint in a general way.

There are described herein systems and techniques that address the memory footprint prediction problem of spatial partition hierarchies. One result is simplified memory management, allowing one to completely omit dynamic memory allocation, which is typically quite involved. The described systems and techniques may be applied to various previous approaches. A memory prediction technique is described and analyzed. Further described are the results of numerical experiments.

The present discussion is focused on the efficient construction of acceleration data structures, and does not address the issue of how to efficiently traverse these data structures.

2. Construction of Spatial Hierarchies

In order to provide a framework for the description of the present invention, there is first provided a sketch of a general recursive procedure to construct spatial hierarchies. The procedure includes the following: (1) termination; (2) split selection; (3) classification; (4) node creation; and (5) post-processing. Each of these is briefly discussed below.

(1) Termination: The termination condition is a combination of controlling memory consumption and considering the amortization of appending more nodes to the tree.

A first termination clause terminates the tree by depth. This first clause, however, only results in an exponential bound on the number of nodes, and thus memory.

A second termination clause avoids further subdivision of the tree, if there is an insufficient number of references. This second clause saves memory, and balances node processing time versus leaf processing time.

(2) Split selection: A heuristic is used to split the current volume element into two or more elements. Both the efficiency of the construction and the efficiency of ray tracing later on are heavily influenced by how the split is selected. Heuristics range from simple criteria as splitting axis-aligned volumes in the middle along the longest side, over global criteria to more costly methods like the surface area heuristic. Their discussion, however, is not addressed by the present description of the invention. As will be seen, the described technique may be effectively used with any of these heuristics.

(3) Classification: For each object referenced in the object list it is determined which of the new volumes it intersects. (Depending upon the heuristic used, an object may intersect more than one volume.)

(4) Node creation: For each new child a list of references to objects is assembled according to the classification in the previous step. The case of concern now is the reference duplication caused by objects that are assigned to more than one child as it is difficult to predict their number a priori.

(5) Post-processing: After recursively processing the children, a post-processing step can perform several tree optimizations.

2.1 Termination by Bounding Available Memory According to an aspect of the presently described invention, the above-described procedure is modified in two respects to construct a tree in an a priori fixed piece of memory.

First, the argument list of the construction procedure is extended by passing along a contiguous piece of memory along with its size. Instead of terminating the hierarchy by controlling the maximum depth of the tree, a leaf node is constructed if the two reference lists resulting from the classification step plus the size of two tree nodes do not fit into the given memory block.

Second, a prediction is made of the memory consumption of the two new subtrees in the sorting step. The memory available to the two children is scheduled accordingly when continuing recursively. We therefore compute a prediction $p \in [0, 1]$, which schedules the fraction of memory for the left child. The remainder of the memory is scheduled for the right child. Note that for branches with more than two children, there is needed a prediction $p_i \in [0, 1]$ for each child i with the condition that all p sum up to one.

Contrary to the classical clause, which terminated the tree by one global depth parameter, the depth now is implicitly controlled by the scheduled memory. The scheduling allows the local adaptation of the depth, which is superior to the previous exponential bound. In addition, scheduling replaces the second classical termination clause which, as described above, limits the number of items worth a further tree subdivision. The same effect now can be obtained by just providing a smaller memory block upon the initial call of the construction procedure.

The procedure succeeds as long as there is at least sufficient memory to store one node along with the list of references to all objects in the scene. This appears to be a reasonable assumption, as exactly this data must be provided upon each procedure call.

The construction technique now can be implemented to run on limited memory and "in place." Instead of the above-described prior techniques for memory allocations for nodes and lists, the described memory management technique reduces memory allocation to one block before the initial call of the construction routine.

Being able to fit a hierarchy into an a priori fixed memory footprint meets the requirements of a hardware implementation, too, where a limited amount of on-board memory is an issue.

FIGS. 47A-D show a series of diagrams illustrating a contiguous block of memory for a binary kd-tree. As shown in FIG. 47A, upon a call, the construction procedure is provided the memory block starting at $m_b$ and ending at $m_e$ along with the number n of objects. As shown in FIG. 47B, in order to enable in-place sorting, the array in the current example is partitioned into five regions: (1) objects classified as belonging to the left child; (2) objects classified as belonging to the right child; (3) objects classified as belonging in both the left and right both children; (4) the unclassified items to be processed, and (5) the remaining free memory area. As shown in FIG. 47C, if children are created, the memory for two nodes is taken from the provided memory block and the remainder starting at $m'_b$ is scheduled for the two children according to the prediction $p \in [0, 1]$. As shown in FIG. 47D, a memory layout in pre-order improves cache performance, because less memory is accessed.

2.2 Scheduling Available Memory by Prediction

In order to predict the ratios $p_i$, we first take a look at bounding volume hierarchies, which recursively partition the list of objects and thus lack reference replication. (In other words, because of the way in which bounding volume hierarchies are constructed, no object can be referenced to more than one bounding volume.) Built to full depth, the number of inner nodes in the tree plus one is equal to the total number of objects, which is true for any subtree, too.

In the simple case, in which objects are sorted to a left child or a right child, the relative frequency $$p = \frac{l}{l+r} \quad (1a)$$

determined by the integers l and r of objects to be sorted to the left and right child, respectively, p exactly predicts the fraction of memory to be scheduled for the left subtree, and 1−p exactly predicts the fraction of memory to be schedule for the right subtree.

Equation (1a) can be generalized to:

$$p_i = \frac{e_i}{\sum_{j=1}^{m} e_j} \quad (1b)$$

determined by the integers $e_i$ of objects to be sorted into the i-th child of an m-ary node, respectively. Equation (1b) exactly predicts the fraction of memory to be scheduled for the i-th subtree.

If the tree is not built to full depth, the prediction remains optimal in the sense that all subtrees will receive memory generally proportional to their number of objects referenced to those subtrees. All leafs will store about equal numbers of objects as they become about uniformly pruned and subtrees containing more objects will be deeper.

To summarize, the presently described termination criterion along with proportional prediction allows the construction of efficient bounding volume hierarchies in a predetermined contiguous block of memory.

2.3 Prediction in the Presence of Reference Replication

There are situations, where bounding volume hierarchies suffer from severe performance penalties. For example, these penalties are encountered when bounding boxes of objects expose big regions of overlap, when axis-aligned boxes are used to bound non-convex objects, or when empty space cannot be separated as, e.g., for diagonal pipes. Then, instead of subdividing objects, usually spatial partition schemes are employed.

Considering hierarchies such as, e.g., kd-trees that potentially replicate references to objects that intersect splitting planes, it is still possible to use the prediction in equation (1) to schedule the memory for the children. This simple prediction overcomes the static termination by tree depth as it does not just cut the deepest branches of the tree but uniformly bounds memory proportional to the number of references in a subtree as mentioned before.

However, the prediction (1) relies on local information only and cannot predict the reference replication in the lower levels of the tree. Hence there may be a discrepancy between the prediction and the optimal subtree memory footprint. As a consequence some subtrees can be pruned by insufficient memory, while others cannot use the scheduled memory. Although this effect vanishes as more memory becomes available, it strongly implies that reference duplication should be minimized by, e.g., preferring split planes aligned to the bounding boxes of the objects in order to allow for potentially deeper trees and consequently more efficient culling. Experiments have indicated that the aforementioned degradations in performance are typically not significant.

The observed $O(n_t \log n_t)$ behavior allows to draw the conclusion that the observed average case reference replication is at most linear in the number $n_t$ of objects, which is provides justification for the proportional heuristic.

2.4 Optimal Scheduling

From theory, a worst case behavior of $O(n_t^2)$ is known and thus, although maybe rare, situations must exist, where the prediction will not work well. The number of replicated references is proportional to the surface area of the object. Long, thin objects will create references proportional to the length of their longest side, while more extended objects will create references quadratic in the longest side. As long as objects are small with respect to the total scene size, this effect will not be noticeable as it happens only on some levels of the hierarchy. For a Mikado-game like scene, however, the effect will be quite noticeable. It should be noted that this is true for any ray tracing technique.

Another situation in which proportional prediction will fail is a situation in which there is prediction p=0.5, where all objects sorted to the left are randomly placed, whereas the objects sorted to the right describe regular structures. While the right subtree will have minimal reference replication the left one will have a relatively high number of reference replication. However, because p=0.5, both subtrees are given the same amount of memory. Situations like this are not theoretical: Trees around a building are a setting in which, locally, the prediction can be suboptimal.

Worst case scenarios have been characterized for the proportional prediction (1). Although the proportional heuristic works well on the average, in fact any probability density, relative frequency, or measure of importance $p \in [0, 1]$ can be chosen instead. It then becomes possible to optimally schedule memory to the parts of the scene that actually contribute to the simulation. Ideas to consider include the distance from the eye or along a transport path, occlusions like, e.g., objects behind the eye, and reusing the relative frequencies of the tree used to render the previous frame, especially for deformable objects, where only geometry is transformed.

3. Complexity Analysis and Memory Footprint

The construction procedure coincides with a quicksort. While it is easy to see that finding the pivot element in fact corresponds to selecting a splitting plane, it is rather unconventional that some elements are generated by reference duplication during sorting. However, their maximum number is bounded by the a priori fixed memory footprint.

The analysis of the quicksort technique is readily available in standard textbooks on data structures and related techniques and states an average $O(n \log n)$ running time in the number of n of object references to be sorted. This result matches recent observations. The actual running time depends on how the split is selected and on how the references are ordered. There exist geometric configurations causing the worst case running time of $O(n^2)$.

The question is now how to choose the size n of the memory footprint. It must be sufficiently large to store at least one node along with all object references. But there are more choices and considerations:

1. Providing memory $n = \alpha \cdot n_t$ proportional to the number $n_t$ of objects to be ray traced is a reasonable consideration. The factor $\alpha > 1$ then represents the amount of allowed reference replication. See, also, FIG. 48, discussed below. This may be the most practical choice.

2. Choosing $n = \beta \cdot n_r$ proportional to the number $n_r$ of rays to be shot, which in some path tracing techniques is proportional to the number of pixels, exposes an interesting relation to the classical Z-buffer: The memory footprint is linear in the number of pixels, however, only if the memory required to store the scene objects does not exceed this limit. As will be illustrated below in Section 5 on numerical experiments, it is thus possible to amortize the hierarchy construction time by controlling it by the number of rays shot. See also FIG. 49, discussed below. An extreme example is a single ray, where no hierarchy needs to be built and the triangles are just tested in linear order.

3. Providing the maximum available memory reduces the risk of penalties from bad memory predictions. However, building the tree adaptively then can result in subtrees incoherently scattered over the whole memory block. Even worse, the construction of kd-trees can fill arbitrary amounts of memory due to reference replication. Consequently this last option is a bad choice.

Besides these obvious sizes and combinations thereof, we are convinced that there exist other useful methods. Note that ray tracing complexity is not only determined by the cost of constructing hierarchy; in fact the complexity later on is ruled by the backtracking search, as indicated by the second item of the above enumeration.

4. Implementation

The new concept is easily verified by simply implementing the termination condition using any relatively convenient existing implementation at hand. Although the memory allocation remains untouched, the memory footprint implicitly becomes controlled by the termination criterion.

A more efficient implementation still follows the outline of above Sections 2 and 2.1; however, memory management can be simplified. Before calling the construction routine a memory block is allocated in which a root node along with the object references is stored in sequential order (similar to FIG. 47A, discussed above). Inside the routine the classification uses the memory layout as illustrated in FIG. 47B. For the next unclassified object it is decided whether it belongs to the left, right, or both children in the subtree.

The first case, in which the unclassified object is classified as belonging to the left child, just requires incrementing the l variable.

For the second case, in which the unclassified object is classified as belonging to the right child, the last element of the left-and-right block is moved to the front to make space for the new element on the right. In addition the last unclassified element is moved to the vacancy left by the element classified to the right child.

The last case, in which an unclassified object is classified as belonging to both the left child and the right child, requires a reference to be replicated. The current element is moved to the front of the left-and-right block and again the last unclassified element needs to be moved to the just created vacant memory position. If not enough memory is available for replication, the routine has to create a leaf node by copying back the right block and left-and-right block.

The creation of the children will only be performed if there is sufficient memory for two nodes and the total number of references, including any references that need to be replicated (i.e., any objects that are referenced to both the left child and the right child to be created). According to the memory layout in FIG. 47C, some elements from the left list have to be moved to its end to make space for the nodes. In addition, the left-and-right block has to be copied to the end of the left list. Based on the classification we can use the proportional heuristic (1) to compute the offset $m_b' + \lfloor p \cdot (m_e - m_b') \rfloor$ of memory scheduled for the right subtree. Then the memory block of the "left-and-right" objects combined with the "only-right" objects has to be moved to this offset.

It will be seen that using the described memory layout, the optimization of sharing the left-and-right block in leaf nodes allows one more level in the tree without the cost of additional memory.

While the above description relates to kd-tree construction, it will be seen that is applies as well to bounding volume hierarchies by just omitting the part that allows for reference replication. It will further be seen that the technique may readily be generalized for use with m-ary trees.

Taking a closer look reveals memory fragmentation, unless the memory scheduled for a subtree is completely used. This may be avoided by recognizing the prediction p as an upper bound on the memory scheduled to the left child and linearly writing the tree data structure into the memory, which is suitable for streaming architectures known in the art. This, in addition, increases data coherency which is beneficial with modern processor cache architectures.

Proceeding that way may seem unfair, as the rightmost branch potentially receives the most memory; however, this can be compensated by modifying p. A simple improvement is to change the order in which the children are built recursively. For example, this can be done randomly or by changing the order if the tree depth is odd.

4.1 Alternative Memory Layout

The classic technique of storing the children as an array, as illustrated by FIG. 47C allows the use of only one pointer. Storing the tree in pre-order as illustrated by FIG. 47D allows even more memory to be saved: A pointer followed by its subtree points to the next subtree. While leaf nodes are directly followed by references to objects or the objects themselves, an inner node is followed by, e.g., the splitting plane offset. This saves one level of indirections and results in more cache coherent memory access, but does not appear to perform noticeably differently from the classic layout. In addition, it does not allow for the last level optimization possible in kd-trees.

For a hardware design, it would be especially beneficial to have two separate memory areas with a separate memory controller for each of the inner nodes and leaf nodes, respectively. The ray tracing implementation in the Intel Performance Primitives uses such a layout: First the tree nodes are enumerated, which are followed by the object references. With the described systems and techniques it is also possible to schedule a chunk of nodes in order to increase cache performance. Ideally this would be in a van Emde Boas layout; however, a penalty is paid, if nodes remain empty.

A van Emde Boas layout is described, for example, in Michael A. Bender, Jeremy T. Fineman, Seth Gilbert, Bradley C. Kuszmaul, "Concurrent Cache-Oblivious B-Trees," *Proceedings of the 17th Annual ACM Symposium on Parallelism in Algorithms and Architectures* (Jul. 18-20, 2005, Las Vegas, Nev.), incorporated herein by reference.

4.2 Applied Split Plane Heuristics

As now both approaches of partitioning space (e.g., kd-trees) and partitioning object lists (e.g., bounding volume hierarchies) fit a unified framework, a hybrid approach may be used to optimize performance. The split selection then attempts to first divide the list of objects, unless this is inefficient, and reference replication by spatial partition becomes unavoidable. The corresponding ray traversal must distinguish between nodes with and without reference replication.

In anticipation of that step and with the data layout in FIG. 47B, bounding volume hierarchies in the present description are built by first sorting all objects that overlap a potential splitting plane into the left-and-right block. After scanning all objects, it is decided whether all objects in that block are appended to either the left or right block. Compared to single decisions for each object, the overlap is minimized much more. Consequently, the empty volume is maximized and in turn the overall performance improves. The split planes are selected by a global heuristic.

For the kd-trees split planes are selected through a triangle vertex that is closest to splitting along the longest side of the current bounding box.

4.3 Massive Scenes

When a scene description does not fit into main memory, it is possible to rely on virtual memory mechanisms of the operating system to manage the memory block. In order to reduce page thrashing, the upper part of the inner nodes of the spatial hierarchy can be stored in a part of memory that permanently remains in main memory.

Two separate memory blocks have also been considered for the upper part and lower parts of the hierarchy. The new termination criterion can efficiently fit the upper part of a hierarchy into the a priori fixed first memory block. The lower parts are built on demand in the second block of memory. The least recently used parts of the hierarchy become flushed, if memory is not sufficient. This procedure then somewhat resembles multi-pass techniques on rasterization hardware.

4.4 Construction on Demand

Instead of recursively constructing the whole hierarchy in advance, the hierarchy can be built on demand during ray traversal. Therefore nodes are checked for being finalized upon visit. If they are not finalized the construction procedure is called that either finalizes the current subtree or appends one level of nodes. Therefore non-finalized nodes have to store the temporary information necessary to execute the construction procedure upon the next visit. If the scheduled free memory does not allow the storage of this information, the recursive construction routine is called to build the subtree fitting in that memory block.

While the implementation is rather simple and elegant, it only saves computation time, but leaves unused memory regions, as the memory block is allocated once before.

4.5 Improving Amortization and Prediction

An improved balancing of the cost of building the acceleration data structure and traversing it by rays can be achieved by building the data structure deeper in those regions of the scene that are traversed by more rays. Therefore the on-demand procedure may be modified as follows:

Instead of building the hierarchy where the ray traverses, only a certain number of levels of the hierarchy are built. When a next ray intersects the same parts of the hierarchy, the hierarchy again is extended by a certain number of levels. The more rays share the same parts of the hierarchy, the better the building cost becomes amortized. If only one ray passes through a certain region of space, building the hierarchy does not pay off and automatically is omitted. The number of levels to be built at once should be higher in regions of higher ray density. Thus the number of additional ray object intersections can be reduced.

As the hierarchy is not fully built, but objects of the parts under construction become already intersected, marking these objects or arranging them in a priority queue by a least-recently used strategy allows for improving memory prediction as well as split plane selection heuristics. It is reasonable to assume that unmarked objects or objects at the end of a priority queue will be intersected less probably. Thus they could be separated by selecting suited split planes and only marked or least recently intersected objects could be considered to select split planes. On the other hand memory scheduling can be adapted to count only marked or more recently used objects instead of all objects. Similar information can be inferred by using intersection information from a previous frame.

To justify the assumptions, the early rays must be distributed proportional to their final density in space. This is approximately achieved by first computing an image in a low resolution and then increasing resolution, even in a multi-resolution fashion.

5. Numerical Experiments and Results

It is important to note that our termination criterion is a much more efficient way to control memory consumption. Also note that providing sufficient memory results in hierarchies identical to the ones built using the classic criteria. Thus there is no need to explore all available split plane selection heuristics and in fact experimental findings in the sequel apply to any heuristic.

The new termination criterion has been verified using the kd-tree and the bounding interval hierarchy (BIH) as they are one of the currently most competitive hierarchies.

For the first set of numerical experiments three scenes have been used: (1) a car scene represents a currently very attractive domain for ray tracing, (2) a kitchen that has a mixture of small and big partially overlapping triangles, and (3) the Stanford Happy Buddha as a very simple scene.

Figure 48A:
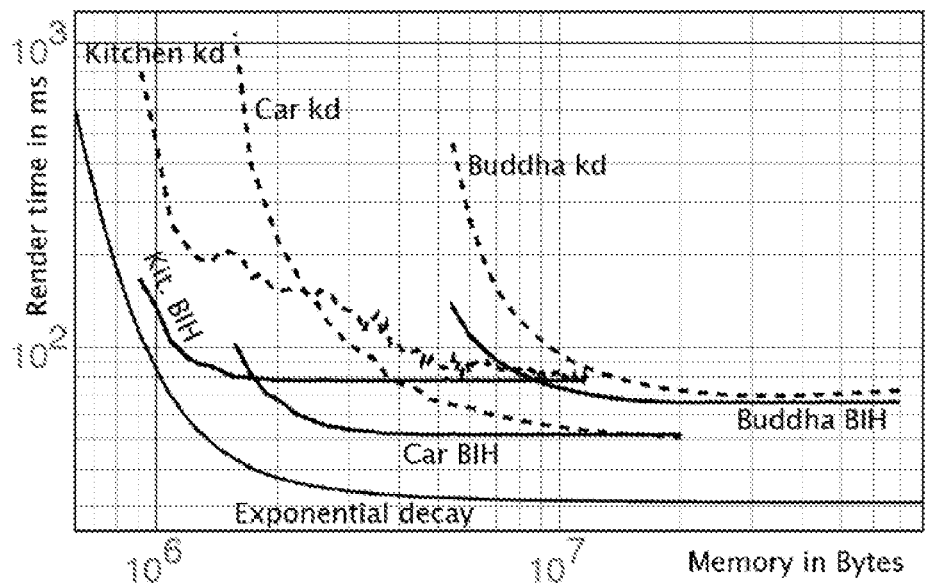
FIGS. 48A and 48B are a pair of graphs illustrating the behavior of the described termination criterion on the size of the provided memory block.
Figure 48B:
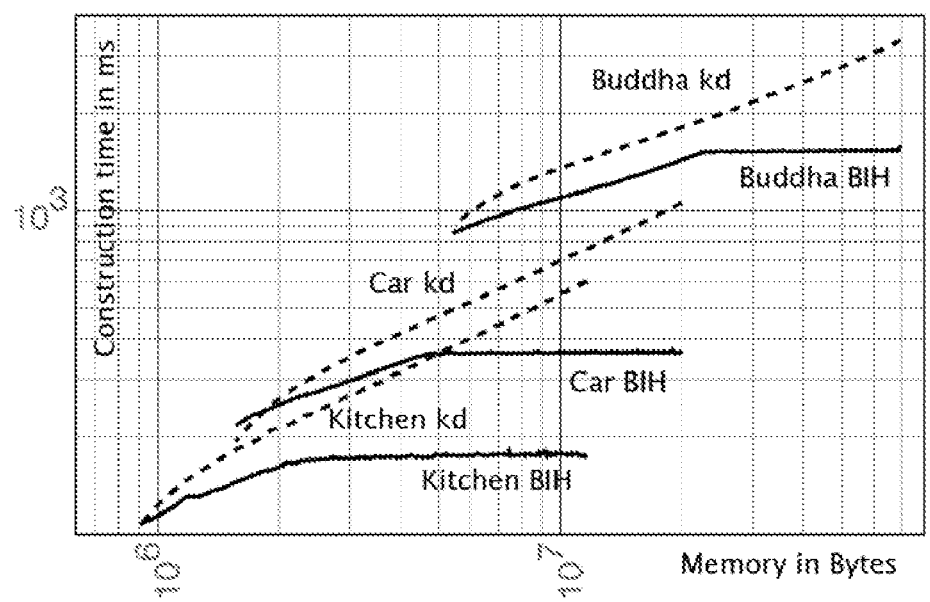

FIGS. 48A and 48B are a pair of graphs illustrating the behavior of the described termination criterion on the size of the provided memory block. The graphs illustrate the asymptotic behavior of the described termination criterion, dashed for kd-trees and solid for the BIH. For each of the three test scenes the memory ranges from $\alpha=5 \ldots 64$ bytes times the number $n_t$ of triangles. The left graph shows how the ray tracing time, excluding construction time, for rendering 512× 512 images depends on the size of the memory available for the acceleration data structure. As expected an exponential decay is observed. The right graph shows how limiting the memory first behaves linear in the number of triangles and as the trees become deeper asymptotically blends to an n log n complexity. Since the bounding interval hierarchy (BIH) construction does not replicate references, the BIH curves become clipped once the tree is built to the maximally possible depth.

Providing more memory allows the hierarchies to be built deeper. As expected, the time spent for ray tracing decreases. Looking precisely, it can be seen that for the Buddha ray-traced with a kd-tree, too much memory allows for trees that are too deep, which in turn becomes inefficient. The construction time asymptotically behaves like O (n log n) on the average. The beginning segments of the construction time curve, however, are linear in the number of triangles, as not enough memory is provided to build deep hierarchies. Contrary to the kd-trees the BIH curves are clipped, because no reference replication is possible.

In the second set of experiments, the Stanford That statue was used to investigate how construction time can be amortized over rendering time, i.e., how the total time needed to render a frame from scratch can be minimized.

Figures 49A, 49B:
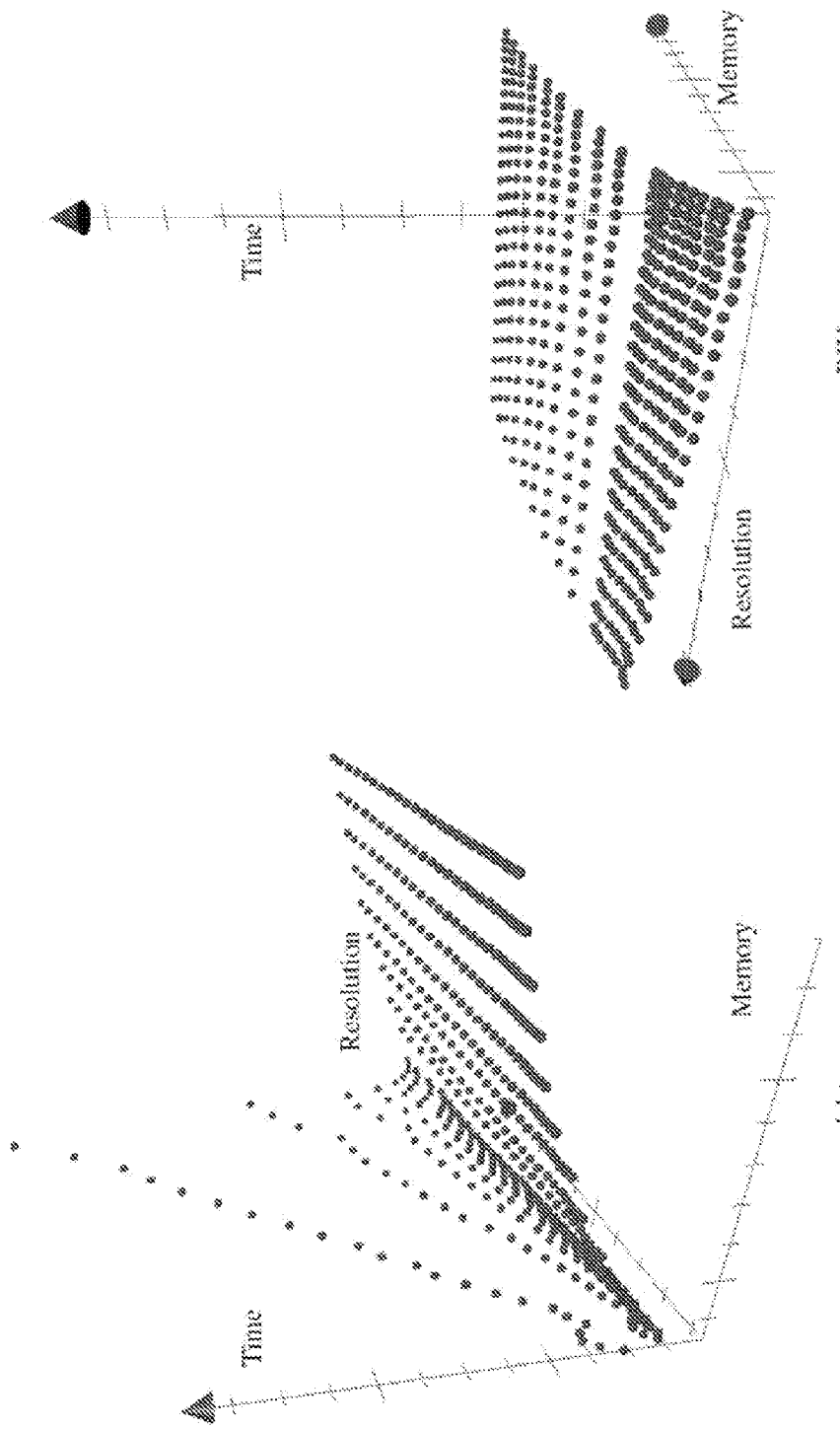
FIGS. 49A and 49B are a pair of graphs illustrating the total time to image in dependence on the provided memory size and number of rays.

FIGS. 49A and 49B illustrate the total time to image (8 . . . 20 seconds, axis to the top) in dependence on the provided memory size (40 . . . 100 MB) and number of rays ($256^2 \ldots 1024^2$) for the Stanford That Statue ($n'=10^6$ triangles). For the kd-tree illustrated in FIG. 49A, the axis to the front represents memory, while the axis to the back represents the number of rays. In FIG. 49B, the axis to the right represents memory, while the axis to the left represents resolution. For both approaches the minimal time clearly depends on both the number of rays and provided memory.

From FIGS. 49A and 49B, it will be seen that this minimum depends on both the number of rays and the memory block provided. In other words, the quality of the hierarchy needs to be traded for its construction time. While the "valley" of the minimum is clearly visible for the kd-tree in FIGS. 49A and 49B, it is less visible for the bounding interval hierarchy (BIH), although similar, because the BIH can be constructed much faster due to the lack of checks for reference replication. The shape of the graphs in FIGS. 49A and 49B is easily explained: With increasing resolution first the construction time dominates before the ray tracing time takes over. The more rays are shot the deeper, i.e., better, hierarchies pay off. This depth is controlled by the new termination criterion and thus by the size of the available memory.

The above observation together with the termination criterion described herein is especially useful in a dynamic setting, where each frame must be computed from scratch. Here the frame rate is easily maximized by measuring the total time to image and then increasing or decreasing the size of the provided memory block from frame to frame. This allows for automatically determining a close to optimal memory block size for offline animation rendering, too.

6. Conclusion

Described herein is a new termination criterion and memory scheduling technique that allows the construction of an efficient ray tracing acceleration data structure in an a priori fixed memory block. The resulting simplified memory management is beneficial for both software implementations and, especially, hardware implementations.

Although the present description focuses on a proportional memory scheduling technique, other techniques and applications may be developed and explored. The principle of terminating hierarchies by memory consumption applies to other ray tracing acceleration schemes including, for example, hierarchical grids, octrees, ray classification, and the like. The scheme may be applied to classic binary space partitioning (BSP) trees in order to determine visibility, and to point clouds (e.g., photon mapping) for faster range searching. The described techniques may also be applied to the field of collision detection and occlusion culling with graphics hardware.

7. General Technique

Figure 50A:
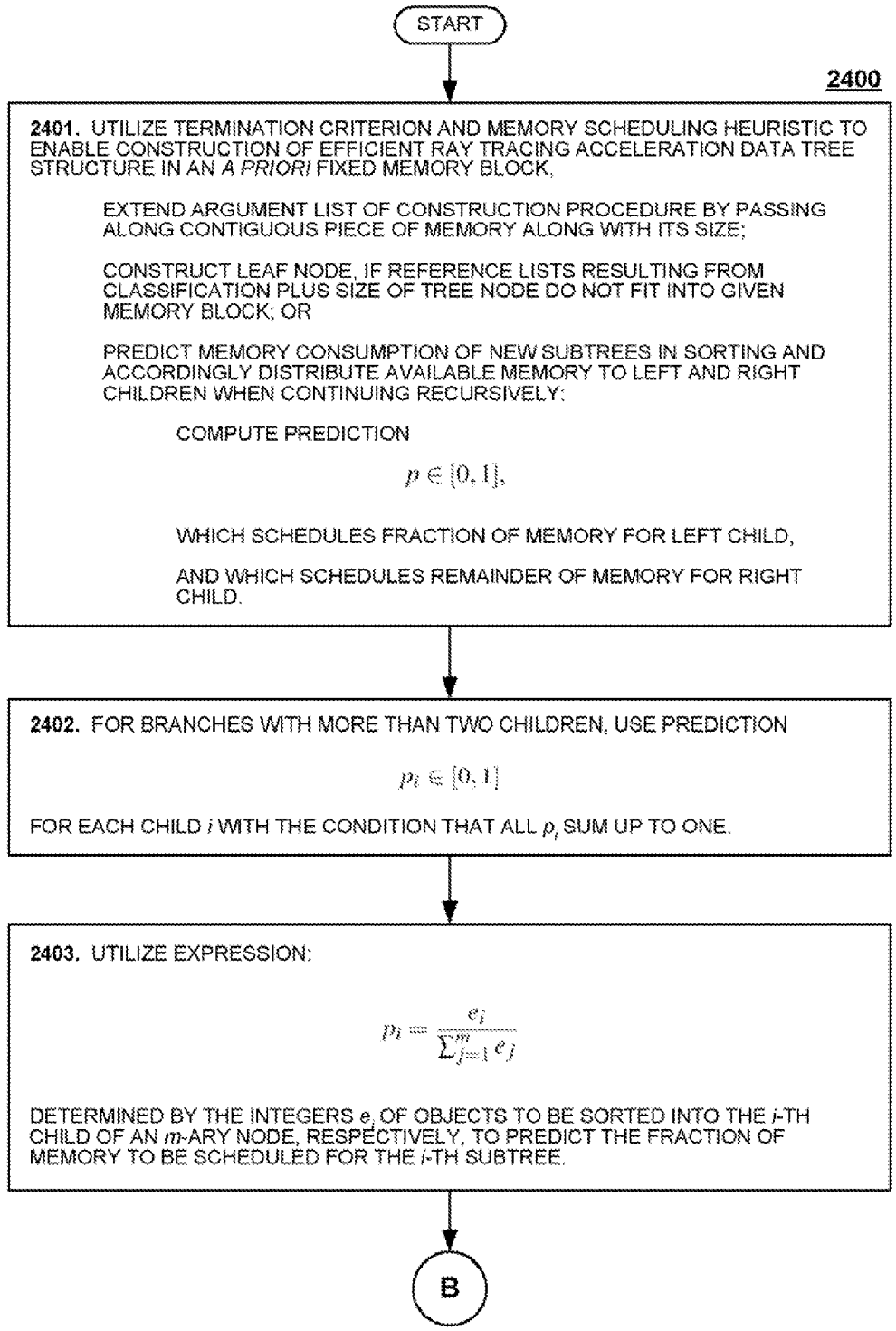
FIGS. 50A-C show a flowchart of a general method according to the present invention.
Figure 50B:
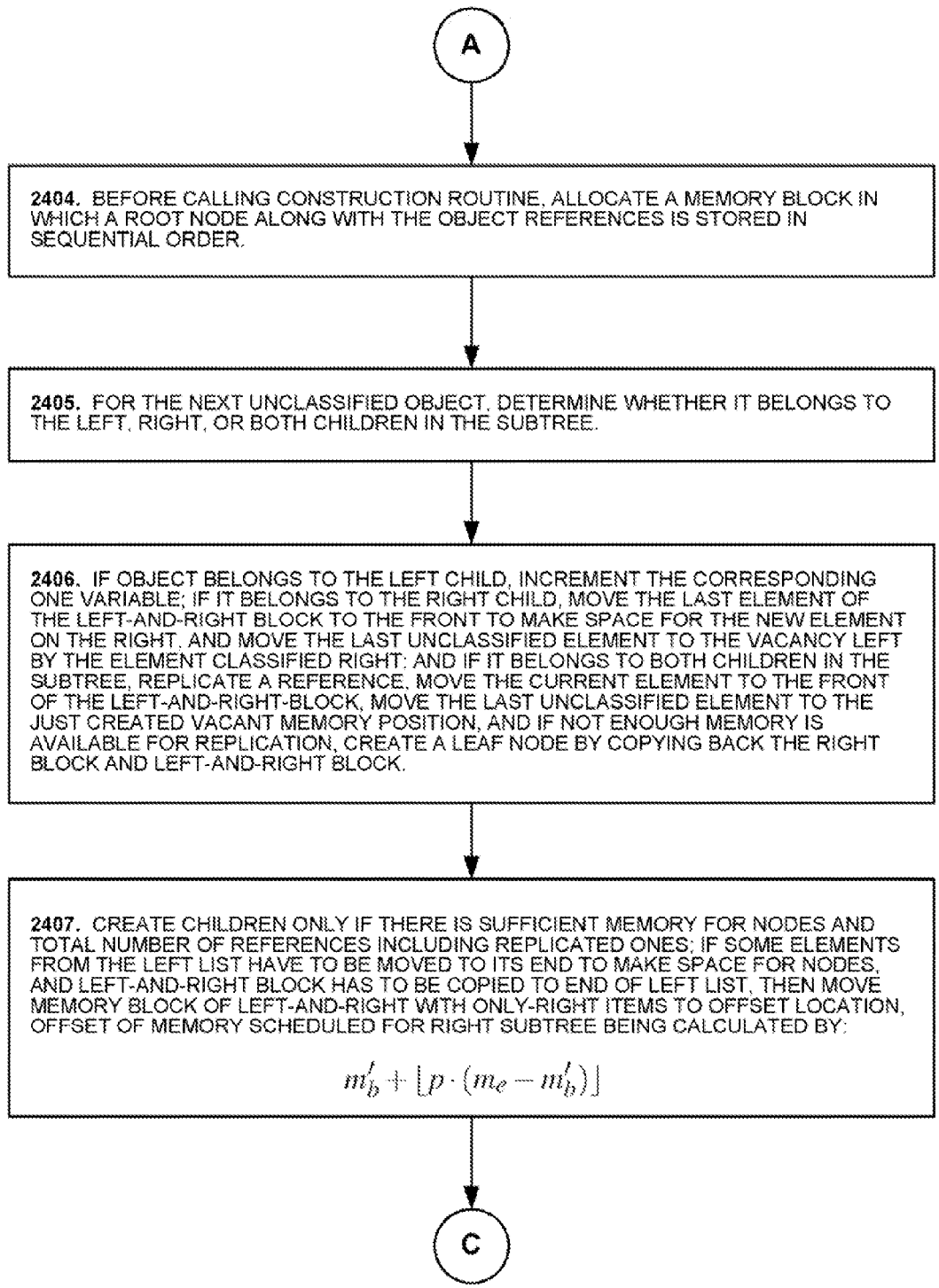
Figure 50C:
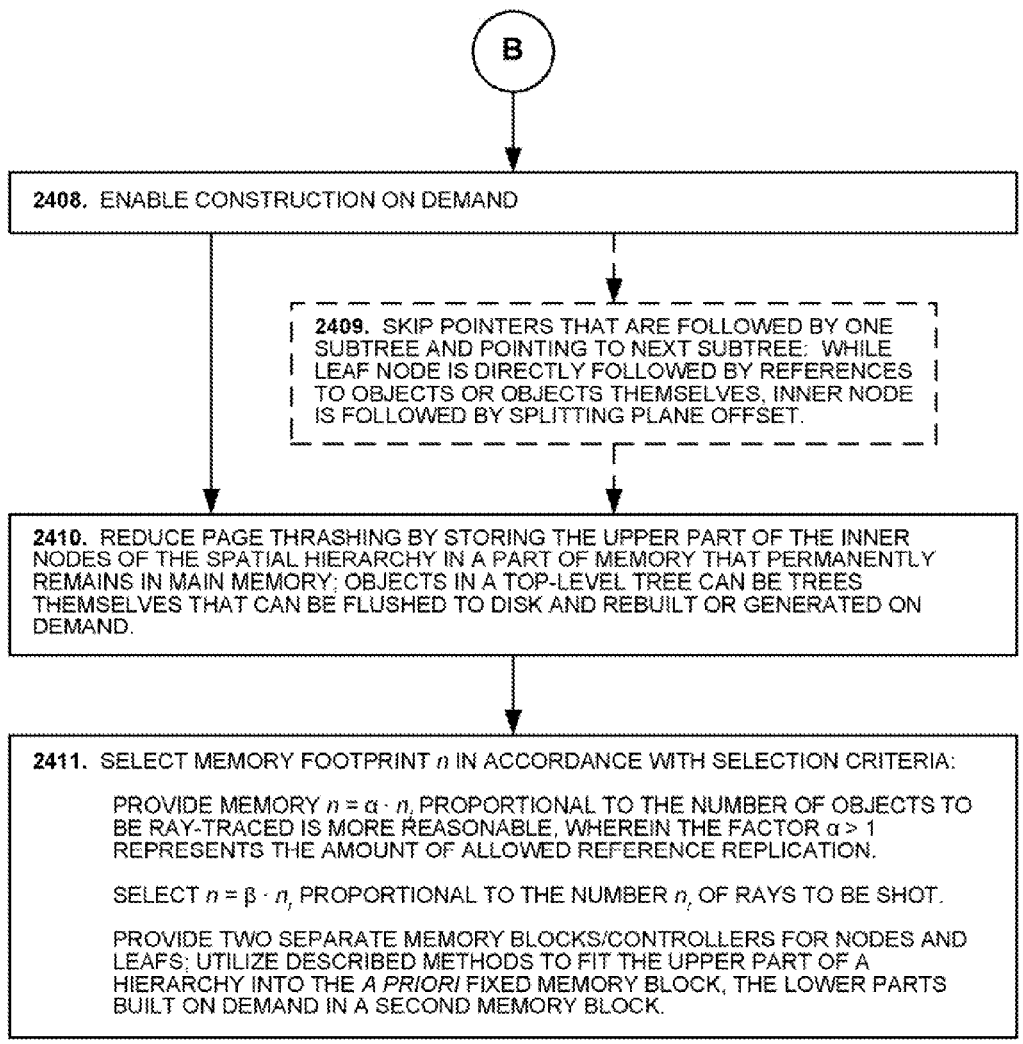

FIGS. 50A-C show a flowchart of a general method 2400 according to the present invention. The depicted method 2400 is an illustrative example. It should be noted that the method 2400 includes various elements and combinations of elements that, considered separately or in combination with other elements not shown in FIG. 50, may themselves represent aspects of the described invention.

Method 2400 includes the following:

Box 2401: Utilize termination criterion and memory scheduling heuristic to enable construction of efficient ray tracing acceleration data tree structure in an a priori fixed memory block, extend argument list of construction procedure by passing along contiguous piece of memory along with its size;

construct leaf node, if reference lists resulting from classification plus size of tree node do not fit into given memory block; or predict memory consumption of new subtrees in sorting and accordingly distribute available memory to left and right children when continuing recursively:

compute prediction p∈[0, 1], which schedules the fraction of memory for left child, schedule remainder of memory for right child.

Box 2402: For branches with more than two children, use prediction $p_i \in [0, 1]$ for each child i with the condition that all $p_i$ sum up to one.

Box 2403: Utilize expression:

$$p_i = \frac{e_i}{\sum_{j=1}^{m} e_j}$$

determined by the integers $e_i$ of objects to be sorted into the i-th child of an m-ary node, respectively, to predict the fraction of memory to be scheduled for the i-th subtree.

Box 2404: Before calling construction routine, allocate a memory block in which a root node along with the object references is stored in sequential order.

Box 2405: For the next unclassified object, determine whether it belongs to the left, right, or both children in the subtree.

Box 2406: If object belongs to the left child, increment the corresponding one variable; if it belongs to the right child, move the last element of the left-and-right block to the front to make space for the new element on the right, and move the last unclassified element to the vacancy left by the element classified right; and if it belongs to both children in the subtree, replicate a reference, move the current element to the front of the left-and-right-block, move the last unclassified element to the just created vacant memory position, and if not enough memory is available for replication, create a leaf node by copying back the right block and left-and-right block.

Box 2407: Create children only if there is sufficient memory for nodes and total number of references including replicated ones; if some elements from the left list have to be moved to its end to make space for nodes, and left-and-right block has to be copied to end of left list, then move memory block of left-and-right with only-right items to offset location, offset of memory scheduled for right subtree being calculated by:

$$m_b' + \lfloor p \cdot (m_e - m_b') \rfloor$$

Box 2408: Enable construction on demand.

Box 2409, shown in broken lines, illustrates the following step that may be optionally performed between Boxes 2408 and 2410, or at another suitable point in the illustrated technique 2400: Skip pointers that are followed by one subtree and pointing to next subtree: while leaf node is directly followed by references to objects or objects themselves, inner node is followed by splitting plane offset.

Box 2410: Reduce page thrashing by storing the upper part of the inner nodes of the spatial hierarchy in a part of memory that permanently remains in main memory; objects in a top-level tree can be trees themselves that can be flushed to disk and rebuilt or generated on demand.

Box 2411: Select memory footprint n in accordance with selection criteria:

provide memory $n = \alpha \cdot n_t$ proportional to the number of objects to be ray-traced is more reasonable, wherein the factor $\alpha > 1$ represents the amount of allowed reference replication.

select $n = \beta \cdot n_r$ proportional to the number $n_r$ of rays to be shot;

provide two separate memory blocks/controllers for nodes and leafs; utilize described methods to fit the upper part of a hierarchy into the a priori fixed memory block, the lower parts built on demand in a second memory block.

8. Digital Processing Environment in which Invention can be Implemented

FIG. 51 shows a schematic block diagram of a processing module 2500 having submodules 2501-2503 adapted to execute the above-described methods and techniques.

Module 2500 is a termination criterion and memory scheduling heuristic module, which includes the following submodules:

Submodule 2501 for extending argument list of construction procedure, passing along contiguous piece of memory along with size, and constructing leaf node if two resulting reference lists plus size of tree node do not fit into given memory block;

Submodule 2502 for predicting memory consumption of new subtrees and accordingly distributing available memory to left and right children while proceeding recursively; and Submodule 2503 for providing additional memory allocation and other described features.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method executable in a computer graphics system for rendering images for display on a human-perceptible display element, the displaying comprising the display of image representations on the display element, wherein (1) the display element is operable to generate a human-perceptible display of a scene in accordance with pixel values generated by the computer graphics system, (2) the computer graphics system is operable to construct ray tracing data tree structures in memory, and (3) the constructing of tree structures includes any of classification and sorting, the method comprising:

utilizing a termination criterion and memory scheduling heuristic to enable construction of an efficient ray tracing acceleration data free structure in a given, a priori fixed memory block, the termination criterion and memory scheduling heuristic comprising:

transmitting, for use in constructing the acceleration data tree structure, a contiguous portion of memory along with a value representative of the size of the contiguous portion of memory, and instead of terminating the hierarchy by controlling a maximum depth of the tree, constructing a leaf node, if two reference lists resulting from a classification step plus the size of a tree node do not fit into the given memory block; and predicting the memory consumption of the two new subtrees in the sorting and accordingly disturbing the available memory to the left and right children when continuing recursively, the predicting comprising computing a prediction p∈[0, 1], which schedules a fraction of memory scheduled for the left child, the remainder of the memory being scheduled for the right child, such that depth is implicitly controlled by the scheduled memory, and the scheduling allows local adaptation of depth.

2. The method of claim 1 further comprising utilizing, for branches with more than two children, a prediction $p_i \in [0, 1]$ for each child i with the condition that all $p_i$ sum up to one.

3. The method of claim 1 further comprising:

utilizing the relative frequency expression:

$$p_i = \frac{e_i}{\sum_{j=1}^{m} e_j} \quad (1)$$

determined by the integers $e_i$ objects to be sorted into the i-th child of an m-ary node, respectively, to predict the fraction of memory to be scheduled for the i-th subtree.

4. The method of claim 3 further comprising:

allocating, before calling the construction routine, a memory block in which a root node along with the object references is stored in sequential order.

5. The method of claim 4 further comprising:

for the next unclassified object, determining whether it belongs to the left, right, or both children in the subtree.

6. The method of claim 5 further comprising:

if it belongs to the left, incrementing the corresponding one variable;

if it belongs to the right, moving the last element of the left-and-right block to the front to make space for the new element on the right, and moving the last unclassified element to the vacancy left by the element classified right; and if it belongs to both children in the subtree, replicating a reference, moving the current element to the front of the left-and-right block, moving the last unclassified element to the just created vacant memory position, and if not enough memory is available for replication, creating a leaf node by copying back the right block and left-and-right block.

7. The method of claim 6 further comprising utilizing an in-lace sorting procedure.

8. The method of claim 6 further comprising:

creating the children only if there is sufficient memory for two nodes and the total number of references including the replicated ones, and wherein, if some element from the left list have to be moved to its end to make space for the nodes, and the left-and-right block has to be copied to the end of the left list, then moving the memory block of the left-and-right with the only-right items to an offset location, the offset of memory scheduled for the right subtree being calculated by the expression:

$m_b' + \lfloor p \cdot (m_e - m_b') \rfloor$.

9. The method of claim 7 further comprising:

utilizing prediction p as an upper bound on memory scheduled to the left child and linearly writing the tree data structure into memory.

10. The method of claim 7 further comprising:

constructing bounding volume hierarchies by first sorting into a left-and-right memory block all objects that overlap a potential splitting plane; and scanning all objects and determining, based on the scanning, whether all objects in the left-and-right memory block are to be appended to either a left memory block or a right memory block.

11. The method of claim 7 further comprising:
enabling construction on demand.

12. The method of claim 7 further comprising:
where a ray from a simulated light source illuminating a scene traverses a portion of the scene, constructing only a selected number of levels of the hierarchy, and when a next ray intersects the same parts of the hierarchy, again constructing a selected number of levels of the hierarchy, so that the hierarchy is built more deeply in regions of the scene traversed by more rays.

13. The method of claim 7 further comprising:
marking the objects, or associating the object with a priority queue, in accordance with a least-recently used strategy.

14. The method of claim 13 further comprising:
separating least-recently used objects by selecting suitable splitting planes.

15. The method of claim 13 further comprising:
utilizing a scheduling strategy that counts only more recently used objects.

16. The method of claim 15 further comprising:
inferring information about more-recently used objects by utilizing intersection information from a previous image frame.

17. The method of claim 16 further comprising:
first computing an image in low resolution and then a computing the image at least once again at one or more higher resolution levels.

18. The method of claim 17 further comprising:
maximizing frame rate by measuring a total time to image and then dynamically adjusting the size of the provided memory block from frame to frame as necessary.

19. The method of claim 7 further comprising:
skipping pointers that are followed by one subtree and pointing to the next subtree, and wherein:
while a leaf node is directly followed by references to objects or the objects themselves, an inner node is followed by the splitting plane offset.

20. The method of claim 7 further comprising:
reducing page thrashing by storing the upper part of the inner nodes of the spatial hierarchy in a part of memory that permanently remains in main memory, and wherein the objects in a top level tree can be trees themselves that can be flushed to disk and rebuilt or generated on demand.

21. The method of claim 7 further comprising:
utilizing two separate memory blocks for, respectively, an upper part and lower parts of the spatial hierarchy, and wherein the termination criterion fits the upper part of the hierarchy into an a prior fixed first memory block, and tire lower parts are constructed on demand it the second block of memory.

22. The method of claim 21 wherein the least recently used parts of the hierarchy can be flushed to free memory space.

23. The method of claim 20 further comprising implementing directed by graphs.

24. The method of claim 1 further comprising selecting a memory footprint n in accordance with selection criteria.

25. The method of claim 24 wherein the selection criteria comprise:
proving memory $n=\alpha \cdot n_r$ proportional to the number of objects to be ray traced, wherein the factor $\alpha>1$ represents the amount of allowed reference replication.

26. The method of claim 24 wherein the selection criteria comprise:
selecting $n=\beta \cdot n_r$ proportional to the number $n_r$ of rays to be shot.

27. The method of claim 24 further comprising providing a hybrid hierarchical acceleration data structure.

28. The method of claim 24 wherein the hierarchical structure can comprise any of a hierarchy of grids, octrees, or ray classifications.

29. The method of claim 26 wherein the split selection first attempts to divide the list of objects, unless the division is inefficient and reference replication by spatial partition becomes unavoidable, and further wherein the corresponding ray traversal distinguishes between nodes with and without reference replication.

30. The method of claim 1 further comprising:
utilizing the expression:

$$p = \frac{l}{l+r}$$

to predict the fraction of memory to be scheduled fix the left subtree, and 1-p for the right subtree.

31. The method of claim 30 further comprising:
allocating, before calling the construction routine, a memory block in which a root node along with the object references is stored in sequential order.

32. The method of claim 31 further comprising:
for the next unclassified object, determining whether it belongs to the left, right, or both children in the subtree.

33. The method of claim 32 further comprising:
if it belongs to the left, incrementing the corresponding one variable;
if it belongs to the right, moving the last element of the left-and-right block to the fro to make space for the new element on the right, and moving the last unclassified element to the vacancy left by the element classified right; and
if it belongs to both children in the subtree, replicating a reference, moving the current element to the front of the left-and-right-block, moving the last unclassified element to the just created vacant memory position, and if not enough memory is available for replication, creating a leaf node by copying back the right block and left-and-right block.

34. The method of claim 33 further comprising utilizing an in-place sorting procedure.

35. The method of claim 33 further comprising:
creating the children only if there is sufficient memory for two nodes and the total number of references including the replicated ones, and
wherein, if some elements from the left list base to be moved to its end to make space for the nodes, and the left-and-right block has to be copied to the end of the left list, then moving the memory block of the left-and-right with the only-right items to an offset location, the offset of memory scheduled for the right subtree being calculated by the expression:

$$m_b' + \lfloor p \cdot (m_e - m_b') \rfloor.$$

36. The method of claim 35 further comprising:
utilizing prediction p as an upper bound on memory scheduled to the left child and linearly writing the tree data structure into memory.

37. The method of claim 35 further comprising:
constructing bounding volume hierarchies by first sorting into a left-and-right memory block all objects that overlap a potential splitting plane; and scanning all objects and determining, based on the scanning, whether all objects in the left-and-right memory block are to be appended to either a left memory block or a right memory block.

38. The method of claim 35 further comprising:
enabling construction on demand.

39. The method of claim 35 further comprising:
where a ray front a simulated light source illuminating a scene traverses a portion of the scene, constructing only a selected number of levels of the hierarchy; and when a next ray intersects the same parts of the hierarchy, again constructing a selected number of levels of the hierarchy, so that the hierarchy is built more deeply in regions of the scene traversed by more rays.

40. The method of claim 35 further comprising:
skipping pointers that are followed by one subtree and pointing to the next subtree, and wherein:
while a leaf node is directly followed by references to objects or the objects themselves, an inner node is followed by the splitting piano offset.

41. The method of claim 35 further comprising:
reducing page thrashing by storing the upper part of the inner nodes of the spatial hierarchy in a part of memory that permanently remains in main memory, and wherein the objects in a top level tree can be trees themselves that can be flushed to disk and rebuilt or generated on demand.

42. The moth of claim 35 further comprising:
utilizing two separate memory blocks for, respectively, an upper part and lower parts of the spatial hierarchy, and wherein the termination criterion fits the upper part of the hierarchy into an a prior fixed first memory block, and the lower parts are constructed on demand in the second block of memory.

43. The method of claim 42 wherein the least recently used parts of the hierarchy can be flushed to free memory space.

44. The method of claim 41 further comprising implementing directed acyclic scene graphs.

45. The method of claim 30 further comprising selecting a memory footprint n in accordance with selection criteria.

46. The method of claim 45 wherein the selection criteria comprise:
providing memory $n=\alpha \cdot n_r$ proportional to the number of objects to be ray traced, wherein the factor $\alpha>1$ represents the amount of allowed reference replication.

47. The method of claim 45 wherein the selection criteria comprise:
selecting $n=\beta \cdot n_r$ proportional to the number $n_r$ of rays to be shot.

48. The method of claim 45 further comprising:
providing two separate memory blocks for noes and leafs, and utilizing the method of claim 18 to fit the inner nodes of an efficient hierarchy into the a priori fixed memory block, and if the leafs do not fit into the provided memory, providing a mechanism to regenerate leafs on demand.

49. An improvement to a computer graphics processor, the computer graphics processor comprising hardware elements adapted to enable rendering of images for display on a human-perceptible display element, the displaying comprising the display of image representations on the display element, wherein (1) the display element is operable to generate human-perceptible display of a scene in accordance with pixel values generated by the computer graphics system, (2) the computer graphics processor is operable to construct ray tracing data tree structures in memory, and (3) the constructing of tree structures includes any of classification and sorting, the improvement comprising:
means for utilizing a termination criterion and memory scheduling heuristic to enable construction of an efficient ray tracing acceleration data tree structure in a given, a priori fixed memory block, the means for utilizing the termination criterion and memory scheduling heuristic comprising:
means for transmitting, for use in a constructing the acceleration data tree structure, a contiguous portion of memory along with a value representatives of the size of the contiguous portion of memory, and instead of terminating the hierarchy by controlling a maximum depth of the tree, constructing a leaf node, if two reference lists resulting from a classification step plus the size of a tree node do not fit into the given memory block; and
means for predicting the memory consumption of the two new sub-trees in the sorting and accordingly distributing the available memory to the left and right children when continuing recursively, the predicting comprising computing a prediction $p \in [0,1]$ which schedules a fraction of memory scheduled for the left child, the remainder of the memory being scheduled for the right child,
such that depth is implicitly controlled by the scheduled memory, and the scheduling allows local adaptation of depth.

50. A computer program product comprising computer program instructions encoded onto a computer-readable medium, the computer program instructions being operable within a computer graphics system for rendering images for display on a human-perceptible display element, the displaying comprising the display of image representations on the display element, wherein (1) the display element is operable to generate a human-perceptible display of a scene in accordance with pixel values generated by the computer graphics system, (2) the computer graphics system is operable to construct ray tracing data tree structures in memory, and (3) the constructing of tree structures includes any of classification and sorting, the computer program product comprising:
computer program code means, the first computer program code means comprising computer-readable instructions executable within the computer graphics system for utilizing a termination criterion and memory scheduling heuristic to enable construction of an efficient ray tracing acceleration data tree structure in a given, a priori fixed memory block, the termination criterion and memory scheduling heuristic comprising:
transmitting, for use in constructing the acceleration data tree structure, a contiguous portion of memory along with a value representative of the size of the contiguous portion of memory, and instead of terminating the hierarchy by controlling a maximum depth of tree, constructing a leaf node, if two reference lists resulting from a classification step plus the size of a tree node do not fit into the given memory block; and
predicting the memory consumption of the two new sub-trees in the sorting and accordingly distributing the available memory to the left and right children when continuing recursively, the predicting comprising computing a prediction $p \in [0,1]$, which schedules a fraction of memory scheduled for the left child, the remainder of the memory being scheduled for the right child,
such that depth is implicitly controlled by the scheduled memory, and the scheduling allows local adaptation of depth.

* * * * *